(12) United States Patent
Wonneberger et al.

(10) Patent No.: US 10,353,049 B2
(45) Date of Patent: Jul. 16, 2019

(54) DETECTOR FOR OPTICALLY DETECTING AN ORIENTATION OF AT LEAST ONE OBJECT

(71) Applicant: BASF SE, Ludwigshafen (DE)

(72) Inventors: Henrike Wonneberger, Mannheim (DE); Ingmar Bruder, Neuleiningen (DE); Erwin Thiel, Siegen (DE); Robert Send, Karlsruhe (DE); Stephan Irle, Siegen (DE)

(73) Assignee: BASF SE, Ludwigshafen (DE)

( * ) Notice: Subject to any disclaimer, the term of this patent is extended or adjusted under 35 U.S.C. 154(b) by 667 days.

(21) Appl. No.: 14/897,981

(22) PCT Filed: Jun. 5, 2014

(86) PCT No.: PCT/EP2014/061691
§ 371 (c)(1),
(2) Date: Dec. 11, 2015

(87) PCT Pub. No.: WO2014/198626
PCT Pub. Date: Dec. 18, 2014

(65) Prior Publication Data
US 2016/0124074 A1    May 5, 2016

(30) Foreign Application Priority Data

Jun. 13, 2013   (EP) .................................... 13171900
Feb. 14, 2014   (EP) .................................... 14155161

(51) Int. Cl.
*G01C 3/08*   (2006.01)
*G01S 5/16*   (2006.01)
(Continued)

(52) U.S. Cl.
CPC ................ *G01S 5/163* (2013.01); *G01C 3/32* (2013.01); *G01S 7/4816* (2013.01); *G01S 17/46* (2013.01); *G01S 17/66* (2013.01)

(58) Field of Classification Search
CPC .......... G01S 17/46; G01S 7/4816; G01S 5/16; G01S 11/12; G01C 3/32; H04N 5/25; A63F 13/25; G01B 11/002
(Continued)

(56) References Cited

U.S. PATENT DOCUMENTS 3,035,176 A    5/1962   Kis et al.
3,112,197 A   11/1963   Neugebauer et al.
(Continued)

FOREIGN PATENT DOCUMENTS

CA    1065054    10/1979
CA    2196563    12/1996
(Continued)

OTHER PUBLICATIONS

International Search Report dated Nov. 27, 2015, in PCT/162015/055121, filed Jul. 7, 2015.
(Continued)

*Primary Examiner* — Mark Hellner
(74) *Attorney, Agent, or Firm* — Oblon, McClelland, Maier & Neustadt, L.L.P.

(57) ABSTRACT

A detector device (111) for determining an orientation of at least one object (112) is disclosed. The detector device comprises: at least two beacon devices (204), the beacon devices (204) being adapted to be at least one of attached to the object (112), held by the object (112) and integrated into the object (112), the beacon devices (204) each being adapted to direct light beams (138) towards a detector (110), the beacon devices (204) having predetermined coordinates in a coordinate system of the object (112); at least one
(Continued)

detector (110) adapted to detect the light beams (138) traveling from the beacon devices (204) towards the detector (110); at least one evaluation device (142), the evaluation device (142) being adapted to determine longitudinal coordinates of each of the beacon devices (204) in a coordinate system of the detector (110), the evaluation device (142) being further adapted to determine an orientation of the object (112) in the coordinate system of the detector (110) by using the longitudinal coordinates of the beacon devices (204).

30 Claims, 10 Drawing Sheets

(51) Int. Cl.
  *G01C 3/32* (2006.01)
  *G01S 17/46* (2006.01)
  *G01S 7/481* (2006.01)
  *G01S 17/66* (2006.01)

(58) Field of Classification Search
  USPC ............................................ 356/4.01
  See application file for complete search history.

(56) References Cited

U.S. PATENT DOCUMENTS

| | | |
|---|---|---|
| 3,384,752 A | 5/1968 | Odone |
| 3,562,785 A | 2/1971 | Craig |
| 3,564,268 A | 2/1971 | Bayne et al. |
| 3,937,950 A | 2/1976 | Hosoe et al. |
| 3,954,340 A | 5/1976 | Blomqvist et al. |
| 4,023,033 A | 5/1977 | Bricot et al. |
| 4,053,240 A | 10/1977 | Aizawa et al. |
| 4,079,247 A | 3/1978 | Bricot et al. |
| 4,256,513 A | 3/1981 | Yoshida |
| 4,286,035 A | 8/1981 | Nishizima et al. |
| 4,346,293 A | 8/1982 | Fetzer |
| 4,469,945 A | 9/1984 | Hoeberechts et al. |
| 4,524,276 A | 6/1985 | Ohtombe |
| 4,565,761 A | 1/1986 | Katagiri et al. |
| 4,584,704 A | 4/1986 | Ferren |
| 4,593,187 A | 6/1986 | Grotts et al. |
| 4,603,258 A | 7/1986 | Sher et al. |
| 4,647,193 A | 3/1987 | Rosenfeld |
| 4,675,535 A | 6/1987 | Tsunekawa et al. |
| 4,694,172 A | 9/1987 | Powell et al. |
| 4,760,004 A | 7/1988 | Rochat et al. |
| 4,760,151 A | 7/1988 | Rochat et al. |
| 4,767,211 A | 8/1988 | Munakata et al. |
| 4,773,751 A | 9/1988 | Matsuda et al. |
| 4,927,721 A | 5/1990 | Gratzel et al. |
| 4,952,472 A | 8/1990 | Baranyi et al. |
| 5,082,363 A | 1/1992 | Nakanishi et al. |
| 5,216,476 A | 6/1993 | Lanckton |
| 5,227,985 A * | 7/1993 | DeMenthon ............ G01S 5/163 345/158 |
| 5,350,644 A | 9/1994 | Graetzel et al. |
| 5,355,241 A | 10/1994 | Kelley |
| 5,375,008 A | 12/1994 | Guerreri |
| 5,589,928 A | 12/1996 | Babbitt et al. |
| 5,856,844 A | 1/1999 | Batterman et al. |
| 6,229,913 B1 | 5/2001 | Nayar et al. |
| 6,266,142 B1 | 7/2001 | Junkins et al. |
| 6,359,211 B1 | 3/2002 | Spitler et al. |
| 6,417,836 B1 * | 7/2002 | Kumar .................. G06F 3/0325 345/156 |
| 6,512,233 B1 | 1/2003 | Sato et al. |
| 6,930,297 B1 | 8/2005 | Nakamura |
| 6,995,445 B2 | 2/2006 | Forrest et al. |
| 7,022,966 B2 | 4/2006 | Gonzo et al. |
| 7,049,601 B2 | 5/2006 | Agano |
| 7,196,317 B1 | 3/2007 | Meissner, II et al. |
| 7,247,851 B2 | 7/2007 | Okada et al. |
| 7,301,608 B1 | 11/2007 | Mendenhall et al. |
| 7,417,716 B2 | 8/2008 | Nagasaka et al. |
| 7,626,569 B2 | 12/2009 | Lanier |
| 7,677,742 B2 | 3/2010 | Hillmer et al. |
| 7,768,498 B2 * | 8/2010 | Wey ...................... G06F 3/0325 345/156 |
| 7,773,070 B2 | 8/2010 | Trisnadi et al. |
| 8,013,901 B2 | 9/2011 | Fukuhara et al. |
| 8,019,166 B2 | 9/2011 | Cheng et al. |
| 8,107,056 B1 | 1/2012 | Riza |
| 8,144,173 B2 | 3/2012 | Baba |
| 8,228,299 B1 | 7/2012 | Maloney et al. |
| 8,231,809 B2 | 7/2012 | Pschirer et al. |
| 8,345,003 B1 | 1/2013 | Trisnadi et al. |
| 8,363,526 B2 | 1/2013 | Hotta et al. |
| 8,390,793 B2 | 3/2013 | Yamaguchi et al. |
| 8,411,289 B2 | 4/2013 | Takahashi |
| 8,477,580 B2 | 7/2013 | Yamamoto et al. |
| 8,563,855 B2 | 10/2013 | Pschirer et al. |
| 8,593,565 B2 | 11/2013 | Shuster |
| 8,902,354 B2 | 12/2014 | Shuster |
| 8,908,157 B2 | 12/2014 | Eisele et al. |
| 9,104,910 B2 | 8/2015 | Huang |
| 9,385,326 B2 | 7/2016 | Wonneberger et al. |
| 9,389,315 B2 | 7/2016 | Bruder et al. |
| 9,428,518 B2 | 8/2016 | Onneberger et al. |
| 9,557,856 B2 | 1/2017 | Send et al. |
| 9,665,182 B2 | 5/2017 | Send et al. |
| 9,741,954 B2 | 8/2017 | Bruder et al. |
| 9,829,564 B2 | 11/2017 | Bruder et al. |
| 9,919,999 B2 | 3/2018 | Koenemann et al. |
| 9,958,535 B2 | 5/2018 | Send et al. |
| 9,989,623 B2 | 6/2018 | Send et al. |
| 10,012,532 B2 | 7/2018 | Send et al. |
| 10,120,078 B2 | 11/2018 | Bruder et al. |
| 2001/0025938 A1 | 10/2001 | Imai |
| 2002/0011576 A1 | 1/2002 | Cho et al. |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0190117 A1 | 9/2004 | Kubaink |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0122308 A1 | 6/2005 | Bell et al. |
| 2005/0184301 A1 | 8/2005 | Nagasaka et al. |
| 2005/0217720 A1 | 10/2005 | Rey-Mermet et al. |
| 2005/0268957 A1 | 12/2005 | Enomoto et al. |
| 2005/0269616 A1 | 12/2005 | Andriessen |
| 2006/0026916 A1 | 2/2006 | Poupart |
| 2006/0049397 A1 | 3/2006 | Pfeiffer et al. |
| 2006/0082546 A1 * | 4/2006 | Wey ...................... G06F 3/0346 345/156 |
| 2007/0008515 A1 | 1/2007 | Otani et al. |
| 2007/0010924 A1 | 1/2007 | Otani et al. |
| 2007/0046625 A1 | 3/2007 | Yee |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2007/0206181 A1 | 9/2007 | Arenberg et al. |
| 2008/0080789 A1 | 4/2008 | Marks |
| 2008/0157965 A1 | 7/2008 | Shahar |
| 2008/0259310 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |

(56) References Cited

U.S. PATENT DOCUMENTS

| | | |
|---|---|---|
| 2009/0322677 A1 | 12/2009 | Lee et al. |
| 2010/0073462 A1 | 3/2010 | Lee et al. |
| 2010/0091263 A1 | 4/2010 | Kumagai et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0122287 A1 | 5/2011 | Kunishige et al. |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0162410 A1 | 6/2012 | Vaillant |
| 2012/0206336 A1 | 8/2012 | Bruder |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2012/0293651 A1 | 11/2012 | Kawamata et al. |
| 2013/0033579 A1 | 2/2013 | Wajs |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0271818 A1 | 10/2013 | Maxik et al. |
| 2014/0015242 A1 | 1/2014 | Forrest |
| 2014/0043610 A1 | 2/2014 | Engel et al. |
| 2014/0066656 A1 | 3/2014 | Bruder et al. |
| 2014/0078376 A1 | 3/2014 | Shuster |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1 | 10/2014 | Bruder et al. |
| 2014/0347442 A1 | 11/2014 | Wang et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0248021 A1 | 8/2016 | Sundarraj et al. |
| 2016/0266257 A1 | 9/2016 | Bruder et al. |
| 2016/0364015 A1 | 12/2016 | Send et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0067213 A1 | 3/2018 | Send et al. |
| 2018/0136319 A1 | 5/2018 | Send et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0249051 A1 | 8/2018 | Send et al. |

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 103106411 A | 5/2013 |
| CN | 103322910 A | 9/2013 |
| CN | 103492835 | 1/2014 |
| CN | 103649677 | 3/2014 |
| DE | 2 417 854 A1 | 10/1974 |
| DE | 25 01 124 A1 | 8/1975 |
| DE | 32 25 372 A1 | 2/1983 |
| DE | 196 04 856 | 8/1997 |
| DE | 10146752 | 4/2002 |
| DE | 10 2005 043 627 A1 | 3/2007 |
| DE | 10 2005 053 995 A1 | 5/2007 |
| DE | 10 2007 037 875 A1 | 2/2009 |
| DE | 10 2010 042 278 | 4/2012 |
| DE | 10 2014 108 353 A1 | 12/2014 |
| EP | 0 112 169 A2 | 6/1984 |
| EP | 0 185 450 A2 | 6/1986 |
| EP | 0 754 930 A2 | 1/1997 |
| EP | 1 176 646 A1 | 1/2002 |
| EP | 1 191 819 A2 | 3/2002 |
| EP | 1 191 819 A3 | 3/2002 |
| EP | 1 330 117 A2 | 7/2003 |
| EP | 1 330 117 A3 | 7/2003 |
| EP | 1 373 272 | 1/2004 |
| EP | 1 667 246 A1 | 6/2006 |
| EP | 1 832 910 | 9/2007 |
| EP | 2 205 657 | 7/2010 |
| EP | 2 220 141 | 8/2010 |
| EP | 2 507 286 | 10/2012 |
| EP | 2 527 866 A1 | 11/2012 |
| EP | 2 725 617 A1 | 4/2014 |
| EP | 2 813 324 | 12/2014 |
| EP | 2 818 493 A1 | 12/2014 |
| EP | 15 153 215 | 1/2015 |
| EP | 2 831 180 | 2/2015 |

(56) References Cited

FOREIGN PATENT DOCUMENTS

| | | |
|---|---|---|
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| GB | 2 432 723 A | 5/2007 |
| JP | S59-50579 | 3/1984 |
| JP | 59-79805 | 5/1984 |
| JP | 61-89501 | 5/1986 |
| JP | S61-135280 | 6/1986 |
| JP | 61-186804 | 8/1986 |
| JP | H02-170004 | 6/1990 |
| JP | 5-48833 A | 2/1993 |
| JP | 05-240640 | 9/1993 |
| JP | 6-133321 | 5/1994 |
| JP | 7-146113 | 6/1995 |
| JP | 8-159714 A | 6/1996 |
| JP | 8-292586 A | 11/1996 |
| JP | 10-26513 A | 1/1998 |
| JP | 10-221064 A | 8/1998 |
| JP | H11-2308860 | 8/1999 |
| JP | 11-257917 | 9/1999 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-189037 | 7/2005 |
| JP | 2005-241340 A | 9/2005 |
| JP | 2005-296268 | 10/2005 |
| JP | 2007-521559 | 8/2007 |
| JP | 2007-530978 | 11/2007 |
| JP | 2008-522418 | 6/2008 |
| JP | 2009-257890 | 11/2009 |
| JP | 2010-081002 | 4/2010 |
| JP | 2010-218770 | 9/2010 |
| JP | 2010-531520 | 9/2010 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | WO 99/09603 A1 | 2/1999 |
| WO | WO 01/29576 A1 | 4/2001 |
| WO | WO 02/076988 | 10/2002 |
| WO | WO 02/101838 A1 | 12/2002 |
| WO | 03/012371 A1 | 2/2003 |
| WO | WO 03/098617 | 11/2003 |
| WO | WO 2004/114112 A1 | 12/2004 |
| WO | WO 2005/106965 A1 | 11/2005 |
| WO | WO 2007/006717 | 1/2007 |
| WO | WO 2007/054470 A1 | 5/2007 |
| WO | WO 2008/122531 | 10/2008 |
| WO | WO 2008/145172 | 12/2008 |
| WO | WO 2009/013282 A1 | 1/2009 |
| WO | WO 2009/021859 | 2/2009 |
| WO | WO 2009/053291 A1 | 4/2009 |
| WO | WO 2009/058115 A1 | 5/2009 |
| WO | WO 2009/105801 | 9/2009 |
| WO | WO 2010/088032 A2 | 8/2010 |
| WO | WO 2010/094636 A1 | 8/2010 |
| WO | WO 2010/118409 | 10/2010 |
| WO | WO 2010/118450 | 10/2010 |
| WO | WO 2011/067192 A2 | 6/2011 |
| WO | WO 2011/083722 | 7/2011 |
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | 2012-110924 | 8/2012 |
| WO | WO 2012/110924 A1 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | WO 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | 2014/178923 A2 | 11/2014 |
| WO | 2014/198623 A1 | 12/2014 |
| WO | 2014/198625 A1 | 12/2014 |
| WO | 2014/198626 A1 | 12/2014 |
| WO | 2014/198629 A1 | 12/2014 |
| WO | 2015/024871 A1 | 2/2015 |
| WO | WO 2015/081362 | 6/2015 |
| WO | WO 2015/091607 | 6/2015 |
| WO | WO 2015/159192 | 10/2015 |
| WO | WO 2015/161989 | 10/2015 |
| WO | WO 2015/162528 | 10/2015 |
| WO | WO 2015/177784 A2 | 11/2015 |
| WO | 2015/193804 A2 | 12/2015 |
| WO | 2016/005893 A1 | 1/2016 |
| WO | 2016/051323 A1 | 4/2016 |
| WO | 2016/092449 A1 | 6/2016 |
| WO | 2016/092454 A1 | 6/2016 |
| WO | WO 2016/083914 | 6/2016 |
| WO | WO 2016/146725 | 9/2016 |

OTHER PUBLICATIONS

International Search Report and Written Opinion dated Mar. 29, 2016, in PCT/IB2015/054536, filed Jun. 16, 2015.

Baeg et al., "Organic Light Detectors: Photodiodes and Phototransistors", Advanced Materials, vol. 25, No. 31, Mar. 11, 2013, pp. 4267-4295.

Office Action dated Jan. 3, 2018, in Chinese Patent Application No. 201610552144.7 parallel to U.S. Appl. No. 15/364,680.

International Search Report dated Sep. 9, 2014 in PCT/EP2014/061688 filed Jun. 5, 2014.

Written Opinion of the International Searching Authority dated Sep. 9, 2014 in PCT/EP2014/061688 filed Jun. 5, 2014.

Office Action dated Apr. 22, 2015 in Chinese Patent Application No. 201280018328.5.

International Search Report and Written Opinion dated May 16, 2014 in PCT/IB2013/061095.

International Search Report and Written Opinion dated Oct. 31, 2014 in PCT/EP2014/067466.

International Search Report dated Sep. 24, 2014 in PCT/EP2014/061682.

International Preliminary Report on Patentability and Written Opinion dated Dec. 15, 2015 in PCT/EP2014/061682.

International Preliminary Report on Patentability and Written Opinion dated Dec. 23, 2015 in PCT/EP2014/061695.

International Search Report and Written Opinion dated May 31, 2012 in PCT/IB2012/050592 filed on Feb. 9, 2012.

International Search Report dated Aug. 28, 2015, in PCT/IB32015/052769, filed Apr. 16, 2015.

International Search Report and Written Opinion dated Jun. 30, 2015 in PCT/IB15/052233 Filed Mar. 26, 2015.

(56) References Cited

OTHER PUBLICATIONS

International Search Report dated Sep. 22, 2015, in Application No. PCT/IB2015/052785, filed on Apr. 16, 2015.
U.S. Appl. No. 13/357,206, filed Jan. 24, 2012, U.S. Pat. No. 9,001,029, Bruder, et al.
U.S. Appl. No. 14/460,529, filed Aug. 15, 2014, Send, et al.
U.S. Appl. No. 14/460,540, filed Aug. 15, 2014, US 2015-0276340, Send, et al.
U.S. Appl. No. 14/598,432, filed Jan. 16, 2015, US 2015-0124268, Bruder, et al.
U.S. Appl. No. 14/787,909, filed Oct. 29, 2015, US 2016-0099429, Bruder, et al.
U.S. Appl. No. 14/897,467, filed Dec. 10, 2015, US 2016-0139243, Send, et al.
U.S. Appl. No. 14/896,958, filed Dec. 9, 2015, US 2016-0127664, Bruder, et al.
U.S. Appl. No. 15/099,717, filed Apr. 15, 2016, Bruder, et al.
R. M. Schaffert, "A New High-Sensitivity Organic Photoconductor for Electrophotography", IBM J. Res. Develop., 1971, p. 75-89.
P. Gregory, Ed., *Chemistry and Technology of printing and imaging systems*, Chapman & Hall, 1996, Chap. 4, R.S. Gairns, *Electrophotography*, p. 76-112.
International Search Report and Written Opinion dated Sep. 3, 2014 in PCT/EP2014/061691.
International Preliminary Report on Patentability dated Sep. 25, 2015 in PCT/EP2014/061691.
Supplementary European Search Report dated Nov. 19, 2014 in Patent Application No. 12746808.0.
International Search Report and Written Opinion dated May 31, 2012 in PCT/IB2012/050592.
Extended European Search Report dated Aug. 23, 2011 in Patent Application No. 11154531.5 (with English Translation of Category of Cited Documents).
International Preliminary Report on Patentability and Written Opinion dated Dec. 23, 2015 in PCT/EP2014/061688.
International Search Report dated Sep. 8, 2014 in PCT/EP2014/061688.
International Search Report and Written Opinion dated Nov. 21, 2014 in PCT/EP2014/067465.
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.
Qinglan Huang, et al., "Molecularly 'Engineered' Anode Adsorbates for Probing OLED Interfacial Structure-Charge Injection/Luminance Relationships: Large, Structure-Dependent Effects", J. Am. Chem. Soc., vol. 125, 2003. pp. 14704-14705.
A. Balionyte, et at, "Carbazolyl-substituted triphenyldiamine derivatives as novel photoconductive amorphous molecular materials", Journal of Photochemistry and Photobiology A: Chemistry, vol. 162, 2004, pp. 249-252.
G. R. A. Kumara. et at, "Fabrication of Dye-Sensitized Solar Cells Using Triethylamine Hydrothiocyanate as a Cui Crystal Growth Inhibitor", Langmuir, vol. 18., 2002, pp. 10493-10495.

Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact TiO2 solar cells", Coordination Chemistry Reviews, vol. 248, 2004, pp. 1479-1489.
Jiun Yi Shen, et al., "High Tg blue emitting materials for electroluminescent devices", J. Mater. Chem., vol. 15, 2005, pp. 2455-2463.
Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous TiO2 solar cells with high photon-to-electron conversion efficiencies", Nature, vol. 395, 1998, pp. 583-585.
John P. Wolfe, et at, "Rational Development of Practical Catalysts for Aromatic Carbon-Nitrogen Bond Formation", Acc. Chem. Res. vol. 31, 1998, pp. 805-818.
Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal TiO2 films", Letters to Nature, vol. 353, 1991, pp. 737-740.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
Atte Haapalinna, et al., "Measurement of the Absolute Linearity of Photodetectors with a Diode Laser," Meas. Sci. Technol., vol. 10, (1999) 1075-1078.
M. R. Andersen, et al., "Kinect Depth Sensor Evaluation for Computer Vision Applications", Electrical and Computer Engineering, Technical Report ECE-TR-6, Aarhus University, 2012. 39 pages.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462.
Takumi Kinoshita, et al., "Wideband dye-sensitized solar cells employing a phosphine-coordinated ruthenium sensitizer", Nature Photonics, vol. 7, 2013, pp. 535-539.
Seigo Ito, et al., "High-Efficiency Organic-Dye-Sensitized Solar Cells Controlled by Nanocrystalline-TiO2 Electrode Thickness", Adv. Mater., vol. 18, 2006, pp. 1202-1205.
Volker Viereck, et al., "Large-area applications of optical MEMS: micromirror arrays guide daylight, optimize indoor illumination" Optical Components. Photonik International 2. 2009, pp. 48-49.
C.U. Murade, et al., "High speed adaptive liquid microlens array", Optics Express, vol. 20, No. 16, Jul. 2012, pp. 18180-18187.

(56) References Cited

OTHER PUBLICATIONS

Jason Heikenfeld. et al., "Recent Progress in Arrayed Electrowetting Optics", Optics & Photonics News. Jan. 2009, 7 pages, www.osa-opn.org
Tao Peng, "Algorithms and models for 3-D shape measurement using digital fringe projections", Dissertation, University of AY Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).
Jie-Ci Yang, et al., "An Intelligent Automated Door Control System Based on a Smart Camera", Sensors, 2013. 13(5), pp. 5923-5936.
"So funktioniert die DLP-Technologie" DLP-Technologie—www.dlp.com/de/technology/how-dlp-works, 2014, 2 Pages.
"NEW—Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, 8 pages.
Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.
International Search Report and Written Opinion of the International Searching Authority dated Mar. 12, 2015 in PCT/EP2014/078155 Filed Dec. 17, 2014.
Kuthirumal, S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.
U.S. Appl. No. 15/744,334, filed Jan. 12, 2018, Send, et al.
U.S. Appl. No. 15/324,223, filed Jan. 5, 2017, Send, et al.
U.S. Appl. No. 15/319,156, filed Dec. 15, 2016, Send, et al.
U.S. Appl. No. 15/367,213, filed Dec. 2, 2016, Send, et al.
U.S. Appl. No. 15/364,380, filed Nov. 30, 2016, Bruder, et al.
International Search Report and Written Opinion dated Jan. 16, 2016 in PCT/IB2015/057412 filed Sep. 28, 2015.
Bahaa E. A. Saleh, et al., "Fundamentals of Photonics" John Wiley & Sons, Inc., Chapter 3, 1991, pp. 80-107 (with Cover Page).
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for Hich-Efficiency Organic Solar Cells", Progress in Polymer Science, vol. 37, 2012, pp. 1292-1331.
Antonio Facchetti, "Polymer donor-polymer acceptor (all-polymer) solar cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.

Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physics Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L. Thomas, "Phthalocyanine Research and Applications", CRC Press, 1990, pp. 253-271 with cover pages.
Office Action dated Mar. 5, 2018, in corresponding Chinese Patent Application No. 201450056299.0.
International Preliminary Report on Patentability and Written Opinion dated Feb. 22, 2018 in PCT/EP2016/069049).
Wang, Feng-Peng et al., "Distance Measurement using Digital Cameras Based on Laser Spot Detection", published on Jun. 30, 2011, School of Physics and Electronic Information, Gannan Normal University, Ganzhou 341000, China (with English Abstract).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofiuidic devices", Microfluid Nanofluid, 2008, vol. 4, pp. 97-105.
International Search Report and Written Opinion dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Search Report dated Mar. 22, 2016 in PCT/IB2015/059408 filed Dec. 7, 2015.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard pleoptic video camera," Proc. SPIE 9023, in Digital Photography X, 902305 (Mar. 7, 2014).
U.S. Appl. No. 15/751,283, filed Feb. 8, 2018, Send, et al.
U.S. Appl. No. 15/758,135, filed Mar. 7, 2018, Send, et al.
U.S. Appl. No. 15/775,424, filed May 11, 2018, Send, et al.
U.S. Appl. No. 15/778,454, filed May 233, 2018, Send, et al.
U.S. Appl. No. 15/960,581, filed Apr. 24, 2018, Send, et al.
U.S. Appl. No. 15/301,112, filed Sep. 30, 2016, Send, et al.
U.S. Appl. No. 15/304,328, filed Oct. 14, 2016, Send, et al.
U.S. Appl. No. 15/305379, filed Oct. 20, 2016, Send, et al.
International Search Report and Written Opinion dated Nov. 17, 2016, in PCT/EP2016/071628, filed Sep. 14, 2016.
"Telezentrisches Objektiv" Retrieved from the Internet: https://de.wikipedia.org/wiki/Telezentrisches_Objektiv. Date of retrieval: Sep.

(56) References Cited

OTHER PUBLICATIONS 11, 2015, 3 Pages. (Cited on p. 53, line No. 40 in the Specification of related case in U.S. Appl. No. 15/758,135).
Benjamin F. Grewe, et al., "Fast Two-Layer Two-Photon Imaging of Neuronal Cell Populations Using an Electrically Tunable Lens," *Biomedical Optics Express*, vol. 2, No. 7, Jul. 1, 2011 (pp. 2035-2046).
U.S. Appl. No. 15/514,830, filed Mar. 28, 2017, Send, et al.
U.S. Appl. No. 15/492,007, filed Apr. 20, 2017, Send, et al.
U.S. Appl. No. 15/105,489, filed Jun. 16, 2016, Send, et al.
International Search Report and Written Opinion dated May 27, 2016, in PCl/EP2016/051817, filed Jan. 28, 2016.
Office Action dated Jul. 9, 2018, in Japanese Patent Application No. 2017-007544.
Xing Lin, et al., "Coded focal stack photography", Computational Photography (ICCP), 2013 IEEE International Conference On, Apr. 19, 2013, XP032424246, pp. 1-9.
Nabeel A. Riza, et al., "Noncontact distance sensor using spatial signal processing", Optics Letters, Optical Society of America, vol. 34, No. 4, Feb. 15, 2009. XP001522006, pp. 434-436.
Nabeel A. Riza, et al., "Smart agile lens remote optical sensor for three-dimensional object shape measurements", Applied Optics, Optical Society of America, vol. 49, No. 7, Mar. 1. 2010. XP001552714, pp. 1139-1150.
U.S. Appl. No. 16/090,990, filed Oct. 3, 2018, Valouch, et al.
U.S. Appl. No. 16/091,409, filed Oct. 4, 2018, Send, et al.
Petr Bartu et al, "Conformable Large-AreaPposition-Sensitive Photodetectors Based on Luminescence-Collecting Silicone Waveguides," *Journal of Applied Physics*, 107, 123101 (2010).
Roland Stolarski, "Fluorescent Naphthalimide Dyes for Polyester Fibres," *Fibres & Textiles* in Eastern Europe, vol. 17, No. 2 (73) pp. 91-95 (2009).
Ayse Aktas et al., "Synthesis, Characterization, Electrochemical and Spectroelectrochemical Properties of Peripherally Tetra-Substituted Metal-Free and Metallophthalocyanines," *Dyes and Pigments*, 99, (2013) 613-619.
Hairong Li, et al., "Syntheses and Properties of Octa-, Tetra-, and Di- Hydroxy-Substituted Phthalocyanines," *Tetrahedron*, 65 (2009) 3357-3363.
"Methine Dyes and Pigments," *Ullmann's Encyclopedia of Industrial Chemistry*, vol. 23 (2012).
Jing Liu, et al., "Sulfone-Rhodamines: A New Class of Near-Infrared Fluorescent Dyes for Bioimagin," *ACS Applied Materials & Interfaces*, 8, 22953-22962 (2016).
E. Noelting et al., "Berichte der deutschen chemischen Gesellschaft", *Band*, 38, S. 3516-3527 (1905).
T. Nedelcev et al., "Preparation and Characterization of a New Derivative of Rhodamine B with an Alkoxysilane Moiety," *Dyes and Pigments*, 76 (2008), 550-556.

Aurore Loudet et al., "BODIPY Dyes and Their Derivatives: Syntheses and Spectroscopic Properties," *Chem.Rev.*, 107 (2007) 4981-4932.
Weili Zhao, et al., "Conformationaily Restricted Aza-Bodipy: A Highly fluorescent, Stable, Near-infrared-Absorbing Dye", *Angew. Chem. Int. Ed.*, 44 (2005) 1677-1679.
Georg M. Fischer, et al., "Near-Infrared Dyes and Fluorophores Based on Diketopyrrolopyrroles," *Angew Chem. Int. Ed.* 46 (2007) 3750-3753.
Amaresh Mishra et al., "Small Molecule Organic Semiconductors on the Move: Promises for Future Solar Energy Technology," *Angew. Chem. Int. Ed.*, 51, (2012), 2020-2067.
G. Seybold et al., "New Perylene and Violanthrone Dyestuffs for Fluorescent Collectors," *Dyes and Pigments*, 11 (1989) 303-317.
Nam-Trung Nguyen, "Micro-Optofluidic Lenses: A Review", *Biomicrofluidics*, 4, (2010) 031501.
Uriel Levy et al., "Tunable Optofluidic Devices," *Microfluid Nanofluid* (2008) 4: 97-105.
Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.
U.S. Appl. No. 16/094,402, filed Oct. 17, 2018, Valouch, et al.
U.S. Appl. No. 16/095,846, filed Oct. 23, 2018, Valouch, et al.
U.S. Appl. No. 16/096,361, filed Oct. 25, 2018, Valouch et al.
Street (Ed.): Technology and Applications of Amorphous Silicon, Springer-Verlag Heidelberg, 2010. pp. 346-349.
International Search Report dated Aug. 17, 2017, in corresponding PCT/EP2017/060057.
International Search Report dated Aug. 1, 2017, in corresponding PCT/EP2017/060058.
Walter Fuhs, "Hydrogenated Amorphous Silicon—Material Properties and Device Applications", in S. Baranovski, Charge Transport in Disordered Solids, Wiley, p. 97-147, 2006.
U.S. Appl. No. 15/309,631, filed Nov. 8, 2016, US 2017-0183295, Koenemann, et al.
U.S. Appl. No. 14/907,100, filed Jan. 22, 2016, US 2016-0155575, Yamato et al.
U.S. Appl. No. 14/758,349, filed Jun. 29, 2015, U.S. Pat. No. 9,385,326, Wonneberger, et al.
U.S. Appl. No. 14/772,488, filed Sep. 3, 2015, U.S. Pat. No. 9,428,518, Wonneberger, et al.
U.S. Appl. No. 14/913,817, filed Feb. 23, 2016, US 2016-0248021, Sundarraj, et al.
U.S. Appl. No. 14/916,523, filed Mar. 3, 2016, US 2016-0218302, Hermes, et al.
U.S. Appl. No. 14/913,860, filed Feb. 23, 2016, US 2016-0211464, Tanabe, et al.
U.S. Appl. No. 14/910,078, filed Feb. 24, 2016, US 2016-0177177, Koenemann, et al.
U.S. Appl. No. 15/587,420, filed May 5, 2017, Bruder, et al.
U.S. Appl. No. 15/547,664, filed Jul. 31, 2017, Valouch, et al.

\* cited by examiner

DETECTOR FOR OPTICALLY DETECTING AN ORIENTATION OF AT LEAST ONE OBJECT

FIELD OF THE INVENTION

The invention relates to a detector device and a method for determining an orientation of at least one object. The invention further relates to a detector system, comprising the detector device and the at least one object. Further, the invention relates to a human-machine interface for exchanging at least one item of information between a user and a machine, an entertainment device, a tracking system and various uses of the detector device. The devices, methods and uses according to the present invention specifically may be employed for example in various areas of daily life, gaming, traffic technology, manufacturing technology, security technology, medical technology or in the sciences. However, other applications are also possible.

PRIOR ART

A large number of optical sensors and photovoltaic devices are known from the prior art. While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness.

A large number of optical sensors which can be based generally on the use of inorganic and/or organic sensor materials are known from the prior art. Examples of such sensors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, sensors comprising at least one organic sensor material are being used, as described for example in US 2007/0176165 A1. In particular, so-called dye solar cells are increasingly of importance here, which are described generally, for example in WO 2009/013282 A1.

A large number of detectors for detecting at least one object are known on the basis of such optical sensors. Such detectors can be embodied in diverse ways, depending on the respective purpose of use. Examples of such detectors are imaging devices, for example, cameras and/or microscopes. High-resolution confocal microscopes are known, for example, which can be used in particular in the field of medical technology and biology in order to examine biological samples with high optical resolution. Further examples of detectors for optically detecting at least one object are distance measuring devices based, for example, on propagation time methods of corresponding optical signals, for example laser pulses. Further examples of detectors for optically detecting objects are triangulation systems, by means of which distance measurements can likewise be carried out.

In WO 2012/110924 A1, the content of which is herewith included by reference, a detector for optically detecting at least one object is proposed. The detector comprises at least one optical sensor. The optical sensor has at least one sensor region. The optical sensor is designed to generate at least one sensor signal in a manner dependent on an illumination of the sensor region. The sensor signal, given the same total power of the illumination, is dependent on a geometry of the illumination, in particular on a beam cross section of the illumination on the sensor area. The detector furthermore has at least one evaluation device. The evaluation device is designed to generate at least one item of geometrical information from the sensor signal, in particular at least one item of geometrical information about the illumination and/or the object.

U.S. provisional applications 61/739,173, filed on Dec. 19, 2012, and 61/749,964, filed on Jan. 8, 2013 and 61/867,169, filed on Aug. 19, 2013, PCT application number PCT/IB2013/061095, filed on Dec. 18, 2013, and U.S. patent application Ser. No. 14/132,570, filed on Dec. 18, 2013, the full content of all of which is herewith included by reference, disclose a method and a detector for determining a position of at least one object, by using at least one transversal optical sensor and at least one longitudinal optical sensor. Specifically, the use of sensor stacks is disclosed, in order to determine a longitudinal position of the object with a high degree of accuracy and without ambiguity.

Despite the advantages implied by the above-mentioned devices and detectors, specifically by the detectors disclosed in WO 2012/110924 A1, U.S. 61/739,173 and 61/749,964, several technical challenges remain. Thus, even though the position of an object may be determined with high accuracy, many applications additionally require information on an orientation of the object in space, specifically for objects having a prominent shape.

Problem Addressed by the Invention

It is therefore an object of the present invention to provide devices and methods facing the above-mentioned technical challenges of known devices and methods. Specifically, it is an object of the present invention to provide devices and methods which reliably may determine an orientation of an object in space, preferably at a low technical effort and with low requirements in terms of technical resources and cost.

SUMMARY OF THE INVENTION

This problem is solved by the invention with the features of the independent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a detector device for determining an orientation of at least one object is disclosed, the detector device comprising
  at least two beacon devices, the beacon devices being adapted to be at least one of attached to the object, held by the object and integrated into the object, the beacon devices each being adapted to direct light beams towards a detector, the beacon devices having predetermined coordinates in a coordinate system of the object;
  at least one detector adapted to detect the light beams traveling from the beacon devices towards the detector;
  at least one evaluation device, the evaluation device being adapted to determine longitudinal coordinates of each of the beacon devices in a coordinate system of the detector, the evaluation device being further adapted to determine an orientation of the object in the coordinate system of the detector by using the longitudinal coordinates of the beacon devices.

In case the object is a rigid object, two or more beacon devices may be used. In case the object is an at least partially flexible object which may change its shape, preferably three or more beacon devices are used.

The evaluation device may be adapted to determine an absolute position of at least one point of the object in the coordinate system of the detector.

The detector device may comprise two, three or more than three beacon devices.

The detector may be adapted to further determine at least one transversal coordinate for at least one of the beacon devices. The evaluation device may further be adapted to determine the orientation of the object in the coordinate system by further using the at least one transversal coordinate. In an embodiment, the evaluation device may be adapted to determine at least one transversal coordinate, preferably two transversal coordinates, for each of the beacon devices.

Each of the beacon devices may independently be selected from the group consisting of: a self-emissive beacon device having at least one illumination source adapted to emit light; a passive beacon device having at least one reflector adapted to reflect light.

The beacon devices may be adapted such that the light beams traveling from the beacon devices towards the detector are mutually distinguishable. Thus, the light beam generated or reflected by one of the beacon devices may differ with regard to at least one property from every other light beam generated or reflected by the other beacon devices. The light beams may specifically be mutually distinguishable with regard to at least one property selected from the group consisting of a spectral property, a color, a modulation frequency, a modulation amplitude, a pulse width, a duty cycle, a phase.

The detector device, specifically the detector and/or evaluation device, may be adapted to distinguish the light beams originating from the beacon devices and to assign each light beam to its respective beacon device. Thus, as an example, by detecting the respective property, the detector and/or the evaluation device may be adapted to determine that the light beam is emitted by a specific beacon device out of the at least two beacon devices, since it may be known and/or predetermined that the respective beacon device emits and/or reflects light having the respective property. As an example, a first one of the beacon devices may be adapted to emit and/or reflect light beams at a first predetermined color and/or at a first modulation frequency, whereas a second one of the beacon devices may be adapted to emit and/or reflect light beams at a second predetermined color being different from the first predetermined color and/or at a second modulation frequency being different from the first modulation frequency, thereby allowing for the detector device to distinguish between the light beams and to assign the light beams to their respective beacon devices.

The beacon devices may be adapted to direct the Light beams towards the detector simultaneously or at different points in time, such as intermittently. Simultaneously directed light beams may be distinguished, as pointed out above, by using one or more different properties indicating a specific beacon device as an origin of the respective light beam. In case the light beams are directed towards the detector at different points in time, such as intermittently, a time schedule may be used for detecting a specific beacon device as the origin of the respective light beam.

The coordinate system of the object generally is a coordinate system having at least one point, preferably an origin of the coordinate system, attached to at least one point of the object. Thus, preferably, the coordinate system of the object moves and/or rotates with the object. Similarly, the coordinate system of the detector is a coordinate system having at least one point, preferably an origin of the coordinate system, attached to at least one point of the detector. Generally, the coordinate systems preferably may be Cartesian coordinate systems. Additionally or alternatively, however, other types of coordinate systems may be used, such as polar coordinate systems and/or spherical coordinate systems.

The orientation of the object preferably may be provided by using one or more orientation angles. As the skilled person will recognize, several systems are known in the art for determining an orientation of an object, such as in the art of gyroscopes. Specifically, the evaluation device may be adapted to determine the orientation of the object by providing at least two orientation angles. Preferably, the evaluation device may be adapted to determine the orientation of the object by providing at least two or at least three orientation angles.

As an example for orientation angles generally known in the art, the evaluation device may be adapted to determine the orientation of the object by providing at least one angle combination selected from the group consisting of: a yaw angle ($\psi$) and a pitch angle ($\Theta$); a yaw angle ($\psi$), a pitch angle ($\Theta$) and a roll angle ($\varphi$); Euler angles. Examples will be given in further detail below, The detector device may comprise:
at least one longitudinal optical sensor, wherein the longitudinal optical sensor has at least one sensor region, wherein the longitudinal optical sensor is designed to generate longitudinal sensor signals in a manner dependent on an illumination of the sensor region by the light beams, wherein the longitudinal sensor signals, given the same total power of the illumination, are dependent on a beam cross-section of the light beams in the sensor region.

The evaluation device may be designed to determine the longitudinal coordinates of the beacon devices by evaluating the longitudinal sensor signals.

The longitudinal optical sensor may be a transparent optical sensor. Other embodiments are possible.

The longitudinal optical sensor may comprise at least one dye-sensitized solar cell. Other embodiments are possible.

The longitudinal optical sensor may comprise at least one first electrode, at least one n-semiconducting metal oxide, at least one dye, at least one p-semiconducting organic material, preferably a solid p-semiconducting organic material, and at least one second electrode.

The first electrode, the second electrode or both the first electrode and the second electrode may be transparent. Other embodiments are possible.

The evaluation device may be designed to determine the longitudinal coordinates of the beacon devices from at least one predefined relationship between the geometry of the illumination and a relative positioning of the respective beacon device with respect to the detector.

The detector may have a plurality of the longitudinal optical sensors. Specifically, the longitudinal optical sensors may be stacked, thereby preferably forming a longitudinal optical sensor stack. The longitudinal optical sensors may be arranged such that a light beam traveling from at least one of the beacon devices to the detector illuminates all longitudinal optical sensors. The at least one longitudinal sensor signal may be generated by each longitudinal optical sensor. The evaluation device may be adapted to normalize the longitudinal sensor signals and to generate the at least one longitudinal coordinate of the respective beacon device independent from an intensity of the light beam, at least for intensities>0.

The evaluation device may be adapted to determine the longitudinal coordinate of each beacon device by determining a diameter of the respective light beam from the at least one longitudinal sensor signal. Thus, the evaluation device may be adapted to compare the diameter of the light beam with known beam properties of the light beam in order to determine the longitudinal coordinate. As will be outlined in further detail below, the known beam properties of the light beam specifically may be Gaussian properties, such as a known relationship between a longitudinal coordinate and the beam waist of the light beam.

The longitudinal optical sensor may furthermore be designed in such a way that the longitudinal sensor signal, given the same total power of the illumination, is dependent on a modulation frequency of a modulation of the illumination. Examples will be given in further detail below.

The detector may further comprise:
  at least one transversal optical sensor, the transversal optical sensor being adapted to determine a transversal position of the light beams, the transversal position being a position in at least one dimension perpendicular an optical axis of the detector, the transversal optical sensor being adapted to generate transversal sensor signals.

The evaluation device may be designed to determine at least one transversal coordinate for at least one of the beacon devices, preferably for a plurality of the beacon devices and most preferably for all of the beacon devices, by evaluating the transversal sensor signals.

The transversal optical sensor may be a photo detector having at least one first electrode, at least one second electrode and at least one photovoltaic material. The photovoltaic material specifically may be embedded in between the first electrode and the second electrode, wherein the photovoltaic material is adapted to generate electric charges in response to an illumination of the photovoltaic material with light, wherein the second electrode is a split electrode having at least two partial electrodes, wherein the transversal optical sensor has a sensor region, wherein the at least one transversal sensor signal indicates a position of the light beam in the sensor region. Electrical currents through the partial electrodes may be dependent on a position of the light beam in the sensor region, wherein the transversal optical sensor is adapted to generate the transversal sensor signal in accordance with the electrical currents through the partial electrodes. The detector device may be adapted to derive the transversal coordinate from at least one ratio of the currents through the partial electrodes. Other embodiments are feasible.

The at least one optional photo detector of the at least one optional transversal optical sensor may be a dye-sensitized solar cell. Other embodiments are feasible.

The first electrode of the at least one optional photo detector of the at least one optional transversal optical sensor may at least partially be made of at least one transparent conductive oxide, wherein the second electrode at least partially is made of an electrically conductive polymer, preferably a transparent electrically conductive polymer. Other embodiments are feasible.

The transversal optical sensor may be an opaque or, preferably, a transparent optical sensor.

Thus, the at least one optional transversal optical sensor specifically may fully or partially be embodied as an organic device, specifically as an organic photovoltaic device, such as a photovoltaic device having one or more organic layers. In case a plurality of transversal optical sensors is provided, one or more or even all of the transversal optical sensors may be embodied as organic transversal optical sensors. For potential examples, one or more of the organic transversal optical sensors disclosed in further detail below or as disclosed in one or more of U.S. provisional applications 61/739,173, filed on Dec. 19, 2012, and 61/749,964, filed on Jan. 8, 2013 and 61/867,169, filed on Aug. 19, 2013, PCT application number PCT/IB2013/061095, filed on Dec. 18, 2013, and U.S. patent application Ser. No. 14/132,570, filed on Dec. 18, 2013 may be used.

In addition or as an alternative to using at least one organic transversal optical sensor, one or more inorganic transversal optical sensors may be present. Thus, as an example, the at least one transversal optical sensor may be or may comprise at least one inorganic transversal optical sensor. Thus, as an example, at least one transparent inorganic transversal optical sensor and/or at least one intransparent transversal optical sensor may be used, such as one or more inorganic semiconductor diodes, such as one or more diets made of oak comprising silicon, germanium or other inorganic semiconductors. The at least one optional inorganic transversal optical sensor, as well as the at least one optional organic transversal optical sensor, may be pixelated or unpixelated.

The transversal optical sensor and the longitudinal optical sensor preferably are stacked along the optical axis such that a light beam travelling along the optical axis both impinges on the transversal optical sensor and on the longitudinal optical sensor.

The detector device may furthermore comprise at least one illumination source. Thus, the detector device may comprise at least one illumination source adapted to illuminate one, more than one or even all of the beacon devices. As outlined above, the beacon devices may fully or partially be equipped with reflective properties, thereby generating one or more reflected light beams directed towards the detector. Thus, the beacon devices may fully or partially be embodied as passive beacon devices. Additionally or alternatively, however, one, more than one or even all of the beacon devices may be equipped with at least one illumination source adapted to emit light, thereby being self-emissive beacon devices.

A further aspect of the present invention addresses the problem of noise. Thus, generally and typically, methods for distance sensing suffer from noise in determining the distance of one or more objects. The noise, from a mathematical point of view, may be described as a small random vector added to the coordinates of a point detected in space.

For at least partially solving this problem and for rendering distance sensing more reliable, typically, one or more statistical algorithms and/or one or more filter algorithms are applied to the distances measured by at least one detector, such as, in the present case, by the at least one longitudinal optical sensor. Thus, as an example, the longitudinal coordinates for one or more or all of the beacon devices may be monitored as a function of time. Then, for each monitored beacon device for which the longitudinal coordinate is monitored, a statistical analysis of the longitudinal coordinate may be performed, such as a regression analysis. As an example, a textbook statistical analysis may be performed, in order to derive a function or model function (in the following also referred to as a regression function) which is the most likely longitudinal coordinate as a function of time, with minimum error.

As used herein and as generally known in the field of statistics, regression analysis is a statistical process for estimating the relationships among variables. Regression analysis may lead to one or more models describing a relationship between a dependent variable and one or more independent variables. In the present case, a relationship between the at least one longitudinal coordinate and, optionally, as will be described in further detail below, the at least one transversal coordinate, and time may be derived. The estimation target, also referred to as a model function, may be a function of the independent variables called the regression function. Thus, generally and as used herein, a regression function may be a model function which statistically characterizes a relationship between at least one independent variable and at least one dependent variable. The regression function may also imply at least one extrapolation function and/or at least one interpolation function. Thus, extrapolation functions and/or interpolation functions specifically are possible, if a time latency is used, and the position output from the evaluation device is at least one position point later, than the position point most recently detected by the detector. A time latency specifically may be used with interpolations, whereas extrapolation functions specifically may be used without a time latency.

Further, regression analysis may lead to at least one characterization of a variation of the dependent variable around the regression function, such as by using at least one probability distribution. Many techniques for performing regression analysis are known to the skilled person and may presently be applied, such as one or more of: linear regression; nonlinear regression; least squares regression, specifically least squares regression in which least squares are used as maximum likelihood estimator, methods using local estimates such as M-estimates, L-estimates, or R-estimates; cubic splines; interpolation or extrapolation techniques, specifically polynomial or rational function interpolation or extrapolation techniques such as cubic splines, bicubic splines or bicubic interpolation; linear or nonlinear estimation techniques such as Kalman filters. Combinations of the named techniques are feasible. Most of these techniques, such as cubic splines, are examples of so-called parametric techniques, i.e. techniques in which the regression function (including the possibility of interpolation and/or extrapolation functions) is defined in terms of a finite number of unknown parameters that are estimated from the data, such as the monitored at least one longitudinal position as a function of time. Additionally or alternatively, nonparametric techniques may be applied. Nonparametric techniques of regression generally refer to techniques that allow the regression function to lie in a specified set of functions, which may be infinite-dimensional. Further methods which may also be applied within the regression analysis as included herein are e.g. described in: Numerical Recipes: The Art of Scientific Computing, Third Edition (2007), Cambridge University Press, ISBN-10: 0521880688, pp. 773-836 and in R. W. Hamming, "Numerical Methods for Scientists and Engineers", Second Edition (1987), Dover Publications, ISBN-10: 0486652416, pp. 427-495.

In general, by using regression analysis, the distance of the measured points (including error) to the corresponding points with assumed vanishing error (the model function) is minimized. A suitable regression function can be found using methods such as least squares, cubic splines, etc., depending on the application. Thus, for each of the beacon devices monitored, a model function may be derived by statistical analysis.

The same or similar algorithms may optionally be applied to other coordinates, such as one or more transversal coordinates of at least one of the beacon devices, preferably of a plurality of the beacon devices and, more preferably, of all of the beacon devices. Thus, in case one or more transversal optical sensors are used, one or more transversal coordinates of at least one beacon device may be monitored as a function of time, and a regression function may be derived in order to determine a model function of the at least one coordinate of the at least one beacon device.

Thus, generally, the evaluation device may be adapted to monitor at least one of the longitudinal coordinates as a function of time and to determine at least one regression function for the at least one longitudinal coordinate. Further, as outlined above, the detector may be adapted to determine at least one transversal coordinate for at least one of the beacon devices, and the evaluation device may further be adapted to monitor the transversal coordinate a function of time and to determine at least one regression function for the at least one transversal coordinate.

The use of statistical methods in general and, specifically, the use of regression analysis, may further be improved in case additional information is included into the analysis. And, in the detector device according to the present invention, generally, additional information is available due to the fact that more than one beacon device is provided, the coordinates of which may fully or partially be determined by the at least one detector. Thus, as outlined above, the evaluation device is adapted to determine longitudinal coordinates of each of the beacon devices in a coordinate system of the detector, i.e. for at least two beacon devices. Additionally and optionally, one or more transversal coordinates for one or more of the beacon devices may be determined in the coordinate system.

In many cases, however, the beacon devices have a known or determinable relationship in space, such as in a coordinate system of the object. Thus, in many cases, a distance between the at least two beacon devices is known, such as by providing a fixed distance between the beacon devices, or may be determined. A fixed distance generally occurs in case the object fully or partially is a rigid object.

A known or determinable relationship of two or more points in space, however, may be used to improve the statistical analysis, specifically the regression analysis. When two or more points with known and fixed distance are measured, such as two or more points of a stiff or rigid object, the regression filter can use the fact that the distance between the two or more points is constant at all times as an additional statistical constraint. This doubles the number of points to be measured, but significantly reduces the uncertainty of the measurement. Especially when measuring rotations, as is the case in the present invention, a measurement of at least two longitudinal coordinates and, more preferably, additional coordinates, is required anyway. Fixed distances between the points increase accuracy.

Thus, generally, the at least one regression function for the at least one longitudinal coordinate may be based on taking into account a known or determinable distance between at least two of the beacon devices. Similarly, the at least one optional regression function for the at least one transversal coordinate may be based on taking into account a known or determinable distance between at least two of the beacon devices.

The detector device according to the present invention may further comprise one or more additional sensors and/or detectors. Thus, as an example, the detector device may comprise one or more motion sensors which, as an example, may be attached to or integrated into the object. Specifically, one or more motion sensors may be integrated into at least one of the at least two beacon devices. Thus, as an example, at least one of the beacon devices may comprise one or more motion sensors, such as one or more sensors selected from the group consisting of: a position sensor; and inclination sensor; an acceleration sensor; a vibration sensor; a gyroscopic sensor. Other types of motion sensors may be used. As used herein, a motion sensor generally refers to a sensor which is adapted to determine at least one of a position, a velocity, an acceleration, and inclination or an orientation of the sensor and/or of the object to which the sensor may be attached and/or into which the sensor may be integrated.

The at least one motion sensor specifically may be adapted to transmit one or more signals to the detector and/or to the evaluation device. The transmission of the at least one signal preferably may take place in a wireless way, such as by using radio waves, infrared, Bluetooth or any other type of wireless transmission. Still, additionally or alternatively, other ways of transmission may be used, such as wire-bound transmission.

Most preferably, however, the transmission may take place via the at least one light beam itself. Thus, specifically in case an active beacon device is used, the beacon device may be adapted to modulate the light beam, such as by using one or more predetermined frequencies or frequency ranges. The signal or information provided by the at least one motion sensor may be encoded within the modulated light beam. Thus, information provided by the motion sensor can be transmitted to the detector.

By using the at least one signal or information provided by the motion sensor, the accuracy of the detector device may further be increased. Thus, the detector, in combination with the at least one evaluation device, may be adapted to determine one or more longitudinal and/or transversal coordinates of the at least two beacon devices. Specifically, the at least one evaluation device may be adapted to determine a distance between the detector and one or more of the beacon devices. The at least one signal or information provided by the at least one motion sensor may then be used to reduce the noise of the distance sensing. In the simplest case, the object and/or the at least one beacon device for which the distance is determined to not move, as may be confirmed by the at least one motion sensor. Errors may then be filtered under the constraint that the sensed position is unchanged.

Thus, generally, the detector device may comprise at least one motion sensor which may be one or both of attached to the object or integrated into the object. The motion sensor may be adapted to transmit at least one signal to one or both of the detector or evaluation device. The motion sensor specifically may be coupled to at least one of the beacon devices, such as connected to and/or integrated into at least one of the beacon devices. The beacon device to which the motion sensor is coupled specifically may be adapted to modulate the light beam in order to encode the signal of the motion sensor into the light beam. The evaluation device may be adapted to determine the orientation of the object by taking into account the at least one signal of the motion sensor.

In a further aspect of the present invention, a detector system is disclosed. The detector system comprises at least one detector device according to the present invention, such as according to one or more of the embodiments disclosed above or disclosed in further detail below. The detector system further comprises at least one object, wherein the beacon devices are at least one of attached to the object, held by the object or integrated into the object.

The object preferably may be a rigid object. Thus, preferably, the object is fully or partially rigid. As used herein, the term rigid refers to the fact that, in the coordinate system of the object, each point of the object or at least each point of at least one region of the object remains at a constant position which does not change with time. Still, other embodiments are feasible. Thus, the object may fully or partially be embodied as a flexible object and/or an object which fully or partially may change its shape. In the latter case, preferably, three or more beacon devices are used. In case an object is used which fully or partially is flexible and/or which fully or partially may change its shape, typical movements and/or changes of shape of the object may be known and/or may be predetermined. Thus, as an example, typical movements of an arm and/or other body parts are known and may be implemented.

As will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat; an article of clothing; a hat; a shoe; a pointer, specifically a laser pointer or television control. Other embodiments are feasible. Additionally or alternatively, however, as will be outlined in further detail below, the object may be a living object or a part of a living object, such as a body part of a user. Thus, as an example, the object may be selected from the group consisting of a hand, an arm, a head, a torso, a leg or a foot and/or one or more parts thereof.

In a further aspect of the present invention, a human-machine interface for exchanging at least one item of information between a user and a machine is disclosed. The human-machine interface comprises at least one detector device according to the present invention, such as according to one or more of the embodiments disclosed above or disclosed in further detail below. The beacon devices are adapted to be at least one of directly or indirectly attached to the user and held by the user. The human-machine interface is designed to determine an orientation of the user by means of the detector device. The human-machine interface is further designed to assign to the orientation at least one item of information.

In a further aspect of the present invention, an entertainment device for carrying out at least one entertainment function is disclosed. The entertainment device comprises at least one human-machine interface according to the present invention, such as according to one or more of the embodiments disclosed above and/or according to one or more of the embodiments disclosed in further detail below. The entertainment device is designed to enable at least one item of information to be input by a player by means of the human-machine interface. The entertainment device is further designed to vary the entertainment function in accordance with the information.

In a further aspect of the present invention, a tracking system for tracking an orientation of at least one movable object is disclosed. The tracking system comprises at least one detector device according to the present invention, such as according to one or more of the embodiments disclosed above and/or according to one or more of the embodiments disclosed in further detail below. The tracking system further comprises at least one track controller, wherein the track controller is adapted to track a series of orientations of the object at specific points in time, such as at subsequent points in time.

In a further aspect of the present invention, a method for determining an orientation of at least one object is disclosed. The method comprises the following steps:

at least one emission step, wherein at least two beacon devices are used, the beacon devices being at least one of attached to the object, held by the object and integrated into the object, wherein the beacon devices each direct light beams towards a detector, the beacon devices having predetermined coordinates in a coordinate system of the object;

at least one detection step, wherein the light beams traveling from the beacon devices towards the detector are detected by the detector;

at least one evaluation step, wherein longitudinal coordinates of each of the beacon devices are determined in a coordinate system of the detector, wherein an orientation of the object is determined in the coordinate system of the detector by using the longitudinal coordinates of the beacon devices.

The method preferably may imply the use of the detector device according to the present invention, such as the detector device according to one or more of the above-mentioned embodiments and/or according to one or more of the embodiments disclosed in further detail below.

In a further aspect of the present invention, a use of the detector device according to the present invention is disclosed, for a purpose of use, selected from the group consisting of: an orientation measurement in traffic technology; an entertainment application; a security application; a human-machine interface application; a tracking application; a positioning system.

As used herein, the object generally may be an arbitrary object, chosen from a living object and/or a non-living object, wherein combinations of at least one living object and at least one non-living object are feasible. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The orientation of the object may be determined in various ways, by using the at least two longitudinal coordinates of the at least two beacon devices and, optionally, one or more additional items of information relating to one or more or all of the beacon devices, such as at least one transversal coordinate for at least one of the beacon devices, preferably for at least two of the beacon devices or all of the beacon devices. As outlined above, the evaluation device may be adapted to determine the orientation of the object by providing at least one angle combination selected from the group consisting of: a yaw angle ($\psi$) and a pitch angle ($\Theta$); a yaw angle ($\psi$), a pitch angle ($\Theta$) and a roll angle ($\varphi$); Euler angles.

For determining the orientation, in a most simple case, a difference in the longitudinal coordinates of the beacon devices, i.e. a difference in the z-coordinates of the beacon devices, may be sufficient. Thus, as an example, in case the z-coordinates of at least two beacon devices are found to be identical, it may be determined that a plane of the object containing the at least two beacon devices is oriented perpendicular to the optical axis of the detector. Similarly, in case the z-coordinates of two beacon devices differ by $\Delta z$, by using a known distance d between the beacon devices in the coordinate system of the object and by using a simple trigonometric function (such as $\sin \Theta = \Delta z / d$ or a similar function), an angle between a connection line between the beacon devices and the optical axis may be determined. Generally, specifically for rigid objects having an arbitrary shape and having or being connected to a plurality of at least two, preferably at least three beacon devices, it is possible to find a transformation allowing to determine at least one item of information relating to the orientation of the object in the coordinate system of the detector, once the at least two longitudinal coordinates of the at least two beacon devices, preferably the at least three longitudinal coordinates of the at least three beacon devices, and, preferably, additional information, are known. Further examples of transformations will be given in detail below.

As an example, the transformation may be performed by using transformation matrices. Additionally or alternatively, other algorithms for determining at least one item of information regarding the orientation of the object may be used.

As used herein, a detector device for determining an orientation of at least one object generally is a device adapted for providing at least one item of information on the orientation of the at least one object and/or a part thereof. Thus, the orientation may refer to an item of information fully describing the orientation of the object or a part thereof in the coordinate system of the detector or may refer to a partial information, which only partially describes the orientation, such as with regard to a specific plane in the coordinate system of the detector. The detector, which is part of the detector device, generally is a device adapted for detecting light beams, such as the light beams traveling from the beacon devices towards the detector.

The detector device, as outlined above, comprises a plurality of components, i.e. at least the at least two beacon devices, the detector and the evaluation device. Preferably, the at least two beacon devices may be handled independently from the detector, thereby forming independent entities. The evaluation device and the detector, however, may fully or partially be integrated into a single device. Thus, generally, the evaluation device also may form part of the detector. Alternatively, the evaluation device and the detector may form separate devices. The detector device may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

For potential setups of the detector, reference may be made to one or more of the detectors disclosed in one or more of WO 2012/110924 A1, U.S. 61/739,173 and 61/749,964. Other embodiments are feasible.

The at least one optional transversal optical sensor and the at least one optional longitudinal optical sensor may at least partially be integrated into one optical sensor. Alternatively, at least one longitudinal optical sensor may be provided which is separate from at least one transversal optical sensor. Further, the at least one evaluation device may be formed as a separate evaluation device independent from the at least one transversal optical sensor and the at least one longitudinal optical sensor, but may preferably be connected to the at least one optional transversal optical sensor and the at least one optional longitudinal optical sensor, in order to receive the transversal sensor signal and/or the longitudinal sensor signal. Alternatively, the at least one evaluation device may fully or partially be integrated into the at least one transversal optical sensor and/or the at least one longitudinal optical sensor.

As used herein, the term transversal optical sensor generally refers to a device which is adapted to determine a transversal position of at least one light beam traveling from the object to the detector. With regard to the term transversal position, reference may be made to the definition given above. Thus, preferably, the transversal position may be or may comprise at least one coordinate in at least one dimension perpendicular to an optical axis of the detector. As an example, the transversal position may be a position of a light spot generated by the light beam in a plane perpendicular to the optical axis, such as on a light-sensitive sensor surface of the transversal optical sensor. As an example, the position in the plane may be given in Cartesian coordinates and/or polar coordinates. Other embodiments are feasible.

For potential embodiments of the transversal optical sensor, reference may be made to the position sensitive organic detector as disclosed in U.S. Pat. No. 6,995,445 and US 2007/0176165 A1. However, other embodiments are feasible and will be outlined in further detail below.

The at least one transversal sensor signal generally may be an arbitrary signal indicative of the transversal position. As an example, the transversal sensor signal may be or may comprise a digital and/or an analog signal. As an example, the transversal sensor signal may be or may comprise a voltage signal and/or a current signal. Additionally or alternatively, the transversal sensor signal may be or may comprise digital data. The transversal sensor signal may comprise a single signal value and/or a series of signal values. The transversal sensor signal may further comprise an arbitrary signal which is derived by combining two or more individual signals, such as by averaging two or more signals and/or by forming a quotient of two or more signals, as will be outlined in further detail below.

As used herein, a longitudinal optical sensor generally is a device which is designed to generate at least one longitudinal sensor signal in a manner dependent on an illumination of the sensor region by the light beam, wherein the longitudinal sensor signal, given the same total power of the illumination, is dependent on a beam cross-section of the light beam in the sensor region.

For potential embodiments of the longitudinal optical sensor, reference may be made to the optical sensors as disclosed in one or more of WO 2012/110924 A1, U.S. 61/739,173 and 61/749,964. Preferably, as will be outlined in further detail below, the detector according to the present invention comprises a plurality of optical sensors, preferably as a sensor stack.

Thus, as an example, the detector may comprise a stack of optical sensors as disclosed in WO 2012/110924 A1, in combination with one or more transversal optical sensors. As an example, reference may be made to the detector as disclosed in one or more of U.S. 61/739,173 and 61/749,964. As an example, one or more transversal optical sensors may be disposed on a side of the stack of longitudinal optical sensors facing towards the object. Alternatively or additionally, one or more transversal optical sensors may be disposed on a side of the stack of longitudinal optical sensors facing away from the object. Again, additionally or alternatively, one or more transversal optical sensors may be interposed in between the longitudinal optical sensors of the stack.

As will further be outlined below, preferably, both the at least one transversal optical sensor and the at least one longitudinal optical sensor, independently from each other, each may comprise one or more photo detectors, preferably one or more organic photodetectors and, most preferably, one or more dye-sensitized organic solar cells (DSCs, also referred to as dye solar cells), such as one or more solid dye-sensitized organic solar cells (s-DSCs). Thus, preferably, the detector may comprise one or more DSCs (such as one or more sDSCs) acting as the at least one transversal optical sensor and one or more DSCs (such as one or more sDSCs) acting as the at least one longitudinal optical sensor, preferably a stack of a plurality of DSCs (preferably a stack of a plurality of sDSCs) acting as the at least one longitudinal optical sensor and/or a stack of longitudinal optical sensors, wherein at least one of the longitudinal optical sensors is a DSC and/or an sDSC.

As used herein, the term evaluation device generally refers to an arbitrary device designed to determine the longitudinal coordinates of the beacon devices in the coordinate system of the detector and to determine the orientation of the object in the coordinate system of the detector by using the longitudinal coordinates of the beacon devices.

As outlined above, at least two beacon devices are present. In case only two beacon devices are present, preferably, at least one further item of information is used to determine the orientation. Thus, as an example, as at least one further item of information, at least one transversal coordinate of at least one of the beacon devices may be used, as will be outlined in further detail below, preferably transversal coordinates of both of the beacon devices or of all of the beacon devices. In case three or more beacon devices are present, the longitudinal coordinates of the three or more beacon devices generally are sufficient for determining the orientation of the object. Thus, as an example, from the differences in the longitudinal coordinates of the three or more beacon devices, the orientation, such as a rotation, of the object may be determined, as will be outlined in further detail below. Specifically, by using the predetermined coordinates of the beacon devices in the coordinate system of the object, and by determining the longitudinal coordinates of the beacon devices in the coordinate system of the detector, a coordinate transformation may be performed and/or the above-mentioned orientation angles may be determined, by using the evaluation device. Thus, the evaluation device may be adapted to use one or more transformation algorithms for transforming the longitudinal coordinates of the beacon devices and, optionally, one or more additional items of information, into at least one item of information regarding the orientation of the object in the coordinate system of the detector.

As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the transversal sensor signal and/or the longitudinal sensor signal, such as one or more AD-converters and/or one or more filters. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program performing or supporting the step of determining the longitudinal coordinates of each of the beacon devices in the coordinate system of the detector and/or of determining the orientation of the object in the coordinate system of the detector by using the longitudinal coordinates of the beacon devices. As an example, one or more algorithms may be implemented which, by using the transversal sensor signals and/or the longitudinal sensor signals as input variables, may perform a predetermined transformation into the orientation of the object.

As outlined above, preferably, the transversal optical sensor is a photo detector having at least one first electrode, at least one second electrode and at least one photovoltaic material, wherein the photovoltaic material is embedded in between the first electrode and the second electrode. As used herein, a photovoltaic material generally is a material or combination of materials adapted to generate electric charges in response to an illumination of the photovoltaic material with light.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally refers to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams which may be characterized by one or more Gaussian beam parameters, such as one or more of a beam waist, a Rayleigh-length or any other beam parameter or combination of beam parameters suited to characterize a development of a beam diameter and/or a beam propagation in space.

Preferably, the second electrode of the transversal optical sensor may be a split electrode having at least two partial electrodes, wherein the transversal optical sensor has a sensor area, wherein the at least one transversal sensor signal indicates a position of the light beam in the sensor area. Thus, as outlined above, the transversal optical sensor may be or may comprise one or more photo detectors, preferably one or more organic photo detectors, more preferably one or more DSCs or sDSCs. The sensor area may be a surface of the photo detector facing towards the object. The sensor area preferably may be oriented perpendicular to the optical axis. Thus, the transversal sensor signal may indicate a position of a light spot generated by the light beam in a plane of the sensor area of the transversal optical sensor.

Generally, as used herein, the term partial electrode refers to an electrode out of a plurality of electrodes, adapted for measuring at least one current and/or voltage signal, preferably independent from other partial electrodes. Thus, in case a plurality of partial electrodes is provided, the second electrode is adapted to provide a plurality of electric potentials and/or electric currents and/or voltages via the at least two partial electrodes, which may be measured and/or used independently.

When using at least one transversal optical sensor having at least one split electrode having two or more partial electrodes as a second electrode, currents through the partial electrodes may be dependent on a position of the light beam in the sensor area. This may generally be due to the fact that Ohmic losses or resistive losses may occur on the way from a location of generation of electrical charges due to the impinging light to the partial electrodes. Thus, besides the partial electrodes, the second electrode may comprise one or more additional electrode materials connected to the partial electrodes, wherein the one or more additional electrode materials provide an electrical resistance. Thus, due to the Ohmic losses on the way from the location of generation of the electric charges to the partial electrodes through with the one or more additional electrode materials, the currents through the partial electrodes depend on the location of the generation of the electric charges and, thus, to the position of the light beam in the sensor area. For details of this principle of determining the position of the light beam in the sensor area, reference may be made to the preferred embodiments below and/or to the physical principles and device options as disclosed e.g. in U.S. Pat. No. 6,995,445 and/or US 2007/0176165 A1.

The transversal optical sensor may further be adapted to generate the transversal sensor signal in accordance with the electrical currents through the partial electrodes. Thus, a ratio of electric currents through two horizontal partial electrodes may be formed, thereby generating an x-coordinate, and/or a ratio of electric currents through to vertical partial electrodes may be formed, thereby generating a y-coordinate. The detector, preferably the transversal optical sensor and/or the evaluation device, may be adapted to derive the information on the transversal position of the object from at least one ratio of the currents through the partial electrodes. Other ways of generating position coordinates by comparing currents through the partial electrodes are feasible.

The partial electrodes generally may be defined in various ways, in order to determine a position of the light beam in the sensor area. Thus, two or more horizontal partial electrodes may be provided in order to determine a horizontal coordinate or x-coordinate, and two or more vertical partial electrodes may be provided in order to determine a vertical coordinate or y-coordinate. Thus, the partial electrodes may be provided at a rim of the sensor area, wherein an interior space of the sensor area remains free and may be covered by one or more additional electrode materials. As will be outlined in further detail below, the additional electrode material preferably may be a transparent additional electrode material, such as a transparent metal and/or a transparent conductive oxide and/or, most preferably, a transparent conductive polymer.

Further preferred embodiments may refer to the photovoltaic material. Thus, the photovoltaic material of the transversal optical sensor may comprise at least one organic photovoltaic material. Thus, generally, the transversal optical sensor may be an organic photo detector. Preferably, the organic photo detector may be a dye-sensitized solar cell. The dye-sensitized solar cell preferably may be a solid dye-sensitized solar cell, comprising a layer setup embedded in between the first electrode and the second electrode, the layer setup comprising at least one n-semiconducting metal oxide, at least one dye, and at least one solid p-semiconducting organic material. Further details and optional embodiments of the dye-sensitized solar cell (DSC) will be disclosed below.

The at least one first electrode of the transversal optical sensor preferably is transparent. As used in the present invention, the term transparent generally refers to the fact that the intensity of light after transmission through the transparent object equals to or exceeds 10%, preferably 40% and, more preferably, 60% of the intensity of light before transmission through the transparent object. More preferably, the at least one first electrode of the transversal optical sensor may fully or partially be made of at least one transparent conductive oxide (TCO). As an example, indium-doped tin oxide (ITO) and/or fluorine-doped tin oxide (FTO) may be named. Further examples will be given below.

Further, the at least one second electrode of the transversal optical sensor preferably may fully or partially be transparent. Thus, specifically, the at least one second electrode may comprise two or more partial electrodes and at least one additional electrode material contacting the two or more partial electrodes. The two or more partial electrodes may be intransparent. As an example, the two or more partial electrodes may fully or partially be made of a metal. Thus, the two or more partial electrodes preferably are located at a rim of the sensor area. The two or more partial electrodes, however, may electrically be connected by the at least one additional electrode material which, preferably, is transparent. Thus, the second electrode may comprise an intransparent rim having the two or more partial electrodes and a transparent inner area having the at least one transparent additional electrode material. More preferably, the at least one second electrode of the transversal optical sensor, such as the above-mentioned at least one additional electrode material, may fully or partially be made of at least one conductive polymer, preferably a transparent conductive polymer. As an example, conductive polymers having an electrical conductivity of at least 0.01 S/cm may be used, preferably of at least 0.1 S/cm or, more preferably, of at least 1 S/cm or even at least 10 S/cm or at least 100 S/cm. As an example, the at least one conductive polymer may be selected from the group consisting of: a poly-3,4-ethylenedioxythiophene (PEDOT), preferably PEDOT being electrically doped with at least one counter ion, more preferably PEDOT doped with sodium polystyrene sulfonate (PEDOT: PSS); a polyaniline (PANI); a polythiophene.

As outlined above, the conductive polymer may provide an electrical connection between the at least two partial electrodes. The conductive polymer may provide an Ohmic resistivity, allowing for determining the position of charge generation. Preferably, the conductive polymer provides an electric resistivity of 0.1-20 kΩ between the partial electrodes, preferably an electric resistivity of 0.5-5.0 kΩ and, more preferably, an electric resistivity of 1.0-3.0 kΩ. As an example, one or more conductive polymer films having a surface conductivity of at least 0.00001 S/cm, at least 0.001 S/cm or at least 0.01 S/cm may be used, preferably of at least 0.1 S/cm or, more preferably, of at least 1 S/cm or even at least 10 S/cm or at least 100 S/cm.

Generally, as used herein, a conductive material may be a material which has a specific electrical resistance of less than $10^4$, less than $10^3$, less than $10^2$, or of less than 10 Ωm. Preferably, the conductive material has a specific electrical resistance of less than $10^{-1}$, less than $10^{-2}$, less than $10^{-3}$, less than $10^{-5}$, or less than $10^{-6}$ Ωm. Most preferably, the specific electrical resistance of the conductive material is less than $5\times10^{-7}$ Ωm or is less than $1\times10^{-7}$ Ωm, particularly in the range of the specific electrical resistance of aluminum.

As outlined above, preferably, at least one of the transversal optical sensor and the longitudinal optical sensor is a transparent optical sensor. Thus, the at least one transversal optical sensor may be a transparent transversal optical sensor and/or may comprise at least one transparent transversal optical sensor. Additionally or alternatively, the at least one longitudinal optical sensor may be a transparent longitudinal optical sensor and/or may comprise at least one transparent longitudinal optical sensor. In case a plurality of longitudinal optical sensors is provided, such as a stack of longitudinal optical sensors, preferably all longitudinal optical sensors of the plurality and/or the stack or all longitudinal optical sensors of the plurality and/or the stack but one longitudinal optical sensor are transparent. As an example, in case a stack of longitudinal optical sensors is provided, wherein the longitudinal optical sensors are arranged along the optical axis of the detector, preferably all longitudinal optical sensors but the last longitudinal optical sensor facing away from the object may be transparent longitudinal optical sensors. The last longitudinal optical sensor, i.e. the longitudinal optical sensor on the side of the stack facing away from the object, may be a transparent longitudinal optical sensor or an intransparent longitudinal optical sensor. Exemplary embodiments will be given below.

In case one of the transversal optical sensor and the longitudinal optical sensor is a transparent optical sensor or comprises at least one transparent optical sensor, the light beam may pass through the transparent optical sensor before impinging on the other one of the transversal optical sensor and the longitudinal optical sensor. Thus, the light beam from the object may subsequently reach the transversal optical sensor and the longitudinal optical sensor or vice versa.

Further embodiments refer to the relationship between the transversal optical sensor and the longitudinal optical sensor. Thus, in principle, the transversal optical sensor and the longitudinal optical sensor at least partially may be identical, as outlined above. Preferably, however, the transversal optical sensor and the longitudinal optical sensor at least partially may be independent optical sensors, such as independent photo detectors and, more preferably, independent DSCs or sDSCs.

As outlined above, the transversal optical sensor and the longitudinal optical sensor preferably may be stacked along the optical axis. Thus, a light beam travelling along the optical axis may both impinge on the transversal optical sensor and on the longitudinal optical sensor, preferably subsequently. Thus, the light beam may subsequently pass through the transversal optical sensor and the longitudinal optical sensor or vice versa.

Further embodiments of the present invention refer to the nature of the light beams which propagate from the beacon devices to the detector. The light beams independently may be emitted by the beacon devices themselves, i.e. might originate from the respective beacon device. Additionally or alternatively, another origin of the light beams is feasible. Thus, as will be outlined in further detail below, one or more illumination sources might be provided which illuminate the beacon devices, such as by using one or more primary rays or beams, such as one or more primary rays or beams having a predetermined characteristic. In the latter case, the light beams propagating from the beacon devices to the detector might be light beams which are fully or partially reflected by one or more of the beacon devices.

As outlined above, the at least one longitudinal sensor signal, given the same total power of the illumination by the light beam, may be dependent on a beam cross-section of the respective light beam in the sensor region of the at least one longitudinal optical sensor. As used herein, the term beam cross-section generally refers to a lateral extension of the light beam or a light spot generated by the light beam at a specific location. In case a circular light spot is generated, a radius, a diameter or a Gaussian beam waist or twice the Gaussian beam waist may function as a measure of the beam cross-section. In case non-circular light spots are generated, the cross-section may be determined in any other feasible way, such as by determining the cross-section of a circle having the same area as the non-circular light spot, which is also referred to as the equivalent beam cross-section.

Thus, given the same total power of the illumination of the sensor region by the light beam, a light beam having a first beam diameter or beam cross-section may generate a first longitudinal sensor signal, whereas a light beam having a second beam diameter or beam-cross section being different from the first beam diameter or beam cross-section generates a second longitudinal sensor signal being different from the first longitudinal sensor signal. Thus, by comparing the longitudinal sensor signals, an item of information or at least one item of information on the beam cross-section, specifically on the beam diameter, may be generated. For details of this effect, reference may be made to one or more of WO 2012/110924 A1, U.S. 61/739,173 and 61/749,964. Specifically in case one or more beam properties of the light beams propagating from the beacon devices to the detector are known, the longitudinal coordinates of the beacon devices may thus be derived from a known relationship between the at least one longitudinal sensor signal and a longitudinal position of the beacon device. The known relationship may be stored in the evaluation device as an algorithm and/or as one or more calibration curves. As an example, specifically for Gaussian beams, a relationship between a beam diameter or beam waist and the respective longitudinal coordinate of the beacon device from which the respective light beam propagates towards the detector may easily be derived by using the Gaussian relationship between the beam waist and a longitudinal coordinate.

The above-mentioned effect, which is also referred to as the FiP-effect (alluding to the effect that the beam cross section φ influences the electric power P generated by the longitudinal optical sensor), may depend on or may be emphasized by an appropriate modulation of the light beam, as disclosed in one or more of WO 2012/110924 A1, U.S. 61/739,173 and 61/749,964. Thus, preferably, the detector device may furthermore have at least one modulation device for modulating the light beams or one or more of the light beams. The modulation device may fully or partially be implemented into at least one illumination source and/or into at least one of the illumination sources and/or may fully or partially be designed as a separate modulation device.

The detector may be designed to detect at least two longitudinal sensor signals in the case of different modulations, in particular at least two sensor signals at respectively different modulation frequencies. In this case, the evaluation device may be designed to generate the at least one item of information on the longitudinal position of the object by evaluating the at least two longitudinal sensor signals.

Generally, the longitudinal optical sensor may be designed in such a way that the at least one longitudinal sensor signal, given the same total power of the illumination, is dependent on a modulation frequency of a modulation of the illumination. Further details and exemplary embodiments will be given below. This property of frequency dependency is specifically provided in DSCs and, more preferably, in sDSCs. However, other types of optical sensors, preferably photo detectors and, more preferably, organic photo detectors may exhibit this effect.

Preferably, the transversal optical sensor and the longitudinal optical sensor both are thin film devices, having a layer setup of layer including electrode and photovoltaic material, the layer setup having a thickness of preferably no more than 1 mm, more preferably of at most 500 μm or even less. Thus, the sensor region of the transversal optical sensor and/or the sensor region of the longitudinal optical sensor preferably each may be or may comprise a sensor area, which may be formed by a surface of the respective device facing towards the object.

Preferably, the sensor region of the transversal optical sensor and/or the sensor region of the longitudinal optical sensor may be formed by one continuous sensor region, such as one continuous sensor area or sensor surface per device. Thus, preferably, the sensor region of the longitudinal optical sensor or, in case a plurality of longitudinal optical sensors is provided (such as a stack of longitudinal optical sensors), each sensor region off the longitudinal optical sensor, may be formed by exactly one continuous sensor region. The longitudinal sensor signal preferably is a uniform sensor signal for the entire sensor region of the longitudinal optical sensor or, in case a plurality of longitudinal optical sensors is provided, is a uniform sensor signal for each sensor region of each longitudinal optical sensor.

The at least one transversal optical sensor and/or the at least one longitudinal optical sensor each, independently, may have a sensor region providing a sensitive area, also referred to as a sensor area, of at least 1 $mm^2$, preferably of at least 5 $mm^2$, such as a sensor area of 5 $mm^2$ to 1000 $cm^2$, preferably a sensor area of 7 $mm^2$ to 100 $cm^2$, more preferably a sensor area of 1 $cm^2$. The sensor area preferably has a rectangular geometry, such as a square geometry. However, other geometries and/or sensor areas are feasible.

The longitudinal sensor signal preferably may be selected from the group consisting of a current (such as a photocurrent) and a voltage (such as a photovoltage). Similarly, the transversal sensor signal preferably may be selected from the group consisting of a current (such as a photocurrent) and a voltage (such as a photovoltage) or any signal derived thereof, such as a quotient of currents and/or voltages.

Further, the longitudinal sensor signal and/or the transversal sensor signal may be preprocessed, in order to derive refined sensor signals from raw sensor signals, such as by averaging and/or filtering.

Generally, the longitudinal optical sensor may comprise at least one semiconductor detector, in particular an organic semiconductor detector comprising at least one organic material, preferably an organic solar cell and particularly preferably a dye solar cell or dye-sensitized solar cell, in particular a solid dye solar cell or a solid dye-sensitized solar cell. Preferably, the longitudinal optical sensor is or comprises a DSC or sDSC. Thus, preferably, the longitudinal optical sensor comprises at least one first electrode, at least one n-semiconducting metal oxide, at least one dye, at least one p-semiconducting organic material, preferably a solid p-semiconducting organic material, and at least one second electrode. In a preferred embodiment, the longitudinal optical sensor comprises at least one DSC or, more preferably, at least one sDSC. As outlined above, preferably, the at least one longitudinal optical sensor is a transparent longitudinal optical sensor or comprises at least one transparent longitudinal optical sensor. Thus, preferably, both the first electrode and the second electrode are transparent or, in case a plurality of longitudinal optical sensors is provided, at least one of the longitudinal optical sensors is designed such that both the first electrode and the second electrode are transparent. As outlined above, in case a stack of longitudinal optical sensors is provided, preferably all longitudinal optical sensors of the spec are transparent but the last longitudinal optical sensor of the stack furthest away from the object. The last longitudinal optical sensor may be transparent or intransparent. In the latter case, the last longitudinal optical sensor may be designed such that its electrode facing towards the object is transparent, whereas its electrode facing away from the object may be intransparent.

As outlined above, the detector preferably has a plurality of longitudinal optical sensors. More preferably, the plurality of longitudinal optical sensors is stacked, such as along the optical axis of the detector. Thus, the longitudinal optical sensors may form a longitudinal optical sensor stack. The longitudinal optical sensor stack preferably may be oriented such that the sensor regions of the longitudinal optical sensors are oriented perpendicular to the optical axis. Thus, as an example, sensor areas or sensor surfaces of the single longitudinal optical sensors may be oriented in parallel, wherein slight angular tolerances might be tolerable, such as angular tolerances of no more than 10°, preferably of no more than 5°.

In case stacked longitudinal optical sensors are provided, the at least one transversal optical sensor preferably fully or partially is located on a side of the stacked longitudinal optical sensors facing the object. However, other embodiments are feasible. Thus, embodiments are feasible in which the at least one transversal optical sensor is fully or partially located on a side of the transversal optical sensor stack facing away from the object. Again, additionally or alternatively, embodiments are feasible in which the at least one transversal optical sensor is located fully or partially in between the longitudinal optical sensor stack.

The longitudinal optical sensors preferably are arranged such that each light beam from one of the beacon devices illuminates all longitudinal optical sensors, preferably sequentially. Specifically in this case, preferably, at least one longitudinal sensor signal is generated by each longitudinal optical sensor. This embodiment is specifically preferred since the stacked setup of the longitudinal optical sensors allows for an easy and efficient normalization of the signals, even if an overall power or intensity of the light beam is unknown. Thus, the single longitudinal sensor signals may be known to be generated by one and the same light beam. Thus, the evaluation device may be adapted to normalize the longitudinal sensor signals and to generate the information on the longitudinal position of the object independent from an intensity of the light beam. For this purpose, use may be made of the fact that, in case the single longitudinal sensor signals are generated by one and the same light beam, differences in the single longitudinal sensor signals are only due to differences in the cross-sections of the light beam at the location of the respective sensor regions of the single longitudinal optical sensors. Thus, by comparing the single longitudinal sensor signals, information on a beam cross-section may be generated even if the overall power of the light beam is unknown. From the beam cross-section, information regarding the longitudinal position of the respective beacon device and, thus, on the longitudinal coordinate of beacon device, may be gained, specifically by making use of a known relationship between the cross-section of the light beam and the longitudinal position of the beacon device.

Further, the above-mentioned stacking of the longitudinal optical sensors and the generation of a plurality of longitudinal sensor signals by these stacked longitudinal optical sensors may be used by the evaluation device in order to resolve an ambiguity in a known relationship between a beam cross-section of the light beam and the longitudinal coordinate of the beacon device. Thus, even if the beam properties of the light beam propagating from the beacon device to the detector are known fully or partially, it is known that, in many beams, the beam cross-section narrows before reaching a focal point and, afterwards, widens again. Thus, before and often as a focal point in which the light beam has the narrowest beam cross-section, positions along the axis of propagation of the light beam occur in which the light beam has the same cross-section. Thus, as an example, at a distance z0 before and after the focal point, the cross-section of the light beam is identical. Thus, in case only one longitudinal optical sensor is used, a specific cross-section of the light beam might be determined, in case the overall power or intensity of the light beam is known. By using this information, the distance z0 of the respective longitudinal optical sensor from the focal point might be determined. However, in order to determine whether the respective longitudinal optical sensor is located before or behind the focal point, additional information may be required, such as a history of movement of the object and/or the detector and/or information on whether the detector is located before or behind the focal point. In typical situations, this additional information may not be available. Therefore, by using a plurality of longitudinal optical sensors, additional information may be gained in order to resolve the above-mentioned ambiguity. Thus, in case the evaluation device, by evaluating the longitudinal sensor signals, recognizes that the beam cross-section of the light beam on a first longitudinal optical sensor is larger than the beam cross-section of the light beam on a second longitudinal optical sensor, wherein the second longitudinal optical sensor is located behind the first longitudinal optical sensor, the evaluation device may determine that the light beam is still narrowing and that the location of the first longitudinal optical sensor is situated before the focal point of the light beam. Contrarily, in case the beam cross-section of the light beam on the first longitudinal optical sensor is smaller than the beam cross-section of the light beam on the second longitudinal optical sensor, the evaluation device may determine that the light beam is widening and that the location of the second longitudinal optical sensor is situated behind the focal point. Thus, generally, the evaluation device may be adapted to recognize whether the light beam widens or narrows, by comparing the longitudinal sensor signals of different longitudinal sensors.

The longitudinal optical sensor stack preferably may comprise at least three longitudinal optical sensors, more preferably at least four longitudinal optical sensors, even more preferably at least five longitudinal optical sensors or even at least six longitudinal optical sensors. By tracking the longitudinal sensor signals of the longitudinal optical sensors, even a beam profile of the light beam might be evaluated.

As used herein and as used in the following, the diameter of the light beam or, equivalently, a beam waist of the light beam might be used to characterize the beam cross-section of the light beam at a specific location. As outlined above, a known relationship might be used between the longitudinal position of the respective beacon device, i.e. the beacon device emitting and/or reflecting the light beam, and the beam cross-section in order to determine the longitudinal coordinate of the beacon device by evaluating the at least one longitudinal sensor signal. As an example, as outlined above, a Gaussian relationship might be used, assuming that the light beam propagates at least approximately in a Gaussian manner. For this purpose, the light beam might be shaped appropriately, such as by using an illumination source generating a light beam having known propagation properties, such as a known Gaussian profile. For this purpose, the illumination source itself may generate the light beam having the known properties, which, for example, is the case for many types of lasers, as the skilled person knows. Additionally or alternatively, the illumination source and/or the detector may have one or more beam-shaping elements, such as one or more lenses and/or one or more diaphragms, in order to provide a light beam having known properties, as the skilled person will recognize. Thus, as an example, one or more transfer elements may be provided, such as one or more transfer elements having known beam-shaping properties. Additionally or alternatively, the illumination source and/or the detector, such as the at least one optional transfer element, may have one or more wavelength-selective elements, such as one or more filters, such as one or more filter elements for filtering out wavelengths outside an excitation maximum of the at least one transversal optical sensor and/or the at least one longitudinal optical sensor.

Thus, generally, the evaluation device may be adapted to compare the beam cross-section and/or the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

As outlined above, the present invention further relates to a human-machine interface for exchanging at least one item of information between a user and a machine. The human-machine interface as proposed may make use of the fact that the above-mentioned detector device in one or more of the embodiments mentioned above or as mentioned in further detail below may be used by one or more users for providing information and/or commands to a machine. Thus, preferably, the human-machine interface may be used for inputting control commands.

Generally, as used herein, the at least one orientation of the user may imply one or more items of information on an orientation of the user as a whole and/or one of or more body parts of the user. Thus, preferably, the orientation of the user may imply one or more items of information on an orientation of the user as provided by the evaluation device of the detector. The user, a body part of the user or a plurality of body parts of the user may be regarded as one or more objects the orientation of which may be detected by the at least one detector device. Therein, precisely one detector may be provided, or a combination of a plurality of detectors may be provided. As an example, a plurality of detectors may be provided for determining orientations of a plurality of body parts of the user and/or for determining an orientation of at least one body part of the user.

As outlined above, the human-machine interface comprises a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices such as in his or her hands and/or by wearing the at least one beacon device and/or a garment containing the Beacon device on a body part.

As used herein, a beacon device generally is an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and the orientation of which may be recognized by the detector device. Thus, generally, the present invention also refers to a detector system comprising at least one detector device according to the present invention and, further, comprising at least one object, wherein the beacon devices are one of attached to the object, held by the object and integrated into the object. As outlined above, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted such that the detector device generates at least one item of information on the orientation of the user or of at least one body part of the user.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit; a stick that may be held by hand; a bat; a club; a racket; a cane; a toy, such as a toy gun; a pointer, specifically a laser pointer or television control. Thus, as an example, the detector system may be part of the human-machine interface and/or of the entertainment device.

In case the object is part of the detector system, the detector device, specifically the detector of the detector device, may be one or both of attached to or integrated into an article. Specifically, the detector, which preferably may be a transparent or semi-transparent detector, may be placed in front of an article such that the article is still visible through the detector. Specifically, the detector may be embodied as a flexible detector, such as by using flexible detector foils. The detector specifically may be attached to the article, such as by bonding the transparent detector, such as the transparent detector foils, onto the article.

Thus, generally, the object may be a control element for controlling televisions, games, or other human-machine-interface applications. As an example, present television sets are typically controlled by a remote control having one or more buttons such as pushbuttons. Similarly, computers are typically controlled by using keyboards or a mouse as an input device, wherein the mouse allows for a direct input of user movements. For televisions, no convenient human-machine interface solution is available which allows for a direct input of user movements. By using the detector device and/or the detector system according to the present invention, this shortcoming of commercially available control elements may be overcome. Thus, as outlined above, the detector, specifically the transparent or semitransparent detector such as a transparent organic sensor screen can be placed in front of an article such as a television screen or another type of article. Since, generally, the use of organic optical sensors such as sDSCs allows for a production of large area detectors and specifically of flexible large area detectors, which is generally impossible by using inorganic materials, the detector may cover the full visible surface of the article or at least a large part thereof. Further, as outlined above, the detector may be generated in a transparent fashion.

As outlined above, the detector may comprise at least one longitudinal optical sensor and/or at least one transversal optical sensor. For potential details of the setup of these optical sensors, reference may be made to the embodiments given above or to the embodiments given in further detail below. Further, as an example, for potential setups of transversal optical sensors, reference may be made to U.S. Pat. No. 6,995,445 B2.

By using the at least one detector, such as a transparent organic detector screen, the position and/or orientation of an object having the at least two beacon devices and imaging light beams towards the detector may be determined. As outlined above, the beacon devices may further be modulated in order to distinguish signals from other signals such as background signals, specifically from further incoming light or background illumination.

The at least two beacon devices specifically may be embedded into an object forming a remote control. The detector may be adapted for determining transversal coordinates and/or for determining the longitudinal coordinates. Thereby, one or more of a transversal position, a longitudinal position (such as quantitative distance sensing) or an orientation of the remote control may be determined.

The beacon devices specifically may be adapted to emit divergent light beams, such as coherent divergent light beams. Thus, the beacon devices may emit coherent light with a small but detectable spread over distance. By using the at least one detector, at least one longitudinal coordinate of at least one of the beacon devices may be determined, such as by using the above-mentioned FiP effect. Thus, the spot size may be measured by using the FiP-effect, and thus, distance information may be derived from detecting one or more light spots.

Further, the detector, in this embodiment or other embodiments, may be adapted to determine changes in at least one longitudinal coordinate of at least one of the beacon devices. Thus, generally, instead of determining absolute coordinates, relative coordinate changes may be detected, such as changes in at least one longitudinal coordinate of at least one of the beacon devices. Further, signals provided by the at least one detector may be normalized. As an example, FiP signals may be normalized in between the relative distance measurements.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device.

The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target; grabbing at least one object by hand; moving at least one object by hand.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past orientations of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of orientations of the object at specific points in time, such as by recording groups of data or data pairs, each group of data or data pair comprising at least one orientation information and at least one time information.

The tracking system may further comprise the at least one detector system according to the present invention. Thus, besides the at least one detector and the at least one evaluation device and the beacon devices, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

As outlined above, in a further aspect of the present invention, the invention refers to a method for determining an orientation of at least one object. The method preferably may make use of at least one detector according to the present invention, such as of at least one detector according to one or more of the embodiments disclosed above or disclosed in further detail below. Thus, for optional embodiments of the method, reference might be made to the embodiments of the detector.

The method comprises the above-mentioned method steps, which may be performed in the given order or in a different order. Further, additional method steps might be provided which are not listed. Further, two or more or even all of the method steps might be performed at least partially simultaneously. Further, two or more or even all of the method steps might be performed twice or even more than twice, repeatedly.

As outlined above, preferably, for potential details of the setups of the at least one detector, preferably with regard to the potential setup of one or more of the at least one optional transversal optical detector, the at least one optional longitudinal optical detector, the at least one optional transfer device and the evaluation device, reference may be made to one or more of WO 2012/110924 A1, U.S. 61/739,173 and 61/749,964, specifically with regard to potential electrode materials, organic materials, inorganic materials, layer setups and further details.

The transfer device can for example comprise one or a plurality of mirrors and/or beam splitters and/or beam deflecting elements in order to influence a direction of the electromagnetic radiation. Alternatively or additionally, the transfer device can comprise one or a plurality of imaging elements which can have the effect of a converging lens and/or a diverging lens. By way of example, the optional transfer device can have one or a plurality of lenses and/or one or a plurality of convex and/or concave mirrors. Once again alternatively or additionally, the transfer device can have at least one wavelength-selective element, for example at least one optical filter. Once again alternatively or additionally, the transfer device can be designed to impress a predefined beam profile on the electromagnetic radiation, for example, at the location of the sensor region and in particular the sensor area. The above mentioned optional embodiments of the optional transfer device can, in principle, be realized individually or in any desired combination.

Further, generally, it shall be noted that, in the context of the present invention, an optical sensor may refer to an arbitrary element which is designed to convert at least one optical signal into a different signal form, preferably into at least one electrical signal, for example a voltage signal and/or a current signal. In particular the optical sensor can comprise at least one optical-electrical converter element, preferably at least one photodiode and/or at least one solar cell. As is explained in even greater detail below, in the context of the present invention, preference is attached particularly to a use of at least one organic optical sensor, that is to say an optical sensor which comprises at least one organic material, for example at least one organic semiconductor material.

In the context of the present invention, a sensor region should be understood to mean a two-dimensional or three-dimensional region which preferably, but not necessarily, is continuous and can form a continuous region, wherein the sensor region is designed to vary at least one measurable property, in a manner dependent on the illumination. By way of example, said at least one property can comprise an electrical property, for example, by the sensor region being designed to generate, solely or in interaction with other elements of the optical sensor, a photovoltage and/or a photocurrent and/or some other type of signal. In particular, the sensor region can be embodied in such a way that it generates a uniform, preferably a single, signal in a manner dependent on the illumination of the sensor region. The sensor region can thus be the smallest unit of the optical sensor for which a uniform signal, for example, an electrical signal, is generated, which preferably can no longer be subdivided to partial signals, for example for partial regions of the sensor region. The transversal optical sensor and/or the longitudinal optical sensor each can have one or else a plurality of such sensor regions, the latter case for example by a plurality of such sensor regions being arranged in a two-dimensional and/or three-dimensional matrix arrangement.

The at least one sensor region can comprise for example at least one sensor area, that is to say a sensor region whose lateral extent considerably exceeds the thickness of the sensor region, for example by at least a factor of 10, preferably by at least a factor of 100 and particularly preferably by at least a factor of 1000. Examples of such sensor areas can be found in organic or inorganic photovoltaic elements, for example, in accordance with the prior art described above, or else in accordance with the exemplary embodiments described in even greater detail below. The detector can have one or a plurality of such optical sensors and/or sensor regions. By way of example, a plurality of optical sensors can be arranged linearly in a spaced-apart manner or in a two-dimensional arrangement or else in a three-dimensional arrangement, for example by a stack of photovoltaic elements being used, preferably organic photovoltaic elements, preferably a stack in which the sensor areas of the photovoltaic elements are arranged parallel to one another. Other embodiments are also possible.

The optional transfer device can, as explained above, be designed to feed light propagating from the object to the detector to the transversal optical sensor and/or the longitudinal optical sensor, preferably successively. As explained above, this feeding can optionally be effected by means of imaging or else by means of non-imaging properties of the transfer device. In particular the transfer device can also be designed to collect the electromagnetic radiation before the latter is fed to the transversal and/or longitudinal optical sensor. The optional transfer device can also, as explained in even greater detail below, be wholly or partly a constituent part of at least one optional illumination source, for example by the illumination source being designed to provide a light beam having defined optical properties, for example having a defined or precisely known beam profile, for example at least one Gaussian beam, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the beacon devices or into one or more of the beacon devices and/or into the object or connected or spatially coupled to the object.

The light emerging from the beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source independently from each other and generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers. Most preferably, the at least one illumination source is adapted to emit light in the visible spectral range, preferably in the range of 500 nm to 780 nm, most preferably at 650 nm to 750 nm or at 690 nm to 700 nm.

The feeding of the light to the transversal and/or longitudinal optical sensor can be effected in particular in such a way that a light spot, for example having a round, oval or differently configured cross section, is produced on the optional sensor area of the transversal and/or longitudinal optical sensor. By way of example, the detector can have a visual range, in particular a solid angle range and/or spatial range, within which objects can be detected. Preferably, the optional transfer device is designed in such a way that the light spot, for example in the case of an object arranged within a visual range of the detector, is arranged completely on the sensor region, in particular the sensor area. By way of example, a sensor area can be chosen to have a corresponding size in order to ensure this condition.

The at least one longitudinal optical sensor, as outlined above, can be designed for example in such a way that the longitudinal sensor signal, given the same power of the illumination, that is to say for example given the same integral over the intensity of the illumination on the sensor area, is dependent on the geometry of the illumination, that is to say for example on the diameter and/or the equivalent diameter for the sensor spot. By way of example, the longitudinal optical sensor can be designed in such a way that upon a doubling of the beam cross section given the same total power, a signal variation occurs by at least a factor of 3, preferably by at least a factor of 4, in particular a factor of 5 or even a factor of 10. This condition can hold true for example for a specific focusing range, for example for at least one specific beam cross section. Thus, by way of example, the longitudinal sensor signal can have, between at least one optimum focusing at which the signal can have for example at least one global or local maximum and a focusing outside said at least one optimum focusing, a signal difference by at least a factor of 3, preferably by at least a factor of 4, in particular a factor of 5 or even a factor of 10. In particular, the longitudinal sensor signal can have as a function of the geometry of the illumination, for example of the diameter or equivalent diameter of a light spot, at least one pronounced maximum, for example with a boost by at least a factor of 3, particularly preferably by at least a factor of 4 and particularly preferably by at least a factor of 10. Consequently, the longitudinal optical sensor may be based on the above-mentioned FiP-effect, which is disclosed in great detail in WO 2012/110924 A1. Thus, specifically in sDSCs, the focusing of the light beam may play a decisive role, i.e. the cross-section or cross-sectional area on which a certain number or rate of photons (nph) is incident. The more tightly the light beam is focused, i.e. the smaller its cross-section, the higher the photo current may be. The term 'FiP' expresses the relationship between the cross-section φ(Fi) of the incident beam and the solar cell's power (P).

The at least one longitudinal optical sensor may be combined with at least one transversal optical sensor in order to preferably provide appropriate position information of the object.

Such effects of the dependence of the at least one longitudinal sensor signal on a beam geometry, preferably a beam cross-section of the at least one light beam, were observed in the context of the investigations leading to the present invention in particular in the case of organic photovoltaic components, that is to say photovoltaic components, for example, solar cells, which comprise at least one organic material, for example at least one organic p-semiconducting material and/or at least one organic dye. By way of example, such effects, as is explained in even greater detail below by way of example, were observed in the case of dye solar cells, that is to say components which have at least one first electrode, at least one n-semiconducting metal oxide, at least one dye, at least one p-semiconducting organic material, preferably a solid organic p-type semiconductor, and at least one second electrode. Such dye solar cells, preferably solid dye solar cells (solid dye sensitized solar cells, sDSC), are known in principle in numerous variations from the literature.

In particular, the at least one longitudinal optical sensor can be designed in such a way that the sensor signal, given the same total power of the illumination, is substantially independent of a size of the sensor region, in particular of a size of the sensor area, in particular as long as the light spot of the illumination lies completely within the sensor region, in particular the sensor area. Consequently, the longitudinal sensor signal can be dependent exclusively on a focusing of the electromagnetic rays on the sensor area. In particular the sensor signal can be embodied in such a way that a photocurrent and/or a photovoltage per sensor area have/has the same values given the same illumination, for example the same values given the same size of the light spot.

The evaluation device can comprise in particular at least one data processing device, in particular an electronic data processing device, which can be designed to generate the at least one item of information on the transversal position of the beacon device by evaluating the at least one transversal sensor signal and to generate the at least one item of information on the longitudinal position of the beacon device by evaluating the at least one longitudinal sensor signal. Thus, the evaluation device may be designed to use the at least one transversal sensor signal and the at least one longitudinal sensor signal as input variables and to generate the items of information on the transversal position and the longitudinal position of the beacon device by processing these input variables. The processing can be done in parallel, subsequently or even in a combined manner. The evaluation device may use an arbitrary process for generating these items of information, such as by calculation and/or using at least one stored and/or known relationship. Besides the at least one transversal sensor signal and at least one longitudinal sensor signal, one or a plurality of further parameters and/or items of information can influence said relationship, for example at least one item of information about a modulation frequency. The relationship can be determined or determinable empirically, analytically or else semi-empirically. Particularly preferably, the relationship comprises at least one calibration curve, at least one set of calibration curves, at least one function or a combination of the possibilities mentioned. One calibration curve or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation. Separate relationships for processing the at least one transversal sensor signal into the at least one item of information on the transversal position and for processing the at least one longitudinal sensor signal into the at least one item of information on the longitudinal position may be used. Alternatively, at least one combined relationship for processing the sensor signals is feasible. Various possibilities are conceivable and can also be combined.

By way of example, the evaluation device can be designed in terms of programming for the purpose of determining the items of information. The evaluation device can comprise in particular at least one computer, for example at least one microcomputer. Furthermore, the evaluation device can comprise one or a plurality of volatile or nonvolatile data memories. As an alternative or in addition to a data processing device, in particular at least one computer, the evaluation device can comprise one or a plurality of further electronic components which are designed for determining the items of information, for example an electronic table and in particular at least one look-up table and/or at least one application-specific integrated circuit (ASIC).

As outlined above, the total intensity of total power of the light beams is often unknown, since this total power e.g. may depend on the properties of the beacon devices, such as reflecting properties and/or emitting properties, and/or may depend on a total power of an illumination source and/or may depend on a large number of environmental conditions. Since the above-mentioned known relationship between the at least one longitudinal optical sensor signal and a beam cross-section of the light beam in the at least one sensor region of the at least one longitudinal optical sensor and, thus, a known relationship between the at least one longitudinal optical sensor signal and the at least one item of information on the orientation of the object may depend on the total power of total intensity of the light beam, various ways of overcoming this uncertainty are feasible. Thus, as outlined in great detail in WO 2012/110924 A1, a plurality of longitudinal sensor signals may be detected by the same longitudinal optical sensor, such as by using different modulation frequencies of an illumination of the object. Thus, at least two longitudinal sensor signals may be acquired at different frequencies of a modulation of the illumination, wherein, from the at least two sensor signals, for example by comparison with corresponding calibration curves, it is possible to deduce the total power and/or the geometry of the illumination, and/or therefrom, directly or indirectly, to deduce the at least one item of information on the orientation of the object.

Additionally or alternatively, however, as outlined above, the detector may comprise a plurality of longitudinal optical sensors, each longitudinal optical sensor being adapted to generate at least one longitudinal sensor signal. The longitudinal sensor signals generated by the longitudinal optical sensors may be compared, in order to gain information on the total power and/or intensity of the light beam and/or in order to normalize the longitudinal sensor signals and/or the at least one item of information on the longitudinal position of the respective beacon device for the total power and/or total intensity of the light beam. Thus, as an example, a maximum value of the longitudinal optical sensor signals may be detected, and all longitudinal sensor signals may be divided by this maximum value, thereby generating normalized longitudinal optical sensor signals, which, then, may be transformed by using the above-mentioned known relationship, into the at least one item of longitudinal information on beacon device and, thus, into the respective longitudinal coordinate of the respective beacon device. Other ways of normalization are feasible, such as a normalization using a mean value of the longitudinal sensor signals and dividing all longitudinal sensor signals by the mean value. Other options are possible. Each of these options is suited to render the transformation independent from the total power and/or intensity of the respective light beam. In addition, information on the total power and/or intensity of the respective light beams might be generated.

As outlined above, one of the light beams, more than one of the light beams or even all of the light beams may be modulated, such as by amplitude modulation and/or phase modulation, most preferably by amplitude modulation. As also outlined above, this modulation, preferably the amplitude modulation, may be performed for various purposes. Thus, firstly, the FiP-effect itself which may be used for detecting the longitudinal coordinates of the beacon devices in the coordinate system of the detector may depend on the modulation frequency, as outlined above and as outlined in further detail below. Thus, the modulation may be chosen to increase the FiP effect and, thereby, to increase the accuracy of the determination of the longitudinal coordinates of the beacon devices. Additionally or alternatively, as also outlined above, the modulation may be used for the purpose of identifying the respective beacon device from which the respective light beam travels towards the detector. Thus, by distinguishing light beams having different modulation frequencies, the beacon device emitting and/or reflecting the respective light beam may be identified. Thus, as an example, a first one of the beacon devices may emit and/or reflect a light beam having a modulation frequency f1, whereas a second one of the beacon devices may emit and/or reflect a light beam having a modulation frequency f2≠f1, and so forth. The modulation frequencies may be chosen such that the detector signals depend on the modulation frequency. Thus, the longitudinal optical sensor may provide a longitudinal sensor signal having the same modulation frequency as the respective light beam generating this longitudinal sensor signal. Thus, by assigning the signals of the at least one longitudinal optical sensor to the respective beacon device by using the modulation frequency as a distinguishing parameter, the longitudinal coordinates of the beacon devices may be determined independently. As an example, the light beams emitted and/or reflected by the beacon devices may be modulated in a frequency range>0 Hz, preferably in a frequency range of 0.1 HZ to 100 000 Hz, more preferably 1 Hz to 10 000 Hz, most preferably 100 Hz to 1000 Hz.

The modulation of the light beams, both a modulation for the purpose of increasing the FiP effect and a modulation for distinguishing the light beams, may take place in different frequency ranges and/or may be established in various ways. Thus, the detector can furthermore have at least one modulation device. Generally, a modulation of a light beam should be understood to mean a process in which a total power and/or a phase, most preferably a total power, of the respective light beam is varied, preferably periodically, in particular with one or a plurality of modulation frequencies. In particular, a periodic modulation can be effected between a maximum value and a minimum value of the total power of the illumination. The minimum value can be 0, but can also be >0, such that, by way of example, complete modulation does not have to be effected. The modulation can be effected for example in a beam path between the beacon device and the optical sensor, for example by the at least one modulation device being arranged in said beam path. Alternatively or additionally, however, the modulation can also be effected in a beam path between an optional illumination source for illuminating the beacon device and the object, for example by the at least one modulation device being arranged in said beam path. A combination of these possibilities is also conceivable. The at least one modulation device can comprise for example a beam chopper or some other type of periodic beam interrupting device, for example comprising at least one interrupter blade or interrupter wheel, which preferably rotates at constant speed and which can thus periodically interrupt the illumination. Alternatively or additionally, however, it is also possible to use one or a plurality of different types of modulation devices, for example modulation devices based on an electro-optical effect and/or an acousto-optical effect. Once again alternatively or additionally, the at least one optional illumination source itself can also be designed to generate a modulated illumination, for example by said illumination source itself having a modulated intensity and/or total power, for example a periodically modulated total power, and/or by said illumination source being embodied as a pulsed illumination source, for example as a pulsed laser. Thus, by way of example, the at least one modulation device can also be wholly or partly integrated into the illumination source. Various possibilities are conceivable.

By way of example, the detector can be designed to bring about a modulation of the illumination of the object and/or at least one sensor region of the detector, such as at least one sensor region of the at least one longitudinal optical sensor, with a frequency of 0.05 Hz to 1 MHz, such as 0.1 Hz to 10 kHz, specifically for the purpose of the FiP effect.

For potential embodiments of the above-mentioned elements of the detector, such as the at least one optional longitudinal optical sensor and/or the at least one optional transversal optical sensor, reference may be made to various documents in the literature, for example to one or more of WO 2012/110924 A1, US 2007/0176165 A1, U.S. Pat. No. 6,995,445 B2, DE 2501124 A1, DE 3225372 A1, WO 2009/013282 A1, U.S. 61/739,173 and 61/749,964. Thus, specifically, reference may be made to one or more of WO 2012/110924 A1, U.S. 61/739,173 and 61/749,964, with regard to one or more of the following components which may be implied in the at least one optional longitudinal optical sensor and/or the at least one optional transversal optical sensor: the first electrode and the n-semiconductive metal oxide; the dye; the p-semiconducting organic material; the second electrode, specifically the second electrode of the transversal optical sensor and/or the second electrode of the longitudinal optical sensor; the encapsulation. Still, other embodiments are feasible. Further, with regard to synthesis examples, reference may be made to one or more of the named documents, specifically to one or more of WO 2012/110924 A1, U.S. 61/739,173. Despite these references, some examples of potential setups of the longitudinal optical sensor and/or the transversal optical sensor will be given below. It shall be noted that, in case a plurality of longitudinal optical sensors is provided, one or more or all of the longitudinal optical sensors may be embodied according to one or more of the given embodiments. One or more longitudinal optical sensors having a different setup may be present. In case a plurality of transversal optical sensors is provided, one or more or all of the transversal optical sensors may be embodied according to one or more of the given embodiments. Still, one or more transversal optical sensors having a different setup may be present.

As outlined above, preferably, the at least one transversal optical sensor and/or the at least one longitudinal optical sensor both may comprise at least one organic semiconductor detector, particularly preferably at least one dye solar cell, DSC or sDSC. In particular, the transversal optical sensor and/or the longitudinal optical sensor each may comprise at least one first electrode, at least one n-semiconducting metal oxide, at least one dye, at least one p-semiconducting organic material and at least one second electrode, preferably in the stated order. The stated elements can be present as layers in a layer construction, for example. The layer construction can be applied for example to a substrate, preferably a transparent substrate, for example a glass substrate.

Preferred embodiments of the above-mentioned elements of the preferred optical sensor are described below by way of example, wherein these embodiments can be used in any desired combination. However, numerous other configurations are also possible, in principle, wherein reference can be made for example to WO 2012/110924 A1, US 2007/0176165 A1, U.S. Pat. No. 6,995,445 B2, DE 2501124 A1, DE 3225372 A1 and WO 2009/013282 A1 cited above.

As outlined above, the at feast one transversal optical sensor may be designed as a dye-sensitized solar cell (DSC), preferably a solid dye-sensitized solar cell (sDSC). Similarly, the at least one longitudinal optical sensor may be designed as at least one dye-sensitized solar cell (DSC) or may comprise at least one dye-sensitized solar cell (DSC), preferably a solid dye-sensitized solar cell (sDSC). More preferably, the at least one longitudinal optical sensor comprises a stack of DSCs, preferably a stack of sDSCs. Preferred components of the DSCs or sDSCs will be disclosed in the following. However, it shall be understood that other embodiments are feasible.

First Electrode and n-Semiconductive Metal Oxide

Generally, for preferred embodiments of the first electrode and the n-semiconductive metal oxide, which may be used in a layer setup of the transversal optical sensor and/or the longitudinal optical sensor, reference may be made to WO 2012/110924 A1. The n-semiconductive metal oxide used in the dye solar cell of the transversal optical sensor and/or the longitudinal optical sensor may be a single metal oxide or a mixture of different oxides. It is also possible to use mixed oxides. The n-semiconductive metal oxide may especially be porous and/or be used in the form of a nanoparticulate oxide, nanoparticles in this context being understood to mean particles which have an average particle size of less than 0.1 micrometer. A nanoparticulate oxide is typically applied to a conductive substrate (i.e. a carrier with a conductive layer as the first electrode) by a sintering process as a thin porous film with large surface area.

Preferably, the at least one transversal optical sensor uses at least one transparent substrate. Similarly, preferably, the at least one longitudinal optical sensor uses at least one transparent substrate. In case a plurality of longitudinal optical sensors is used, such as a stack of longitudinal optical sensors, preferably, at least one of these longitudinal optical sensors uses a transparent substrate. Thus, as an example, all longitudinal optical sensors but the last longitudinal optical sensor facing away from the object, each may use a transparent substrate. The last longitudinal optical sensor may either use a transparent or an intransparent substrate.

Similarly, the at least one transversal optical sensor uses at least one transparent first electrode. Further, the at least one longitudinal optical sensor may use at least one transparent first electrode. In case a plurality of longitudinal optical sensors is used, such as a stack of longitudinal optical sensors, preferably, at least one of these longitudinal optical sensors uses a transparent first electrode. Thus, as an example, all longitudinal optical sensors but the last longitudinal optical sensor facing away from the object each may use a transparent first electrode. The last longitudinal optical sensor may either use a transparent or an intransparent first electrode.

The substrate may be rigid or else flexible. Suitable substrates (also referred to hereinafter as carriers) are, as well as metal foils, in particular plastic sheets or films and especially glass sheets or glass films. Particularly suitable electrode materials, especially for the first electrode according to the above-described, preferred structure, are conductive materials, for example transparent conductive oxides (TCOs), for example fluorine- and/or indium-doped tin oxide (FTO or ITO) and/or aluminum-doped zinc oxide (AZO), carbon nanotubes or metal films. Alternatively or additionally, it would, however, also be possible to use thin metal films which still have a sufficient transparency. In case an intransparent first electrode is desired and used, thick metal films may be used.

The substrate can be covered or coated with these conductive materials. Since generally, only a single substrate is required in the structure proposed, the formation of flexible cells is also possible. This enables a multitude of end uses which would be achievable only with difficulty, if at all, with rigid substrates, for example use in bank cards, garments, etc.

The first electrode, especially the TCO layer, may additionally be covered or coated with a solid metal oxide buffer layer (for example of thickness 10 to 200 nm), in order to prevent direct contact of the p-type semiconductor with the TCO layer (see Peng et al, Coord. Chem. Rev. 248, 1479 (2004)). The inventive use of solid p-semiconducting electrolytes, in the case of which contact of the electrolyte with the first electrode is greatly reduced compared to liquid or gel-form electrolytes, however, makes this buffer layer unnecessary in many cases, such that it is possible in many cases to dispense with this layer, which also has a current-limiting effect and can also worsen the contact of the n-semiconducting metal oxide with the first electrode. This enhances the efficiency of the components. On the other hand, such a buffer layer can in turn be utilized in a controlled manner in order to match the current component of the dye solar cell to the current component of the organic solar cell. In addition, in the case of cells in which the buffer layer has been dispensed with, especially in solid cells, problems frequently occur with unwanted recombinations of charge carriers. In this respect, buffer layers are advantageous in many cases specifically in solid cells.

As is well known, thin layers or films of metal oxides are generally inexpensive solid semiconductor materials (n-type semiconductors), but the absorption thereof, due to large band gaps, is typically not within the visible region of the electromagnetic spectrum, but rather usually in the ultraviolet spectral region. For use in solar cells, the metal oxides therefore generally, as is the case in the dye solar cells, have to be combined with a dye as a photosensitizer, which absorbs in the wavelength range of sunlight, i.e. at 300 to 2000 nm, and, in the electronically excited state, injects electrons into the conduction band of the semiconductor. With the aid of a solid p-type semiconductor used additionally in the cell as an electrolyte, which is in turn reduced at the counter electrode, electrons can be recycled to the sensitizer, such that it is regenerated.

Of particular interest for use in organic solar cells are semiconductors zinc oxide, tin dioxide, titanium dioxide or mixtures of these metal oxides. The metal oxides can be used in the form of nanocrystalline porous layers. These layers have a large surface area which is coated with the dye as a sensitizer, such that a high absorption of sunlight is achieved. Metal oxide layers which are structured, for example nanorods, give advantages such as higher electron mobilities or improved pore filling by the dye.

The metal oxide semiconductors can be used alone or in the form of mixtures. It is also possible to coat a metal oxide with one or more other metal oxides. In addition, the metal oxides may also be applied as a coating to another semiconductor, for example GaP, ZnP or ZnS.

Particularly preferred semiconductors are zinc oxide and titanium dioxide in the anatase polymorph, which is preferably used in nanocrystalline form.

In addition, the sensitizers can advantageously be combined with all n-type semiconductors which typically find use in these solar cells. Preferred examples include metal oxides used in ceramics, such as titanium dioxide, zinc oxide, tin(IV) oxide, tungsten(VI) oxide, tantalum(V) oxide, niobium(V) oxide, cesium oxide, strontium titanate, zinc stannate, complex oxides of the perovskite type, for example barium titanate, and binary and ternary iron oxides, which may also be present in nanocrystalline or amorphous form.

Due to the strong absorption that customary organic dyes and phthalocyanines and porphyrins have, even thin layers or films of the n-semiconducting metal oxide are sufficient to absorb the required amount of dye. Thin metal oxide films in turn have the advantage that the probability of unwanted recombination processes falls and that the internal resistance of the dye subcell is reduced. For the n-semiconducting metal oxide, it is possible with preference to use layer thicknesses of 100 nm up to 20 micrometers, more preferably in the range between 500 nm and approx. 3 micrometers.

Dye

In the context of the present invention, as usual in particular for DSCs, the terms "dye", "sensitizer dye" and "sensitizer" are used essentially synonymously without any restriction of possible configurations. Numerous dyes which are usable in the context of the present invention are known from the prior art, and so, for possible material examples, reference may also be made to the above description of the prior art regarding dye solar cells. As a preferred example, one or more of the dyes disclosed in WO 2012/110924 A1 may be used.

Additionally or alternatively, one or more quinolinium dyes with fluorinated counter anion may be used in the detector according to the present invention, such as one or more of the dyes as disclosed in WO 2013/144177 A1. Specifically, one or more of the dyes disclosed in the following may be used in the at least one longitudinal optical sensor and/or in the at least one transversal optical sensor. Details of these dyes and details of the disclosure of these unpublished applications will be given below. Specifically, dye D-5, which will be described below in more detail, may be used. However, one or more other dyes may be used in addition or alternatively.

All dyes listed and claimed may in principle also be present as pigments. Dye-sensitized solar cells based on titanium dioxide as a semiconductor material are described, for example, in U.S. Pat. No. 4,927,721 A, Nature 353, p. 737-740 (1991) and U.S. Pat. No. 5,350,644 A, and also Nature 395, p. 583-585 (1998) and EP 1 176 646 A1. The dyes described in these documents can in principle also be used advantageously in the context of the present invention. These dye solar cells preferably comprise monomolecular films of transition metal complexes, especially ruthenium complexes, which are bonded to the titanium dioxide layer via acid groups as sensitizers.

Dyes for use in dye-sensitized solar cells which may comprise ruthenium complexes have been rather of academic interest so far, particularly due to the high costs of ruthenium. However, a dye-sensitized solar cell which may be used in the detector according to the present invention would only require such a small amount of ruthenium that the cost argument may easily be overruled by its attractive features for use within the present method for determining a position of at least one object, particularly in a case where at least one light beam which travels from the object might involve a spectral range which may at least partially include a part of the infrared (IR) region, i.e. a part of the electromagnetic spectrum ranging from approximately 750 nm to 1000 μm, preferentially a part thereof generally denoted as near infrared (NIR) region, which is usually considered to range from approximately 750 nm to 1.5 μm. Examples of known ruthenium complexes which might be suitable for an application within the detector according to the present invention are:

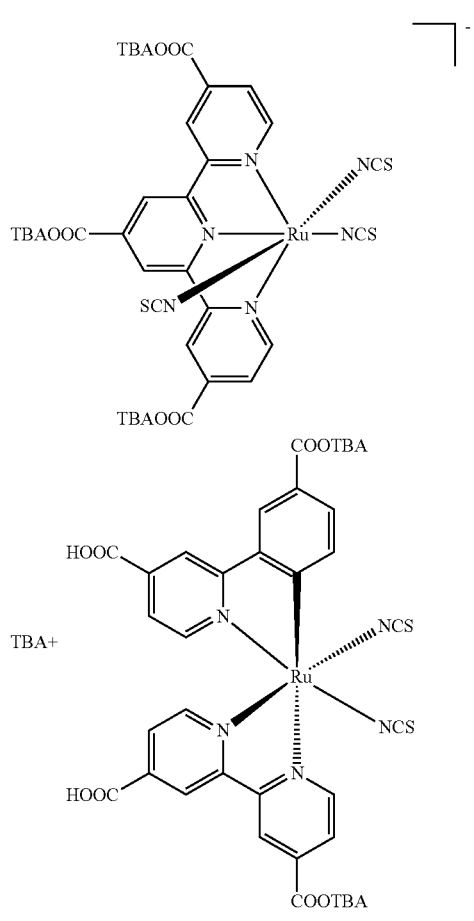

TBA = n-tetrabutylammonium

Another example may be found in T. Kinoshita, J. T. Dy, S. Uchida, T. Kubo, and H. Segawa, *Wideband dye-sensitized solar cells employing a phosphine-coordinated ruthenium sensitizer*, Nature Photonics, 7, 535-539 (2013), wherein a phosphine-coordinated ruthenium complex is described, which exhibits a strong absorption in the NIR, particularly within the range from 750 nm to 950 nm, which may thus, yield a dye-sensitized solar cell with a promising efficiency:

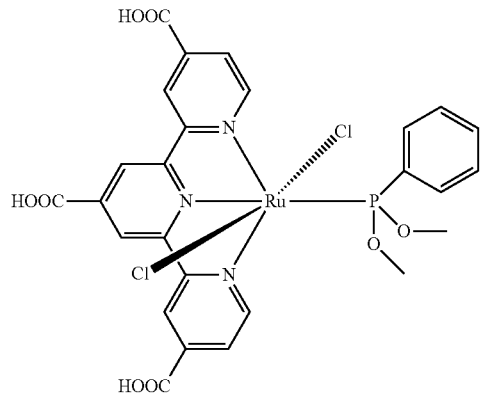

Owing to weak absorption properties of most known dyes within the IR region, including the NIR region, dyes comprising ruthenium complexes may, thus, be able to extend the scope of the detector according to the present invention into the IR region, in particular into the NIR region, e.g. as being used as active depth sensors, particularly in applications related to computer vision, wherein IR light may play an important role, as described elsewhere in this application.

Many sensitizers which have been proposed include metal-free organic dyes, which are likewise also usable in the context of the present invention. High efficiencies of more than 4%, especially in solid dye solar cells, can be achieved, for example, with indoline dyes (see, for example, Schmidt-Mende et al., Adv. Mater. 2005, 17, 813). U.S. Pat. No. 6,359,211 describes the use, also implementable in the context of the present invention, of cyanine, oxazine, thiazine and acridine dyes which have carboxyl groups bonded via an alkylene radical for fixing to the titanium dioxide semiconductor.

Organic dyes now achieve efficiencies of almost 12.1% in liquid cells (see, for example, P. Wang et al., ACS. Nano 2010). Pyridinium-containing dyes have also been reported, can be used in the context of the present invention and exhibit promising efficiencies.

Particularly preferred sensitizer dyes in the dye solar cell proposed are the perylene derivatives, terrylene derivatives and quaterrylene derivatives described in DE 10 2005 053 995 A1 or WO 2007/054470 A1. The use of these dyes, which is also possible in the context of the present invention, leads to photovoltaic elements with high efficiencies and simultaneously high stabilities.

The rylenes exhibit strong absorption in the wavelength range of sunlight and can, depending on the length of the conjugated system, cover a range from about 400 nm (perylene derivatives I from DE 10 2005 053 995 A1) up to about 900 nm (quaterrylene derivatives I from DE 10 2005 053 995 A1). Rylene derivatives I based on terrylene absorb, according to the composition thereof, in the solid state adsorbed onto titanium dioxide, within a range from about 400 to 800 nm. In order to achieve very substantial utilization of the incident sunlight from the visible into the near infrared region, it is advantageous to use mixtures of different rylene derivatives I. Occasionally, it may also be advisable also to use different rylene homologs.

The rylene derivatives I can be fixed easily and in a permanent manner to the n-semiconducting metal oxide film. The bonding is effected via the anhydride function (x1) or the carboxyl groups —COOH or —COO— formed in situ, or via the acid groups A present in the imide or condensate radicals ((x2) or (x3)). The rylene derivatives I described in DE 10 2005 053 995 A1 have good suitability for use in dye-sensitized solar cells in the context of the present invention.

It is particularly preferred when the dyes, at one end of the molecule, have an anchor group which enables the fixing thereof to the n-type semiconductor film. At the other end of the molecule, the dyes preferably comprise electron donors Y which facilitate the regeneration of the dye after the electron release to the n-type semiconductor, and also prevent recombination with electrons already released to the semiconductor.

For further details regarding the possible selection of a suitable dye, it is possible, for example, again to refer to DE 10 2005 053 995 A1. By way of example, it is possible especially to use ruthenium complexes, porphyrins, other organic sensitizers, and preferably rylenes.

The dyes can be fixed onto or into the n-semiconducting metal oxide films in a simple manner. For example, the n-semiconducting metal oxide films can be contacted in the freshly sintered (still warm) state over a sufficient period (for example about 0.5 to 24 h) with a solution or suspension of the dye in a suitable organic solvent. This can be accomplished, for example, by immersing the metal oxide-coated substrate into the solution of the dye.

If combinations of different dyes are to be used, they may, for example, be applied successively from one or more solutions or suspensions which comprise one or more of the dyes. It is also possible to use two dyes which are separated by a layer of, for example, CuSCN (on this subject see, for example, Tennakone, K. J., Phys. Chem. B. 2003, 107, 13758). The most convenient method can be determined comparatively easily in the individual case.

In the selection of the dye and of the size of the oxide particles of the n-semiconducting metal oxide, the organic solar cell should be configured such that a maximum amount of light is absorbed. The oxide layers should be structured such that the solid p-type semiconductor can efficiently fill the pores. For instance, smaller particles have greater surface areas and are therefore capable of adsorbing a greater amount of dyes. On the other hand, larger particles generally have larger pores which enable better penetration through the p-conductor.

p-Semiconducting Organic Material

As described above, the at least one DSC or sDSC of the at least one transversal optical sensor and/or the at least one longitudinal optical sensor can comprise in particular at least one p-semiconducting organic material, preferably at least one solid p-semiconducting material, which is also designated hereinafter as p-type semiconductor or p-type conductor. Hereinafter, a description is given of a series of preferred examples of such organic p-type semiconductors which can be used individually or else in any desired combination, for example in a combination of a plurality of layers with a respective p-type semiconductor, and/or in a combination of a plurality of p-type semiconductors in one layer.

In order to prevent recombination of the electrons in the n-semiconducting metal oxide with the solid p-conductor, it is possible to use, between the n-semiconducting metal oxide and the p-type semiconductor, at least one passivating layer which has a passivating material. This layer should be very thin and should as far as possible cover only the as yet uncovered sites of the n-semiconducting metal oxide. The passivation material may, under some circumstances, also be applied to the metal oxide before the dye. Preferred passivation materials are especially one or more of the following substances: $Al_2O_3$; silanes, for example $CH_3SiCl_3$; $Al^{3+}$; 4-tert-butylpyridine (TBP); MgO; GBA (4-guanidinobutyric acid) and similar derivatives; alkyl acids; hexadecylmalonic acid (HDMA).

As described above, in the context of the organic solar cell, preferably one or more solid organic p-type semiconductors are used—alone or else in combination with one or more further p-type semiconductors which are organic or inorganic in nature. In the context of the present invention, a p-type semiconductor is generally understood to mean a material, especially an organic material, which is capable of conducting holes, that is to say positive charge carriers. More particularly, it may be an organic material with an extensive π-electron system which can be oxidized stably at least once, for example to form what is called a free-radical cation. For example, the p-type semiconductor may comprise at least one organic matrix material which has the properties mentioned. Furthermore, the p-type semiconductor can optionally comprise one or a plurality of dopants which intensify the p-semiconducting properties. A significant parameter influencing the selection of the p-type semiconductor is the hole mobility, since this partly determines the hole diffusion length (cf. Kumara, G., Langmuir, 2002, 18, 10493-10495). A comparison of charge carrier mobilities in different Spiro compounds can be found, for example, in T. Saragi, Adv. Funct. Mater. 2006, 16, 966-974.

Preferably, in the context of the present invention, organic semiconductors are used (i.e. low molecular weight, oligomeric or polymeric semiconductors or mixtures of such semiconductors). Particular preference is given to p-type semiconductors which can be processed from a liquid phase. Examples here are p-type semiconductors based on polymers such as polythiophene and polyarylamines, or on amorphous, reversibly oxidizable, nonpolymeric organic compounds, such as the spirobifluorenes mentioned at the outset (cf., for example, US 2006/0049397 and the spiro compounds disclosed therein as p-type semiconductors, which are also usable in the context of the present invention). Preference is given to using low molecular weight organic semiconductors, such as the low molecular weight p-type semiconducting materials as disclosed in WO 2012/110924 A1, preferably spiro-MeOTAD, and/or one or more of the p-type semiconducting materials disclosed in Leijtens et al., ACS Nano, VOL. 6, NO. 2, 1455-1462 (2012). Additionally or alternatively, one or more of the p-type semiconducting materials as disclosed in WO 2010/094636 A1 may be used, the full content of which is herewith included by reference. In addition, reference may also be made to the remarks regarding the p-semiconducting materials and dopants from the above description of the prior art.

The p-type semiconductor is preferably producible or produced by applying at least one p-conducting organic material to at least one carrier element, wherein the application is effected for example by deposition from a liquid phase comprising the at least one p-conducting organic material. The deposition can in this case once again be effected, in principle, by any desired deposition process, for example by spin-coating, knife-coating, printing or combinations of the stated and/or other deposition methods.

The organic p-type semiconductor may especially comprise at least one Spiro compound and/or especially be selected from: a spiro compound, especially spiro-MeOTAD; a compound with the structural formula:

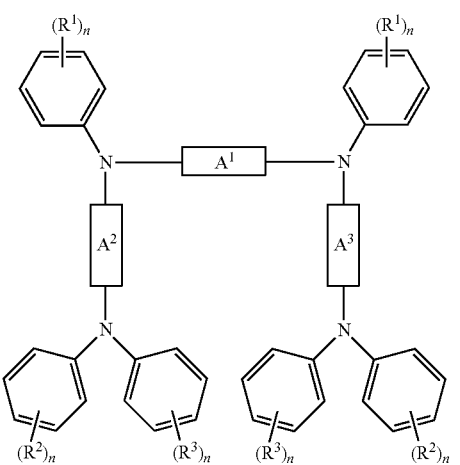

(I)

in which
A¹, A², A³ are each independently optionally substituted aryl groups or heteroaryl groups,
R¹, R², R³ are each independently selected from the group consisting of the substituents —R, —OR, —NR$_2$, -A⁴-OR and -A⁴-NR$_2$,
where R is selected from the group consisting of alkyl, aryl and heteroaryl,
and
where A⁴ is an aryl group or heteroaryl group, and
where n at each instance in formula I is independently a value of 0, 1, 2 or 3,
with the proviso that the sum of the individual n values is at least 2 and at least two of the R¹, R² and R³ radicals are —OR and/or —NR$_2$.
Preferably, A² and A³ are the same; accordingly, the compound of the formula (I) preferably has the following structure (Ia)

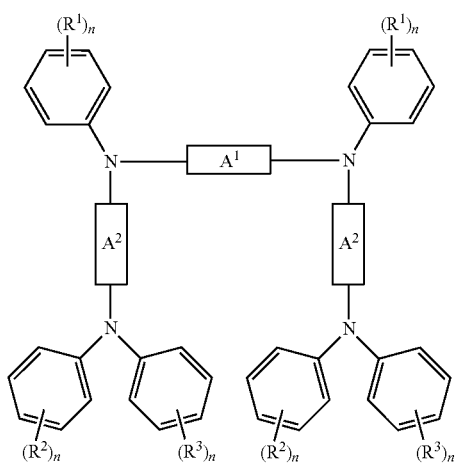

(Ia)

More particularly, as explained above, the p-type semiconductor may thus have at least one low molecular weight organic p-type semiconductor. A low molecular weight material is generally understood to mean a material which is present in monomeric, nonpolymerized or nonoligomerized form. The term "low molecular weight" as used in the present context preferably means that the p-type semiconductor has molecular weights in the range from 100 to 25 000 g/mol. Preferably, the low molecular weight substances have molecular weights of 500 to 2000 g/mol.

In general, in the context of the present invention, p-semiconducting properties are understood to mean the property of materials, especially of organic molecules, to form holes and to transport these holes and/or to pass them on to adjacent molecules. More particularly, stable oxidation of these molecules should be possible. In addition, the low molecular weight organic p-type semiconductors mentioned may especially have an extensive π-electron system. More particularly, the at least one low molecular weight p-type semiconductor may be processable from a solution. The low molecular weight p-type semiconductor may especially comprise at least one triphenylamine. It is particularly preferred when the low molecular weight organic p-type semiconductor comprises at least one Spiro compound. A spiro compound is understood to mean polycyclic organic compounds whose rings are joined only at one atom, which is also referred to as the Spiro atom. More particularly, the spiro atom may be sp$^3$-hybridized, such that the constituents of the spiro compound connected to one another via the Spiro atom are, for example, arranged in different planes with respect to one another.

More preferably, the spiro compound has a structure of the following formula:

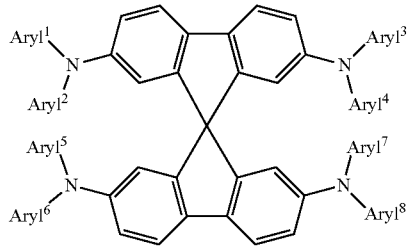

where the aryl¹, aryl², aryl³, aryl⁴, aryl⁵, aryl⁶, aryl⁷ and aryl⁸ radicals are each independently selected from substituted aryl radicals and heteroaryl radicals, especially from substituted phenyl radicals, where the aryl radicals and heteroaryl radicals, preferably the phenyl radicals, are each independently substituted, preferably in each case by one or more substituents selected from the group consisting of —O-alkyl, —OH, —F, —Cl, —Br and —I, where alkyl is preferably methyl, ethyl, propyl or isopropyl. More preferably, the phenyl radicals are each independently substituted, in each case by one or more substituents selected from the group consisting of —O-Me, —OH, —F, —Cl, —Br and —I.

Further preferably, the spiro compound is a compound of the following formula:

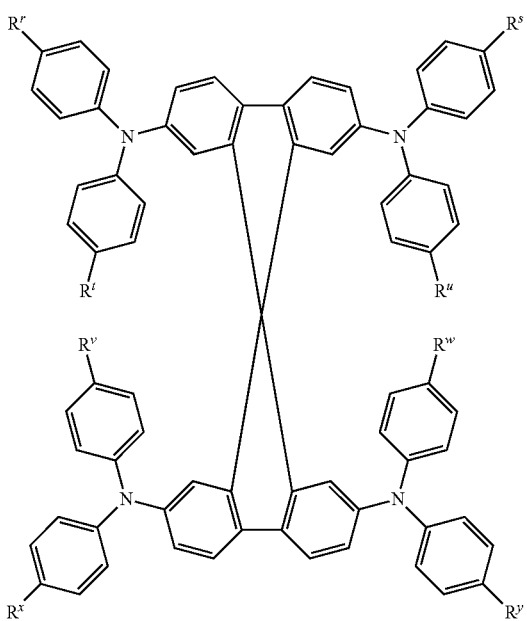

where $R^r$, $R^s$, $R^t$, $R^u$, $R^v$, $R^w$, $R^x$ and $R^y$ are each independently selected from the group consisting of —O-alkyl, —OH, —F, —Cl, —Br and —I, where alkyl is preferably methyl, ethyl, propyl or isopropyl. More preferably, $R^r$, $R^s$, $R^t$, $R^u$, $R^v$, $R^w$, $R^x$ and $R^y$ are each independently selected from the group consisting of —O-Me, —OH, —F, —Cl, —Br and —I.

More particularly, the p-type semiconductor may comprise spiro-MeOTAD or consist of spiro-MeOTAD, i.e. a compound of the formula below, commercially available, for example, from Merck KGaA, Darmstadt, Germany:

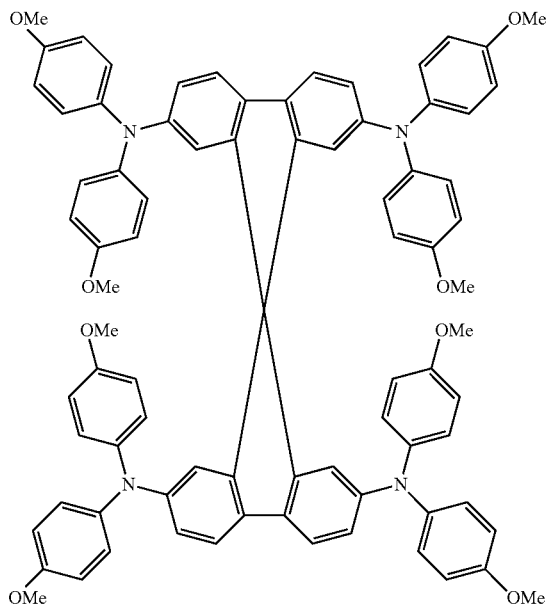 [SMILES: COc1ccc(N(c2ccc(OC)cc2)c2ccc3c(c2)C2(c4cc(N(c5ccc(OC)cc5)c5ccc(OC)cc5)ccc4-3)c3cc(N(c4ccc(OC)cc4)c4ccc(OC)cc4)ccc3-c3ccc(N(c4ccc(OC)cc4)c4ccc(OC)cc4)cc32)cc1]

Alternatively or additionally, it is also possible to use other p-semiconducting compounds, especially low molecular weight and/or oligomeric and/or polymeric p-semiconducting compounds.

In an alternative embodiment, the low molecular weight organic p-type semiconductor comprises one or more compounds of the above-mentioned general formula I, for which reference may be made, for example, to PCT application number PCT/EP2010/051826, which will be published after the priority date of the present application. The p-type semiconductor may comprise the at least one compound of the above-mentioned general formula I additionally or alternatively to the Spiro compound described above.

The term "alkyl" or "alkyl group" or "alkyl radical" as used in the context of the present invention is understood to mean substituted or unsubstituted $C_1$-$C_{20}$-alkyl radicals in general. Preference is given to $C_1$- to $C_{10}$-alkyl radicals, particular preference to $C_1$- to $C_8$-alkyl radicals. The alkyl radicals may be either straight-chain or branched. In addition, the alkyl radicals may be substituted by one or more substituents selected from the group consisting of $C_1$-$C_{20}$-alkoxy, halogen, preferably F, and $C_6$-$C_{30}$-aryl which may in turn be substituted or unsubstituted. Examples of suitable alkyl groups are methyl, ethyl, propyl, butyl, pentyl, hexyl, heptyl and octyl, and also isopropyl, isobutyl, isopentyl, sec-butyl, tert-butyl, neopentyl, 3,3-dimethylbutyl, 2-ethylhexyl, and also derivatives of the alkyl groups mentioned substituted by $C_6$-$C_{30}$-aryl, $C_1$-$C_{20}$-alkoxy and/or halogen, especially F, for example $CF_3$.

The term "aryl" or "aryl group" or "aryl radical" as used in the context of the present invention is understood to mean optionally substituted $C_6$-$C_{30}$-aryl radicals which are derived from monocyclic, bicyclic, tricyclic or else multicyclic aromatic rings, where the aromatic rings do not comprise any ring heteroatoms. The aryl radical preferably comprises 5- and/or 6-membered aromatic rings. When the aryls are not monocyclic systems, in the case of the term "aryl" for the second ring, the saturated form (perhydro form) or the partly unsaturated form (for example the dihydro form or tetrahydro form), provided the particular forms are known and stable, is also possible. The term "aryl" in the context of the present invention thus comprises, for example, also bicyclic or tricyclic radicals in which either both or all three radicals are aromatic, and also bicyclic or tricyclic radicals in which only one ring is aromatic, and also tricyclic radicals in which two rings are aromatic. Examples of aryl are: phenyl, naphthyl, indanyl, 1,2-dihydronaphthenyl, 1,4-dihydronaphthenyl, fluorenyl, indenyl, anthracenyl, phenanthrenyl or 1,2,3,4-tetrahydronaphthyl. Particular preference is given to $C_6$-$C_{10}$-aryl radicals, for example phenyl or naphthyl, very particular preference to $C_6$-aryl radicals, for example phenyl. In addition, the term "aryl" also comprises ring systems comprising at least two monocyclic, bicyclic or multicyclic aromatic rings joined to one another via single or double bonds. One example is that of biphenyl groups.

The term "heteroaryl" or "heteroaryl group" or "heteroaryl radical" as used in the context of the present invention is understood to mean optionally substituted 5- or 6-membered aromatic rings and multicyclic rings, for example bicyclic and tricyclic compounds having at least one heteroatom in at least one ring. The heteroaryls in the context of the invention preferably comprise 5 to 30 ring atoms. They may be monocyclic, bicyclic or tricyclic, and some can be derived from the afore-mentioned aryl by replacing at least one carbon atom in the aryl base skeleton with a heteroatom. Preferred heteroatoms are N, O and S. The hetaryl radicals more preferably have 5 to 13 ring atoms. The base skeleton of the heteroaryl radicals is especially preferably selected from systems such as pyridine and five-membered heteroaromatics such as thiophene, pyrrole, imidazole or furan. These base skeletons may optionally be fused to one or two six-membered aromatic radicals. In addition, the term "heteroaryl" also comprises ring systems comprising at least two monocyclic, bicyclic or multicyclic aromatic rings joined to one another via single or double bonds, where at least one ring comprises a heteroatom. When the heteroaryls are not monocyclic systems, in the case of the term "heteroaryl" for at least one ring, the saturated form (perhydro form) or the partly unsaturated form (for example the dihydro form or tetrahydro form), provided the particular forms are known and stable, is also possible. The term "heteroaryl" in the context of the present invention thus comprises, for example, also bicyclic or tricyclic radicals in which either both or all three radicals are aromatic, and also bicyclic or tricyclic radicals in which only one ring is aromatic, and also tricyclic radicals in which two rings are aromatic, where at least one of the rings, i.e. at least one aromatic or one nonaromatic ring has a heteroatom. Suitable fused heteroaromatics are, for example, carbazolyl, benzimidazolyl, benzofuryl, dibenzofuryl or dibenzothiophenyl. The base skeleton may be substituted at one, more than one or all substitutable positions, suitable substituents being the same as have already been specified under the definition of $C_6$-$C_{30}$-aryl. However, the hetaryl radicals are preferably unsubstituted. Suitable hetaryl radicals are, for example, pyridin-2-yl, pyridin-3-yl, pyridin-4-yl, thiophen-2-yl, thiophen-3-yl, pyrrol-2-yl, pyrrol-3-yl, furan-2-yl, furan-3-yl and imidazol-2-yl and the corresponding benzofused radicals, especially carbazolyl, benzimidazolyl, benzofuryl, dibenzofuryl or dibenzothiophenyl.

In the context of the invention the term "optionally substituted" refers to radicals in which at least one hydrogen radical of an alkyl group, aryl group or heteroaryl group has been replaced by a substituent. With regard to the type of this substituent, preference is given to alkyl radicals, for example methyl, ethyl, propyl, butyl, pentyl, hexyl, heptyl and octyl, and also isopropyl, isobutyl, isopentyl, sec-butyl, tert-butyl, neopentyl, 3,3-dimethylbutyl and 2-ethylhexyl, aryl radicals, for example $C_6$-$C_{10}$-aryl radicals, especially phenyl or naphthyl, most preferably Ca-aryl radicals, for example phenyl, and hetaryl radicals, for example pyridin-2-yl, pyridin-3-yl, pyridin-4-yl, thiophen-2-yl, thiophen-3-yl, pyrrol-2-yl, pyrrol-3-yl, furan-2-yl, furan-3-yl and imidazol-2-yl, and also the corresponding benzofused radicals, especially carbazolyl, benzimidazolyl, benzofuryl, dibenzofuryl or dibenzothiophenyl. Further examples include the following substituents: alkenyl, alkynyl, halogen, hydroxyl.

The degree of substitution here may vary from monosubstitution up to the maximum number of possible substituents.

Preferred compounds of the formula I for use in accordance with the invention are notable in that at least two of the $R^1$, $R^2$ and $R^3$ radicals are para-OR and/or —NR$_2$ substituents. The at least two radicals here may be only —OR radicals, only —NR$_2$ radicals, or at least one —OR and at least one —NR$_2$ radical.

Particularly preferred compounds of the formula I for use in accordance with the invention are notable in that at least four of the $R^1$, $R^2$ and $R^3$ radicals are para-OR and/or —NR$_2$ substituents. The at least four radicals here may be only —OR radicals, only —NR$_2$ radicals or a mixture of —OR and —NR$_2$ radicals.

Very particularly preferred compounds of the formula I for use in accordance with the invention are notable in that all of the $R^1$, $R^2$ and $R^3$ radicals are para-OR and/or —NR$_2$ substituents. They may be only —OR radicals, only —NR$_2$ radicals or a mixture of —OR and —NR$_2$ radicals.

In all cases, the two R in the —NR$_2$ radicals may be different from one another, but they are preferably the same.

Preferably, $A^1$, $A^2$ and $A^3$ are each independently selected from the group consisting of

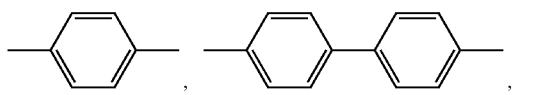

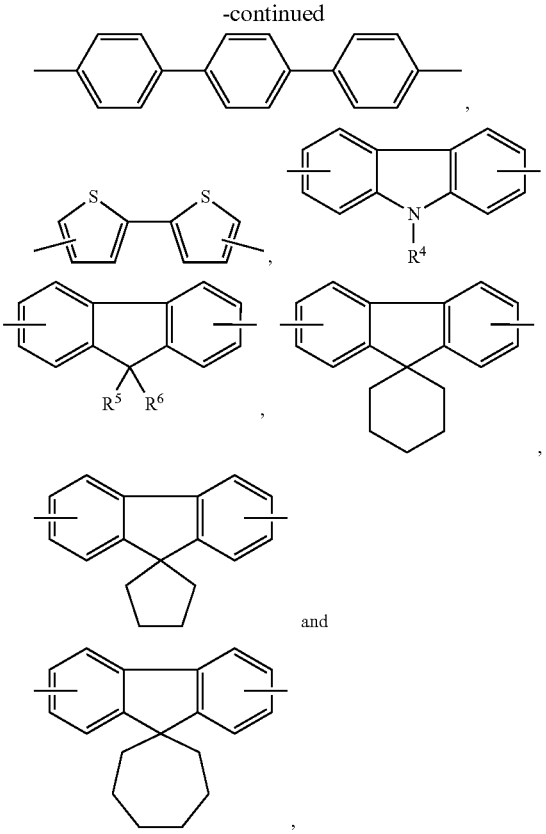

in which m is an integer from 1 to 18, $R^4$ is alkyl, aryl or heteroaryl, where $R^4$ is preferably an aryl radical, more preferably a phenyl radical, $R^5$, $R^6$ are each independently H, alkyl, aryl or heteroaryl, where the aromatic and heteroaromatic rings of the structures shown may optionally have further substitution. The degree of substitution of the aromatic and heteroaromatic rings here may vary from monosubstitution up to the maximum number of possible substituents.

Preferred substituents in the case of further substitution of the aromatic and heteroaromatic rings include the substituents already mentioned above for the one, two or three optionally substituted aromatic or heteroaromatic groups.

Preferably, the aromatic and heteroaromatic rings of the structures shown do not have further substitution.

More preferably, $A^1$, $A^2$ and $A^3$ are each independently

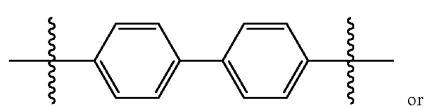

or

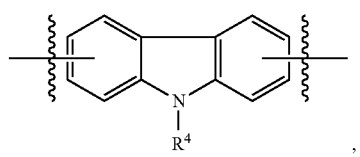

more preferably
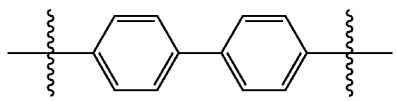
or
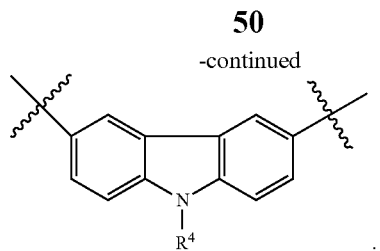
More preferably, the at least one compound of the formula (I) has one of the following structures:
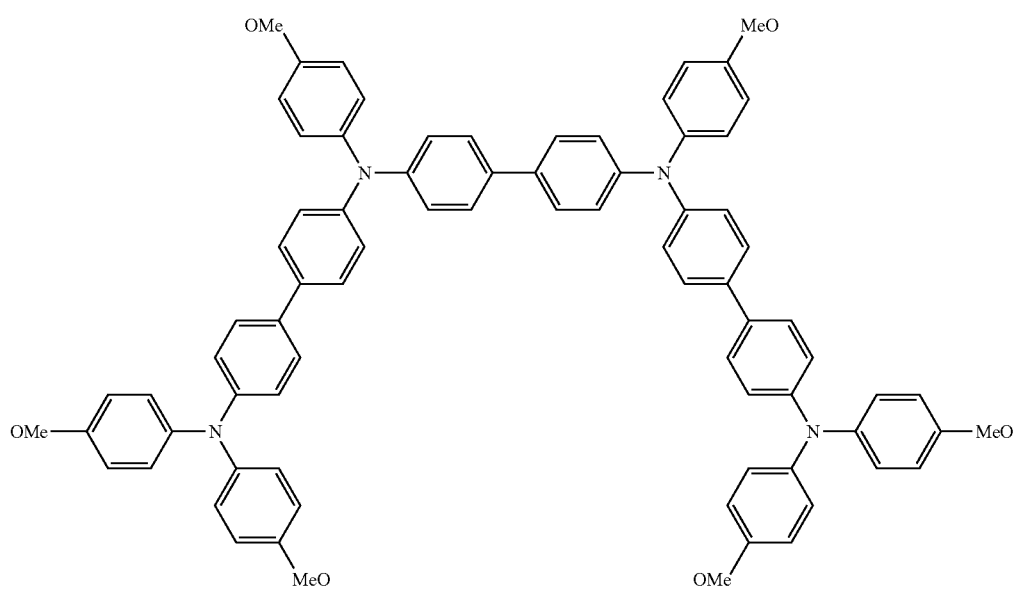
ID367
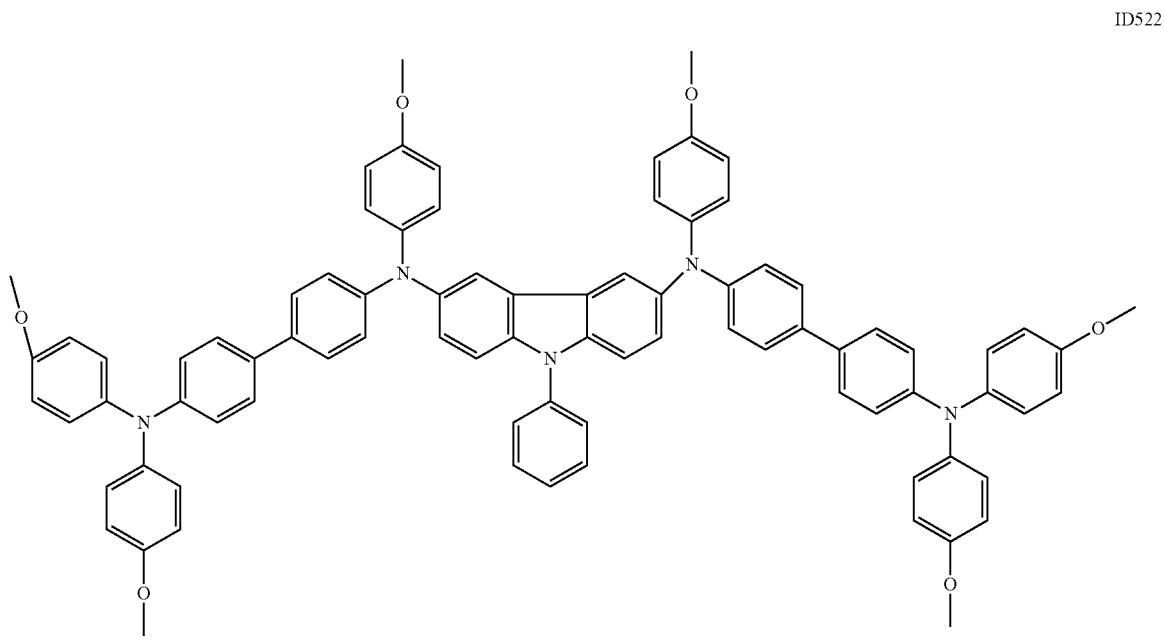
ID522

In an alternative embodiment, the organic p-type semiconductor comprises a compound of the type ID322 having the following structure:

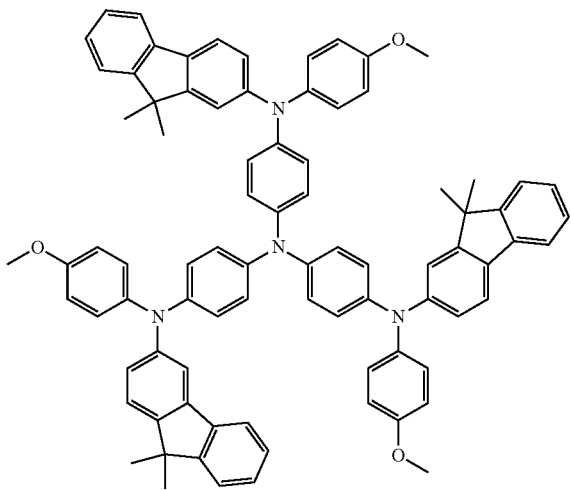 [SMILES: COc1ccc(N(c2ccc(N(c3ccc(N(c4ccc(OC)cc4)c4ccc5c(c4)C(C)(C)c4ccccc4-5)cc3)c3ccc(N(c4ccc(OC)cc4)c4ccc5c(c4)C(C)(C)c4ccccc4-5)cc3)cc2)c2ccc3c(c2)-c2ccccc2C3(C)C)cc1]

The compounds for use in accordance with the invention can be prepared by customary methods of organic synthesis known to those skilled in the art. References to relevant (patent) literature can additionally be found in the synthesis examples adduced below and/or in the disclosure of WO 2010/094636 A1.

Second Electrode a) General Remarks

The second electrode may be a bottom electrode facing the substrate or else a top electrode facing away from the substrate. As outlined above, the second electrode may be fully or partially transparent or, else, may be intransparent. As used herein, the term partially transparent refers to the fact that the second electrode may comprise transparent regions and intransparent regions.

In case the second electrode is fully or partially transparent, the second electrode may comprise at least one transparent conductive electrode material, which may be selected from the group consisting of: an inorganic transparent conductive material; an organic transparent conductive material. As an example of an inorganic conductive transparent material, a metal oxide may be used, such as ITO and/or FTO. As an example of an organic transparent conductive material, one or more electrically conductive polymer materials may be used. As used herein, the term "transparent" refers to the actual layer or layer setup of the second electrode. Thus, the transparency may be generated by using thin layers, such as layers having a thickness of less than 100 nm, more preferably less than 50 nm.

One or more materials of the following group of materials may be used: at least one metallic material, preferably a metallic material selected from the group consisting of aluminum, silver, platinum, gold; at least one nonmetallic inorganic material, preferably LiF; at least one organic conductive material, preferably at least one electrically conductive polymer and, more preferably, at least one transparent electrically conductive polymer.

The second electrode may comprise one or more metals in a pure form and/or may comprise one or more metal alloys. The second electrode may further comprise a single layer and/or may comprise a layer setup of two or more layers, wherein, preferably at least one layer is a metal layer comprising one or more metals or metal alloys. As an example, the second electrode may comprise at least one metal selected from the group listed in the preceding paragraph in a pure form and/or as a component of an alloy. As an example, the second electrode may comprise at least one alloy selected from the group consisting of: a molybdenum alloy; a niobium alloy; a neodymium alloy; an aluminum alloy. Most preferably, the second electrode may comprise at least one alloy selected from the group consisting of: MoNb; AlNd; MoNb. As an example, a layer setup comprising two or more layers of two or more of the named alloys may be used, such as a layer setup comprising the following layers: MoNb/AlNd/MoNb. As an example, the following layer thicknesses may be used: MoNb 30 nm/AlNd 100 nm/MoNb 30 nm. Additionally or alternatively, however, other setups and/or other layer thicknesses may be used.

The second electrode may comprise at least one metal electrode, wherein one or more metals in pure form or as a mixture/alloy, such as especially aluminum or silver may be used.

Additionally or alternatively, nonmetallic materials may be used, such as inorganic materials and/or organic materials, both alone and in combination with metal electrodes. As an example, the use of inorganic/organic mixed electrodes or multilayer electrodes is possible, for example the use of LiF/Al electrodes. Additionally or alternatively, conductive polymers may be used. Thus, the second electrode of the at least one transversal optical sensor and/or the second electrode of the at least one longitudinal optical sensor preferably may comprise one or more conductive polymers.

As an example, one or more electrically conductive polymers may be used, selected from the group consisting of: polyanaline (PANI) and/or its chemical relatives; a polythiophene and/or its chemical relatives, such as poly(3-hexylthiophene) (P3HT) and/or PEDOT:PSS (poly(3,4-ethylenedioxythiophene)poly(styrenesulfonate)). Additionally or alternatively, one or more of the conductive polymers as disclosed in EP2507286 A2, EP2205657 A1 or EP2220141 A1

In addition or alternatively, inorganic conductive materials may be used, such as inorganic conductive carbon materials, such as carbon materials selected from the group consisting of: graphite, graphene, carbon nano-tubes, carbon nano-wires.

In addition, it is also possible to use electrode designs in which the quantum efficiency of the components is increased by virtue of the photons being forced, by means of appropriate reflections, to pass through the absorbing layers at least twice. Such layer structures are also referred to as "concentrators" and are likewise described, for example, in WO 02/101838 (especially pages 23-24).

The second electrode may be identical for the at least one transversal optical sensor and the at least one longitudinal optical sensor. Still, different setups of the second electrode for the transversal optical sensor and the longitudinal optical sensor may be used.

b) Second Electrode of the Transversal Sensor Device

Preferably, the second electrode for the at least one transversal sensor device is at least partially transparent. As an example, the second electrode of the transversal sensor device may comprise at least one transparent electrode layer which covers a sensor region, preferably a sensor area, of the transversal optical sensor. As outlined above, the at least one transparent electrode layer preferably may comprise at least one layer of an electrically conductive polymer, preferably a transparent electrically conductive polymer.

Additionally, the second electrode of the transversal sensor device may comprise two or more partial electrodes, which, preferably, may be made of one or more metals, such as one or more of the metals and/or metal alloys listed above. As an example, the two or more partial electrodes may form a frame which surrounds the sensor region, preferably the sensor area, of the transversal optical sensor. The frame may have a polygonal shape, such as a rectangular or, preferably, a square shape. Preferably, on each side of the polygon, preferably the rectangle or square, one partial electrodes is provided, such as a partial electrode being formed as a bar fully or partially extending along the side.

The at least one electrically conductive polymer may have an electrical conductivity of at least one order of magnitude below electrical conductivity of the material of the partial electrodes, preferably of at least two orders of magnitude below. The at least one electrically conductive polymer may electrically interconnect the partial electrodes. Thus, as outlined above, the partial electrodes may form a frame surrounding a sensor region, preferably a sensor area, of the transversal optical sensor. The at least one layer of the electrically conductive polymer may form a transparent, electrically conductive layer which fully or partially covers the sensor region and which electrically contacts the partial electrodes. As an example, the partial electrodes may comprise metal strips or metal bars along the sides of a rectangle, wherein an inner region of the rectangle forms the sensor region, wherein the at least one layer of the electrically conductive polymer forms one or more transparent electrode layers fully or partially covering the inner region of the rectangle and electrically contacting the metal strips or bars.

In case two or more partial electrodes are used which, preferably, are electrically interconnected by at least one layer of an electrically conductive polymer, each of the partial electrodes may be contacted individually, such as by one or more electrical leads or contact pads. Thus, by electrically contacting the partial electrodes, an electrical current through each of the partial electrodes may be measured individually, such as by using an individual current measurement device and/or by using a sequential measurement scheme for individually detecting the currents through the partial electrodes. The detector, for the purpose of measuring the currents through the partial electrodes, may provide an appropriate measurement setup comprising one or more current measurement devices.

c) Second Electrode of the Longitudinal Sensor Device

Generally, with regard to the at least one second electrode of the at least one longitudinal sensor device, the above-mentioned details regarding the transversal sensor device may apply mutatis mutandis. Again, the second electrode of the at least one longitudinal sensor device preferably is transparent. In case a plurality of longitudinal sensor devices is provided, such as in a stack, preferably all second electrodes of the longitudinal sensor devices are transparent but the second electrode of the last longitudinal sensor device facing away from the object. The second electrode of the last longitudinal sensor device may be transparent or intransparent.

With regard to materials which may be used for the second electrode of the longitudinal sensor device, reference may be made to the above-mentioned materials, which may be selected from metallic materials, nonmetallic inorganic materials and electrically conductive organic materials.

Again, the second electrode of the longitudinal optical sensor or, in case a plurality of longitudinal optical sensors is provided, of at least one of the longitudinal optical sensors may optionally be subdivided into partial electrodes which may be contacted individually. However, since for the purpose of the at least one longitudinal optical sensor generally only one individual longitudinal sensor signal is required per longitudinal optical sensor, the second electrode of the at least one longitudinal optical sensor may as well be designed to provide a single sensor signal and, thus, may provide a single electrode contact only.

The second electrode of the longitudinal optical sensor, again, preferably may comprise one or more layers of an electrically conductive polymer, such as one or more of the polymers mentioned above. The at least one layer of the electrically conductive polymer, which preferably is transparent, may fully or partially cover the sensor region, preferably a sensor area, of the longitudinal optical sensor. In addition, one or more contact pads may be provided which electrically contact the at least one electrically conductive polymer layer. This at least one contact pad for the second electrode of the longitudinal optical sensor preferably may be made of at least one metal, such as at least one of the methods mentioned above, and/or may fully or partially be made of at least one inorganic conductive material, such as one or more transparent conductive oxides, such as one or more of the conductive oxides mentioned above with regard to the first electrode.

Encapsulation

The at least one transversal optical sensor and/or the at least one longitudinal optical sensor may further be encapsulated and/or packaged, in order to provide protection against environmental influences, such as oxygen and/or humidity. Thereby, an increased long-term stability may be provided.

Therein, each of the optical sensors may be encapsulated individually. Thus, an individual encapsulation may be provided for each of the optical sensors, such as an encapsulation for the transversal optical sensor or each of the transversal optical sensors, and an individual encapsulation for the longitudinal optical sensor or for each of the longitudinal optical sensors. Additionally or alternatively, a plurality of optical sensors may be encapsulated as a group. Thus, an encapsulation may be provided which encapsulates more than one optical sensor, such as a plurality of transversal optical sensors, a plurality of longitudinal optical sensors, or at least one transversal optical sensor and at least one longitudinal optical sensor.

For the purpose of encapsulation, various techniques may be used. Thus, the detector may comprise an airtight housing which protects the optical sensors. Additionally or alternatively, specifically in case organic photodetectors and, more preferably, DSCs or sDSCs are used, an encapsulation by one or more lids interacting with a substrate of the optical sensors may be used. Thus, a lid made of a metal, a ceramic material or a glass material may be glued to a substrate of the optical sensors, wherein a layer setup is located in inner space of the lid. Two or more contact leads for contacting the at least one first electrode and the at least one second electrode may be provided which may be contacted from the outside of the lid.

Various other encapsulation techniques may be used alternatively or in addition. Thus, encapsulation by one or more encapsulation layers may be provided. The at least one encapsulation layer may be deposited on top of a layer setup of the devices. Thus, one or more organic and/or inorganic encapsulation materials such as one or more barrier materials may be used.

Potential Uses of the Present Invention

As outlined above, the detector device, the detector system, the human-machine interface, the entertainment device, the tracking system and the method of the present invention (in the following also referred to as the devices and methods according to the present invention) may be used for various purposes and in many fields of application. Some examples of potential applications are given the above and will be given in further detail below. Therein, reference will mostly be made to the detector device. It shall be noted, however, that the other devices of the present invention as well as the method of the present invention may be applied in a similar way, as the skilled person will recognize.

Thus, generally, the detector device according to the present invention may be applied in various fields of uses. Specifically, the detector device may be applied for a purpose of use, selected from the group consisting of: a position measurement in traffic technology; an entertainment application; a security application; a human-machine interface application; a tracking application; a photography application; a mobile application; an optical head-mounted display; a webcam; an audio device; a Dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application; a use in combination with at least one time-of-flight detector. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing technology. The devices according to the present invention generally may be used in various applications, including guidance for ships in harbors or in dangerous areas, and for aircraft at landing or starting. Therein, fixed, known active targets may be used for precise guidance. The same can be used for vehicles driving in dangerous but well defined routes, such as mining vehicles.

Thus, firstly, the devices according to the present invention may be used in mobile phones, tablet computers, wearable computers, laptops, smart panels or other stationary or mobile computer or communication applications. The devices according to the present invention may further be used for surveillance and/or for recording purposes or as input devices to control mobile devices, especially in combination with voice and/or gesture recognition and/or eye tracking. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in mobile audio devices, television devices and gaming devices, as partially explained above. Specifically, the devices according to the present invention may be used as controls or control devices for electronic devices, entertainment devices or the like.

Further, the devices according to the present invention may be used for security or surveillance applications. Thus, as an example, at least one device according to the present invention can be combined with one or more digital and/or analog electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors.

Further, the devices according to the present invention may advantageously be applied in camera applications such as video and camcorder applications. Thus, the devices according to the present invention, specifically the detector device, may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. As a further advantage in potential applications of devices according to the present invention for motion capturing, the simplified combination of several cameras in order to cover a scene may be named, since absolute 3D information may be obtained. This also may simplify merging scenes recorded by two or more 3D-cameras. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible.

Further, the devices according to the present invention may be applied in the field of machine vision. Thus, one or more of the devices according to the present invention, such as the detector device, may be used e.g. as a controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. One particular advantage of the devices according to the present invention is the low likelihood of signal interference. Therefore, multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, devices according to the present invention may be used for monitoring the filling level of tanks, silos etc.

SYNTHESIS EXAMPLES

Syntheses of various compounds which can be used in dye solar cells in the context of the present invention, in particular as p-type semiconductors, are listed by way of example in WO 2012/110924 A1, the content of which is herewith included by reference.

Overall, in the context of the present invention, the following embodiments are regarded as preferred:

Embodiment 1

A detector device for determining an orientation of at least one object, the detector device comprising
- at least two beacon devices, the beacon devices being adapted to be at least one of attached to the object, held by the object and integrated into the object, the beacon devices each being adapted to direct light beams towards a detector, the beacon devices having predetermined coordinates in a coordinate system of the object;
- at least one detector adapted to detect the light beams traveling from the beacon devices towards the detector;
- at least one evaluation device, the evaluation device being adapted to determine longitudinal coordinates of each of the beacon devices in a coordinate system of the detector, the evaluation device being further adapted to determine an orientation of the object in the coordinate system of the detector by using the longitudinal coordinates of the beacon devices.

Embodiment 2

The detector device according to the preceding embodiment, wherein the evaluation device is further adapted to determine an absolute position of at least one point of the object in the coordinate system of the detector.

Embodiment 3

The detector device according to one of the preceding embodiments, wherein the detector device comprises at feast three beacon devices.

Embodiment 4

The detector device according to one of the preceding embodiments, wherein the detector is further adapted to determine at least one transversal coordinate for at least one of the beacon devices, wherein the evaluation device is further adapted to determine the orientation of the object in the coordinate system by further using the at least one transversal coordinate.

Embodiment 5

The detector device according to one of the preceding embodiments, wherein each of the beacon devices is independently selected from the group consisting of: a self-emissive beacon device having at least one illumination source adapted to emit light; a passive beacon device having at least one reflector adapted to reflect light.

Embodiment 6

The detector device according to one of the preceding embodiments, wherein the beacon devices are adapted such that the light beams traveling from the beacon devices towards the detector are mutually distinguishable.

Embodiment 7

The detector device according to the preceding embodiment, wherein the light beams are mutually distinguishable with regard to at least one property selected from the group consisting of a spectral property, a color, a modulation frequency, a modulation amplitude, a pulse width, a duty cycle, a phase.

Embodiment 8

The detector device according to one of the two preceding embodiments, wherein the detector device is adapted to distinguish the light beams originating from the beacon devices and to assign each light beam to its respective beacon device.

Embodiment 9

The detector device according to one of the preceding embodiments, wherein the evaluation device is adapted to determine the orientation of the object by providing at least two orientation angles.

Embodiment 10

The detector device according to the preceding embodiment, wherein the evaluation device is adapted to determine the orientation of the object by providing at least three orientation angles.

Embodiment 11

The detector device according to one of the two preceding embodiments, wherein the evaluation device is adapted to determine the orientation of the object by providing at least one angle combination selected from the group consisting of: a yaw angle ($\psi$) and a pitch angle ($\Theta$); a yaw angle ($\psi$), a pitch angle ($\Theta$) and a roll angle ($\phi$); Euler angles.

Embodiment 12

The detector device according to one of the preceding embodiments, wherein the detector comprises:
- at least one longitudinal optical sensor, wherein the longitudinal optical sensor has at least one sensor region, wherein the longitudinal optical sensor is designed to generate longitudinal sensor signals in a manner dependent on an illumination of the sensor region by the light beams, wherein the longitudinal sensor signals, given the same total power of the illumination, are dependent on a beam cross-section of the light beams in the sensor region;

wherein the evaluation device is designed to determine the longitudinal coordinates of the beacon devices by evaluating the longitudinal sensor signals.

Embodiment 13

The detector device according to the preceding embodiment, wherein the longitudinal optical sensor is a transparent optical sensor.

Embodiment 14

The detector device according to any of the two preceding embodiments, wherein the longitudinal optical sensor comprises at least one dye-sensitized solar cell.

Embodiment 15

The detector device according to any of the three preceding embodiments, wherein the longitudinal optical sensor comprises at least one first electrode, at least one n-semiconducting metal oxide, at least one dye, at least one p-semiconducting organic material, preferably a solid p-semiconducting organic material, and at least one second electrode.

Embodiment 16

The detector device according to the preceding embodiment, wherein both the first electrode and the second electrode are transparent.

Embodiment 17

The detector device according to any of the five preceding embodiments, wherein the evaluation device is designed to determine the longitudinal coordinates of the beacon devices from at least one predefined relationship between the geometry of the illumination and a relative positioning of the respective beacon device with respect to the detector.

Embodiment 18

The detector device according to any of the six preceding embodiments, wherein the detector has a plurality of the longitudinal optical sensors, wherein the longitudinal optical sensors are stacked.

Embodiment 19

The detector device according to the preceding embodiment, wherein the longitudinal optical sensors are arranged such that a light beam traveling from at least one of the beacon devices to the detector illuminates all longitudinal optical sensors, wherein at least one longitudinal sensor signal is generated by each longitudinal optical sensor, wherein the evaluation device is adapted to normalize the longitudinal sensor signals and to generate the longitudinal coordinate of the respective beacon device independent from an intensity of the light beam.

Embodiment 20

The detector device according to any of the eight preceding embodiments, wherein the evaluation device is adapted to determine the longitudinal coordinate of each beacon device by determining a diameter of the respective light beam from the at least one longitudinal sensor signal.

Embodiment 21

The detector device according to the preceding embodiment, wherein the evaluation device is adapted to compare the diameter of the light beam with known beam properties of the light beam in order to determine the longitudinal coordinate.

Embodiment 22

The detector device according to any of the ten preceding embodiments, wherein the longitudinal optical sensor is furthermore designed in such a way that the longitudinal sensor signal, given the same total power of the illumination, is dependent on a modulation frequency of a modulation of the illumination.

Embodiment 23

The detector device according to any of the eleven preceding embodiments, wherein the detector further comprises:
  at least one transversal optical sensor, the transversal optical sensor being adapted to determine a transversal position of the light beams, the transversal position being a position in at least one dimension perpendicular an optical axis of the detector, the transversal optical sensor being adapted to generate transversal sensor signals;
wherein the evaluation device is designed to determine at least one transversal coordinate for at least one of the beacon devices by evaluating the transversal sensor signals.

Embodiment 24

The detector device according to the preceding embodiment, wherein the transversal optical sensor is a photo detector having at least one first electrode, at least one second electrode and at least one photovoltaic material, wherein the photovoltaic material is embedded in between the first electrode and the second electrode, wherein the photovoltaic material is adapted to generate electric charges in response to an illumination of the photovoltaic material with light, wherein the second electrode is a split electrode having at least two partial electrodes, wherein the transversal optical sensor has a sensor region, wherein the at least one transversal sensor signal indicates a position of the light beam in the sensor region.

Embodiment 25

The detector device according to the preceding embodiment, wherein electrical currents through the partial electrodes are dependent on a position of the light beam in the sensor region, wherein the transversal optical sensor is adapted to generate the transversal sensor signal in accordance with the electrical currents through the partial electrodes.

Embodiment 26

The detector device according to the preceding embodiment, wherein the detector device is adapted to derive the transversal coordinate from at least one ratio of the currents through the partial electrodes.

Embodiment 21

The detector device according to any of the three preceding embodiments, wherein the photo detector is a dye-sensitized solar cell.

Embodiment 28

The detector device according to any of the four preceding embodiments, wherein the first electrode at least partially is made of at least one transparent conductive oxide, wherein the second electrode at least partially is made of an electrically conductive polymer, preferably a transparent electrically conductive polymer.

Embodiment 29

The detector device according to any of the five preceding embodiments, wherein the transversal optical sensor is a transparent optical sensor.

Embodiment 30

The detector device according to any of the six preceding embodiments, wherein the transversal optical sensor and the longitudinal optical sensor are stacked along the optical axis such that a light beam travelling along the optical axis both impinges on the transversal optical sensor and on the longitudinal optical sensor.

Embodiment 31

The detector device according to any of the preceding embodiments, furthermore comprising at least one illumination source.

Embodiment 32

The detector device according to any one of the preceding embodiments, wherein the evaluation device is adapted to monitor at least one of the longitudinal coordinates as a function of time and to determine at least one regression function for the at least one longitudinal coordinate.

Embodiment 33

The detector device according to the preceding embodiments, wherein the detector is further adapted to determine at least one transversal coordinate for at least one of the beacon devices, wherein the evaluation device is further adapted to monitor the transversal coordinate as a function of time and to determine at least one regression function for the at least one transversal coordinate.

Embodiment 34

The detector device according to any one of the two preceding embodiments, wherein the at least one regression function for the at least one longitudinal coordinate is based on taking into account a known or determinable distance between at least two of the beacon devices.

Embodiment 35

The detector device according to any one of the two preceding embodiments, wherein the at least one regression function for the at least one transversal coordinate is based on taking into account a known or determinable distance between at least two of the beacon devices.

Embodiment 36

The detector device according to any one of the preceding embodiments, wherein the detector device further comprises at least one motion sensor which may be one or both of attached to the object or integrated into the object.

Embodiment 37

The detector device according to the preceding embodiment, wherein the motion sensor is adapted to transmit at least one signal to one or both of the detector or evaluation device.

Embodiment 38

The detector device according to the preceding embodiment, wherein the motion sensor is coupled to at least one of the beacon devices, such as connected to and/or integrated into at least one of the beacon devices.

Embodiment 39

The detector device according to the preceding embodiment, wherein the beacon device to which the motion sensor is coupled is adapted to modulate the light beam in order to encode the signal of the motion sensor into the light beam.

Embodiment 40

The detector device according to any one of the four preceding embodiments, wherein the evaluation device is adapted to determine the orientation of the object by taking into account the at least one signal of the motion sensor.

Embodiment 32

A detector system, comprising at least one detector device according to one of the preceding embodiments, further comprising at least one object, wherein the beacon devices are one of attached to the object, held by the object and integrated into the object.

Embodiment 33

The detector system according to the preceding embodiment, wherein the object is a rigid object.

Embodiment 34

The detector system according to one of the two preceding embodiments, wherein the object is selected from the group consisting of: an article of sports equipment, preferably an article selected from the group consisting of a racket, a club, a bat; an article of clothing; a hat; a shoe; a pointer, specifically a laser pointer or television control.

Embodiment 35

The detector system according to any one of the three preceding embodiments, wherein the at least one detector is attached to an article.

Embodiment 36

A human-machine interface for exchanging at least one item of information between a user and a machine, wherein the human-machine interface comprises at least one detector device according to any of the preceding embodiments referring to a detector device, wherein the beacon devices are adapted to be at least one of directly or indirectly attached to the user and held by the user, wherein the human-machine interface is designed to determine an orientation of the user by means of the detector device, wherein the human-machine interface is designed to assign to the orientation at least one item of information.

Embodiment 37

An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 38

A tracking system for tracking an orientation of at least one movable object, the tracking system comprising at least one detector device according to any of the preceding embodiments referring to a detector device, the tracking system further comprising at least one track controller, wherein the track controller is adapted to track a series of orientations of the object at specific points in time.

Embodiment 39

A method for determining an orientation of at least one object, the method comprising the following steps:
 at least one emission step, wherein at least two beacon devices are used, the beacon devices being at least one of attached to the object, held by the object and integrated into the object, wherein the beacon devices each direct light beams towards a detector, the beacon devices having predetermined coordinates in a coordinate system of the object;
 at least one detection step, wherein the light beams traveling from the beacon devices towards the detector are detected by the detector;
 at least one evaluation step, wherein longitudinal coordinates of each of the beacon devices are determined in a coordinate system of the detector, wherein an orientation of the object is determined in the coordinate system of the detector by using the longitudinal coordinates of the beacon devices.

Embodiment 40

A use of the detector device according to any of the preceding embodiments relating to a detector device, for a purpose of use, selected from the group consisting of: an orientation measurement in traffic technology; an entertainment application; a security application; a human-machine interface application; a tracking application; a positioning system.

BRIEF DESCRIPTION OF THE FIGURES

Further optional details and features of the invention are evident from the description of preferred exemplary embodiments which follows in conjunction with the dependent claims. In this context, the particular features may be implemented alone or with several in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1:
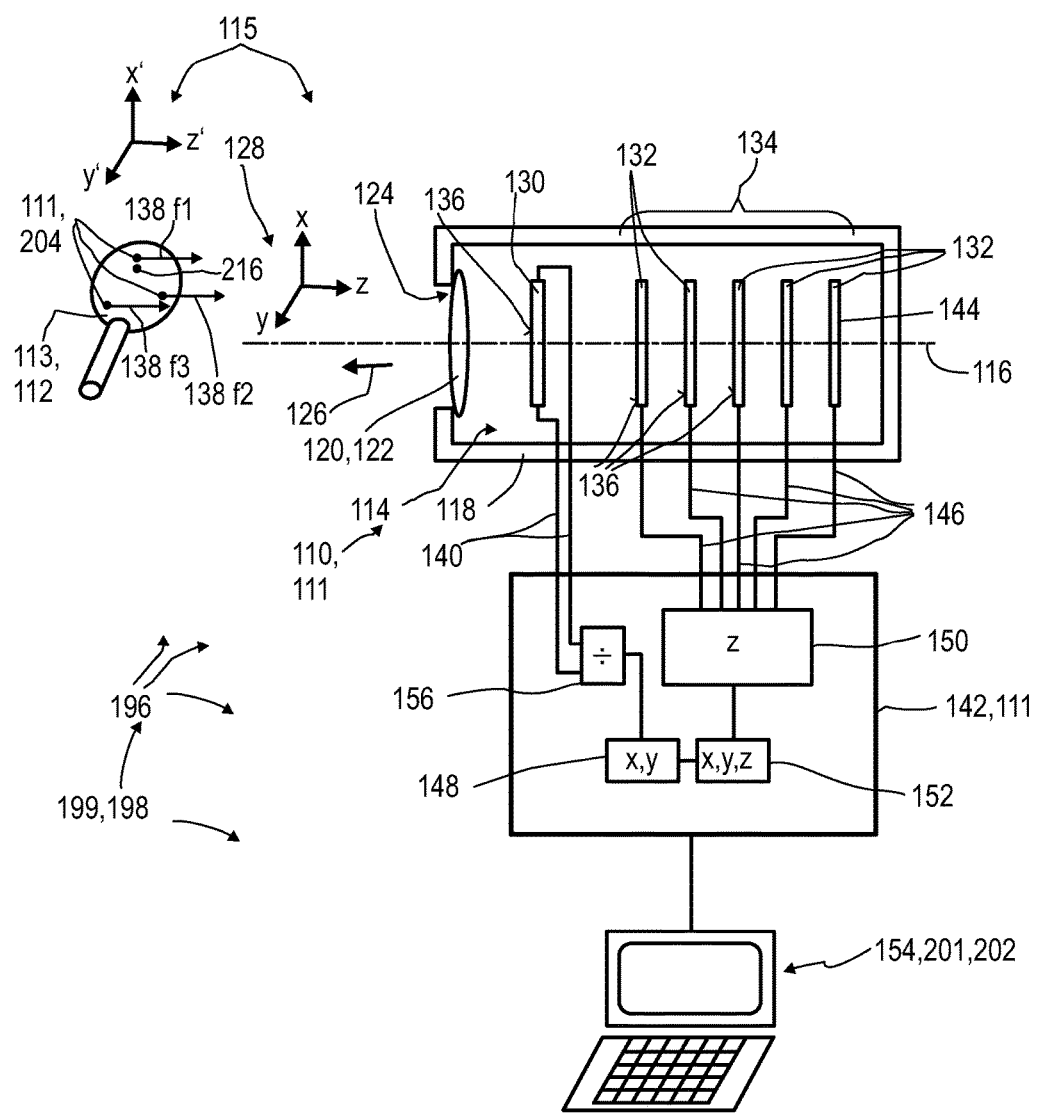
FIG. 1 shows an exemplary embodiment of a detector device, a detector system, a tracking device and a human-machine interface according to the present invention.

FIG. 1 illustrates, in a highly schematic illustration, an exemplary embodiment of a detector 110, which forms a component of a detector device 111 according to the present invention, for determining an orientation of at least one object 112. The detector device 111, in addition to determining the orientation of the at least one object 112, may further be adapted to determine a position of the object 112.

The detector device 111, besides the detector 110, comprises an evaluation device 142 and a plurality of beacon devices 204 which are attached to and/or integrated into the object 112. The evaluation device 142 may fully or partially be integrated into the detector 110 and/or may fully or partially be designed as a separate device. In this exemplary embodiment, the object 112 may be designed as a sports equipment device and may form a control element 113 which may be held and/or handled by a user (not shown).

FIG. 1, thus, further illustrates an embodiment of a detector system 115, which, besides the detector device 111, further comprises the at least one object 112, with the beacon devices 204 attached thereto and/or integrated therein. Further, since the object 112, specifically the control element 113, may be handled by a user in order to transmit at least one item of information to a machine 202, specifically a data processing device 154, as will be explained in further detail below, FIG. 1 also illustrates a schematic embodiment of a human-machine interface 196 according to the present invention. Since, for example, the human-machine interface 196 may be used for computer games and transmitting control commands to a data processing device 154 adapted for gaming, the data processing device 154 in conjunction with the human-machine interface 196 may also form an illustrative example of an entertainment device 198.

Further, data processing device 154, in conjunction with the detector device 111, may be adapted to track an orientation of the object 112. Thus, the data processing device may act as a track controller 201 and, thus, the data processing device 154, the detector device 111 and the track controller 201 may form an exemplary embodiment of a tracking system 199 according to the present invention.

The detector 110 comprises a plurality of optical sensors 114, which, in the specific embodiment, are all stacked along an optical axis 116 of the detector. Specifically, the optical axis 116 may be an axis of symmetry and/or rotation of the setup of the optical sensors 114. The optical sensors 114 may be located inside a housing 118 of the detector 110. Further, at least one transfer device 120 may be comprised, such as one or more optical systems, preferably comprising one or more lenses 122. An opening 124 in the housing 118, which, preferably, is located concentrically with regard to the optical axis 116, preferably defines a direction of view 126 of the detector 110. A coordinate system 128 may be defined, in which a direction parallel or antiparallel to the optical axis 116 is defined as a longitudinal direction, whereas directions perpendicular to the optical axis 116 may be defined as transversal directions. In the coordinate system 128, symbolically depicted in FIG. 1, a longitudinal direction is denoted by z and transversal directions are denoted by x and y, respectively. Other types of coordinate systems 128 are feasible.

The optical sensors 114 may optionally comprise at least one transversal optical sensor 130 and, in this embodiment, a plurality of longitudinal optical sensors 132. The longitudinal optical sensors 132 form a longitudinal optical sensor stack 134. In the embodiment shown in FIG. 1, five longitudinal sensors 132 are depicted. It shall be noted, however, that embodiments having a different number of longitudinal optical sensors 132 are feasible.

The transversal optical sensor 132 comprises a sensor region 136, which, preferably, is transparent to light beams 138 travelling from the beacon devices 204 to the detector 110. The transversal optical sensor 130 may optionally be adapted to determine a transversal position of the light beams 138 in one or more transversal directions, such as in direction x and/or in direction y. Therein, embodiments are feasible in which a transversal position in only one transversal direction is determined, embodiments in which transversal positions in more than one transversal direction are determined by one and the same transversal optical sensor 130, and embodiments in which a transversal position in a first transversal direction is determined by a first transversal optical sensor and wherein at least one further transversal position in at least one further transversal direction is determined by at least one further transversal optical sensor.

The at least one optional transversal optical sensor 130 may be adapted to generate at least one transversal sensor signal. This transversal sensor signal may be transmitted by one or more transversal signal leads 140 to at feast one evaluation device 142 of the detector device 111, which will be explained in further detail below.

The longitudinal optical sensors 132 each comprise at least one sensor region 136. Preferably, one, more or all of the longitudinal optical sensors 132 are transparent, but the last longitudinal optical sensor 144 of the longitudinal optical sensor stack 134, i.e. the longitudinal optical sensor 132 on the side of the stack 134 furthest away from the object 112. This last longitudinal sensor 144 may fully or partially be intransparent.

Each of the longitudinal optical sensors 132 may be designed to generate at least one longitudinal sensor signal in a manner dependent on an illumination of the respective sensor region 136 by the light beam 138. The longitudinal sensor signals, given the same total power of the illumination, may be dependent on a beam cross-section of the light beam 138 in the respective sensor region 136, as will be outlined in further detail below. Via one or more longitudinal signal leads 146, the longitudinal sensor signals may be transmitted to the evaluation device 142.

The detector device 111 and the detector system 115 comprise two, three or more beacon devices 204, which, in this embodiment, are attached to and/or integrated into the object 112. Preferably, in this embodiment and in other embodiments, the beacon devices are located at representative positions at the object 112, such that a position of the beacon devices 204 is a representative measure for determining at least one orientation of the object 112. Thus, generally, in case three or more beacon devices are present, the beacon devices 204 preferably are positioned such that they may not be interconnected by one straight line. Thus, the beacon devices 204 may span a plane. Preferably, at least two or at least three of the beacon devices 204 are located on a surface of the object facing towards the detector 110. In case more than three beacon devices 204 are provided, it is further preferred that beacon devices 204 are positioned on both sides of the object 112, such as by positioning at least two or at least three beacon devices 204 on each major surface of the object 204. As an example, the object 112, which may act as a control element 113, may be shaped as a racket, and at least two or at least three beacon devices 204 may be located on each surface of the racket, such that the orientation of the object 112 may be determined with either of the surfaces facing the detector 110.

As will be outlined in further detail below, the evaluation device 142 may be designed to generate at least one item of information on at least one transversal position of one or more of the beacon devices 204, by evaluating the at least one transversal sensor signal.

The evaluation device 142 is further designed to generate at least one item of information on the longitudinal positions of the beacon devices 204, such as by evaluating the longitudinal sensor signals. For this purpose, the evaluation device 142 may comprise one or more electronic devices and/or one or more software components, in order to evaluate the longitudinal sensor signals, which is symbolically denoted by transversal evaluation unit 148 (denoted by "xy") and longitudinal evaluation unit 150 (denoted by "z"). By combining results derived by these evolution units 148, 150, a position information 152, preferably a three-dimensional position information, may be generated (denoted by "x, y, z"), such as for each of the beacon devices 204. By using these coordinates, a rotation of the object 112 may be determined, as will be outlined in further detail below.

Alternatively, as outlined above or as outlined in further detail below, only the longitudinal evaluation unit 150 may be present, and the detector 110 may comprise the at least one longitudinal optical sensor 132, only. By determining the z-coordinates of the beacon devices 204 and/or differences Δz between these longitudinal coordinates, a rotation of the object 112 may be determined.

The evaluation device 142 may fully or partially be integrated into the detector 110 and/or may fully or partially be part of a data processing device 154 and/or may comprise one or more data processing devices 154. The evaluation device 142 may be fully or partially integrated into the housing 118 and/or may fully or partially be embodied as a separate device which is electrically connected in a wireless or wire-bound fashion to the optical sensors 114. The evaluation device 142 may further comprise one or more additional components, such as one or more electronic hardware components and/or one or more software components, such as one or more measurement units (not depicted in FIG. 1) and/or one or more transformation units 156. Symbolically, in FIG. 1, one optional transformation unit 156 is depicted which may be adapted to transform at least two transversal sensor signals into a common signal or common information.

In the following, embodiments of the transversal optical sensor 130 and the at least one longitudinal optical sensor 132 are disclosed. It shall be noted, however, that other embodiments are feasible. Thus, in the embodiments disclosed hereinafter, the optical sensors 114 are all designed as solid dye-sensitized solar cells (sDSCs). It shall be noted, however, that other embodiments are feasible.

Further, as outlined above, in this embodiment or in any other embodiment of the present invention, the detector device 111 may be adapted such that the detector 110 is capable of determining the origin of the light beam 138 generating a sensor signal, even if several light beams 138 are detected simultaneously. For this purpose, the light beams 138 may differ with regard to at least one property distinguishable by the detector 110 and/or the evaluation device 142. Firstly, the light beams 138 may be transmitted to the detector 110 intermittently, such as by using a pulsed scheme, wherein the beacon devices 204 may have different pulse schemes, such as with regard to one or more of pulse frequency, pulse width or duty cycle. Additionally or alternatively, the beacon devices 204 each may be modulated with a characteristic and unique modulation frequency f, which may be chosen such that the respective detector signals of the longitudinal optical sensors 132 and, optionally, the transversal optical sensor 130 exhibit these characteristic modulation frequencies, too. Thus, by using one or more appropriate electronic filters or any other filtering means, the sensor signals may be separated and may be assigned to the respective light beams 138 and to the respective beacon devices 204 from which these light beams 138 are transmitted to the detector 110. This at least one optional electronic filter may fully or partially be part of the detector 110 and/or part of the evaluation device 142. In FIG. 1, the modulation of the beacon devices 204 with characteristic modulation frequencies is symbolically depicted by f1, f2 and f3. In addition or as an alternative to a separation of the origin of the light beams 138 by modulation and appropriate filtering, a spectral separation may be feasible, such as by the beacon devices 204 emitting light beams 138 having differing spectral properties. The detector 110 may have one or more optical filtering elements and/or one or more wavelength sensitive elements adapted for separating light beams 138 by their spectral properties, in order to separate their origin and in order to identify the respective beacon device 204 from which the respective light beam 138 is transmitted.

For further improvement of the accuracy of determining the orientation of the object 112 by the detector device 111, such as the detector device 111 depicted in FIG. 1 or by any other detector device 111 according to the present invention, as outlined above, statistical means may be applied, specifically by the evaluation device 142. Thus, as an example, one or more regression functions of the at least one longitudinal coordinate and/or of the at least one transversal coordinate for one or more of the beacon devices 204 may be generated, in order to suppress noise by statistical means.

Further, one or more boundary conditions may be used, such as a known distance between two or more of the Beacon devices 204. Thus, specifically for rigid objects 112, even though the orientation of the object 112 may change, a distance d between two or more of the beacon devices may remain constant. This property of the beacon devices 204 may be used when calculating the regression functions. Thus, for a first one of the beacon devices 204 and for a second one of the beacon devices 204, regression functions R1 and R2 may be calculated, such as by monitoring one or more coordinates of the respective beacon devices 204 as a function of time (i.e. by recording a sequence of the one or more coordinates as a function of the measurement times for each measurement value of the sequence) and by calculating the regression function thereof, e.g. by using one or more of: linear regression; nonlinear regression; least squares regression, specifically least squares regression in which least squares are used as maximum likelihood estimator, methods using local estimates such as M-estimates, L-estimates, or R-estimates; cubic splines; interpolation or extrapolation techniques, specifically polynomial or rational function interpolation or extrapolation techniques such as cubic splines, bicubic splines or bicubic interpolation; linear or nonlinear estimation techniques such as Kalman filters. The calculation of the regression functions may take place by using the boundary condition that the distance Abs (R1−R2) between the regression functions is constant at all times, i.e. Abs (R1−R2)=D.

Further, as discussed above, the accuracy of the measurements of the detector device 111 may further be improved by using one or more additional sensors. Thus, as indicated in FIG. 1 and as may generally be applied to other embodiments of the present invention, the detector device 111 may further comprise one or more motion sensors 216. The at least one optional motion sensor 216, as an example, may be attached and/or integrated into the object 112. In the exemplary embodiment of FIG. 1, only one motion sensor 216 is shown. It shall be noted, however, that more than one motion sensor 216 may be provided. Thus, as an example, each of the beacon devices 204 may comprise and/or may be connected to one or more motion sensors 216.

The at least one optional motion sensor 216 may be adapted to transmit one or more signals to the detector 110 and/or to the evaluation device 142. Thereby, one or more items of information regarding a motion of the at least one object 112 may be transmitted, such as one or more items of information regarding one or more of a position, and inclination, a vibration, an acceleration or other parameters of motion. For the purpose of transmission, at least one motion sensor 216 may comprise one or more data transmission devices.

Additionally or alternatively, the at least one motion sensor 216 may fully or partially be integrated into one or more of the beacon devices 204 and/or may be connected to one or more of the beacon devices 204. Thus, the respective beacon device 204 may fully or partially take over the task of data transmission. As an example, the light beam 138 emitted or reflected by the respective beacon device 204 may be modulated, in order to encode information to be transmitted to the detector 110 and/or to the evaluation device 142. The detector 110 and/or the evaluation device 142 may comprise one or more devices for demodulation and/or for decoding the information encoded in the modulation of the light beam 138.

Thus, the at least one additional sensor, such as the at least one motion sensor 216, may provide additional information to the at least one evaluation device 142 which may be taken into account during data processing, specifically when determining the orientation of the at least one object 112. Thus, by providing additional information, a redundancy of measurements may be used, such as by comparing an orientation of the object 112 determined by using the detector 110 and an orientation of the object 112 determined by using the motion sensor 216. Additionally or alternatively, the additional information may be integrated into a calculation performed by the evaluation device 142. Generally, by using at least one additional sensor, the accuracy of the detector device 111 may be increased. Further, the detector device 111 may be rendered more reliable, specifically in situations in which the detection of the two or more beacon devices 204 by the detector 110 fails. Thus, in case the beacon device 204 cannot be detected by the detector 110, such as in case an intransparent object is located between the detector 110 and the beacon device 204, the additional sensor may be used to detect or extrapolate the position of the beacon device 204.

Figure 2A:
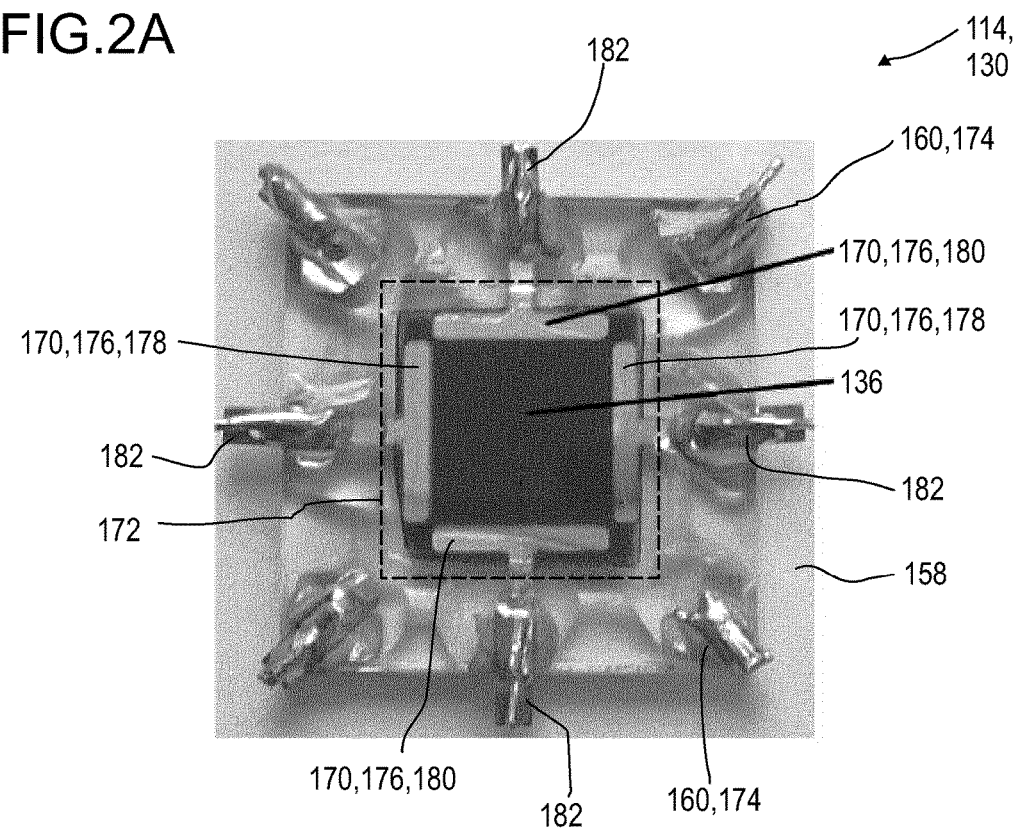
FIGS. 2A and 2B show different views of an embodiment of a transversal detector which may be used in the detector device of the present invention.
Figure 2B:
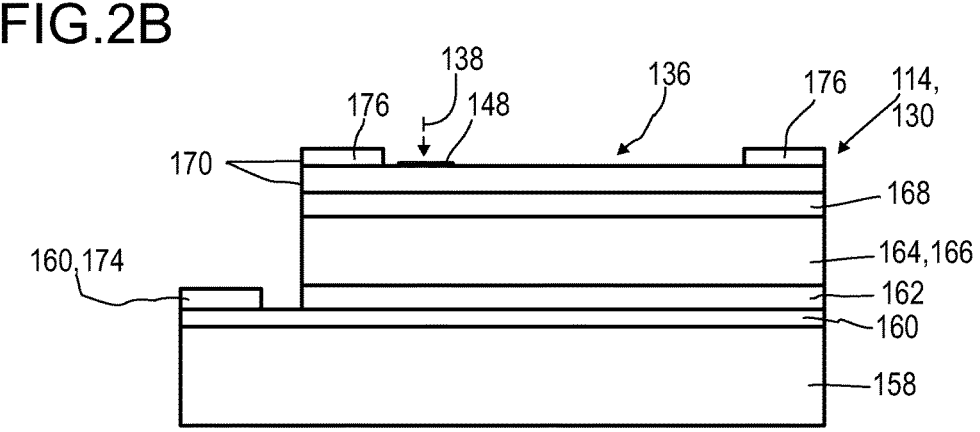

In FIGS. 2A and 2B, different views of a potential embodiment of the optional transversal optical sensor 130 are depicted. Therein, FIG. 2A shows a top-view on a layer setup of the transversal optical sensor 130, whereas FIG. 2B shows a partial cross-sectional view of the layer setup in a schematic setup. For alternative embodiments of the layer setup, reference may be made to the disclosure above.

The transversal optical sensor 130 comprises a transparent substrate 158, such as a substrate made of glass and/or a transparent plastic material. The setup further comprises a first electrode 160, an optical blocking layer 162, at least one n-semiconducting metal oxide 164, sensitized with at least one dye 166, at least one p-semiconducting organic material 168 and at least one second electrode 170. These elements are depicted in FIG. 2B. The setup may further comprise at least one encapsulation 172 which is not depicted in FIG. 2B and which is symbolically depicted in the top-view of FIG. 2A, which may cover a sensor region 136 of the transversal optical sensor 130.

As an exemplary embodiment, the substrate 158 may be made of glass, the first electrode 160 may fully or partially be made of fluorine-doped tin oxide (FTO), the blocking layer 162 may be made of dense titanium dioxide (TiO$_2$), the n-semiconducting metal oxide 164 may be made of nonporous titanium dioxide, the p-semiconducting organic material 168 may be made of spiro-MeOTAD, and the second electrode 170 may comprise PEDOT:PSS. Further, dye ID504, as e.g. disclosed in WO 2012/110924 A1, may be used. Other embodiments are feasible.

As depicted in FIGS. 2A and 2B, the first electrode 160 may be a large-area electrode, which may be contacted by a single electrode contact 174. As depicted in the top-view in FIG. 2A, the electrode contacts 174 of the first electrode 160 may be located in corners of the transversal optical sensor 130. By providing more than one electrode contact 174, a redundancy may be generated, and resistive losses over the first electrode 160 might be eliminated, thereby generating a common signal for the first electrode 160.

Contrarily, the second electrode 170 comprises at least two partial electrodes 176. As can be seen in the top-view in FIG. 2A, the second electrode 170 may comprise at least two partial electrodes 178 for an x-direction, and at least two partial electrodes 180 for a y-direction via contact leads 182, these partial electrodes 176 may be contacted electrically through the encapsulation 172.

The partial electrodes 176, in this specific embodiment, form a frame which surrounds the sensor region 136. As an example, a rectangular or, more preferably, a square frame may be formed. By using appropriate current measurement devices, electrode currents through the partial electrodes 176 may be determined individually, such as by current measurement devices implemented into the evaluation device 142. By comparing e.g. electrode currents through the two single x-partial electrodes 178, and by comparing the electrode currents through the individual y-partial electrodes 180, x- and y-coordinates of a light spot 184 generated by the light beam 138 in the sensor region 136 may be determined, as for the outlined with respect to FIGS. 3A to 3D below.

Figure 3A:
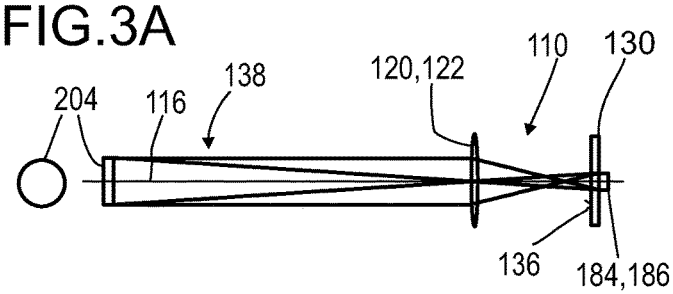
FIGS. 3A to 3D show principles of generating transversal sensor signals and deriving information on a transversal position of an object.
Figure 3B:
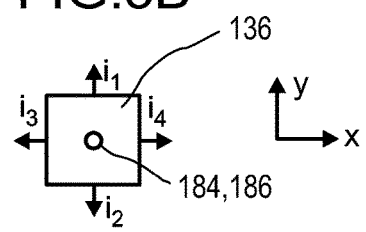

In FIGS. 3A to 3D, two different situations of a positioning of the object 112 and, thus, of the respective beacon device 204 emitting the respective light beam 138, are depicted. Thus, FIG. 3A and FIG. 3B show a situation in which the beacon device 204 and/or the object 112 is located on the optical axis 116 of the detector 110 and, thus, the light beam 138 is parallel to the optical axis 116. Therein, FIG. 3A shows a side-view and FIG. 3B shows a top-view onto the sensor region 136 of the transversal optical sensor 130. The longitudinal optical sensors 132 are not depicted in this setup.

Figure 3C:
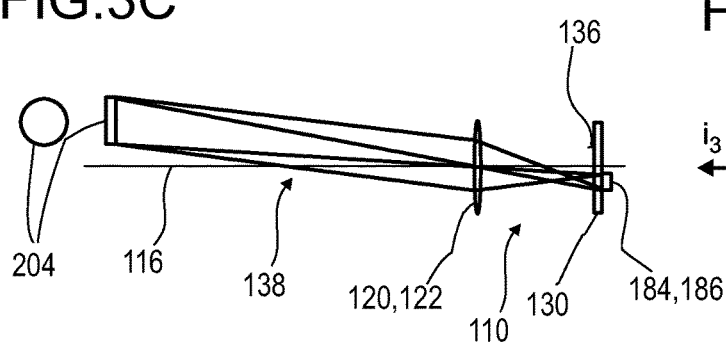
Figure 3D:
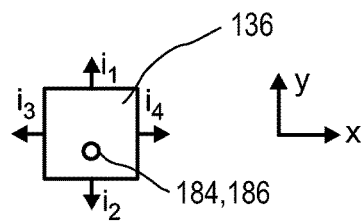

In FIGS. 3C and 3D, the setup of FIGS. 3A and 3B is depicted in analogous views with the beacon device 204 and/or the object 112 shifted in a transversal direction, to an off-axis position.

It shall be noted that, in FIGS. 3A and 3C, the beacon device 204 is depicted as the source of one or more light beams 138. As will be outlined in further detail below, specifically with respect the embodiment in FIG. 6, the detector 110 may as well comprise one or more illumination sources which may be connected to the object 112 and/or may be located in any other position and which may emit primary light beams, wherein the beacon devices 204 may be adapted for reflecting the primary light beams, thereby generating the light beams 138, by reflection and/or diffusion.

According to well-known imaging equations, the object 112 is imaged onto the sensor region 136 of the transversal optical sensor 130, thereby generating an image 186 of the object 112 on the sensor region 136, which, in the following, will be considered a light spot 184 and/or a plurality of light spots 184.

As can be seen in the partial images 3B and 3D, the light spot 184 on the sensor region 136 will lead, by generating charges in the layer setup of the sDSC, electrode currents, which, in each case, are denoted by $i_1$ to $i_4$. Therein, electrode currents $i_1$, $i_2$ denote electrode currents through partial electrodes 180 in y-direction and electrode currents $i_3$, $i_4$ denote electrode currents through partial electrodes 178 in x-direction. These electrode currents may be measured by one or more appropriate electrode measurement devices simultaneously or sequentially. By evaluating these electrode currents, x- and y-coordinates may be determined. Thus, the following equations may be used:

$$x_0 = f(i_3 - i_4/i_3 + i_4) \text{ and } y_0 = f(i_1 - i_2/i_1 + i_2)$$

Therein, f might be an arbitrary known function, such as a simple multiplication of the quotient of the currents with a known stretch factor and/or an addition of an offset. Thus, generally, the electrode currents $i_1$ to $i_4$ might form transversal sensor signals generated by the transversal optical sensor 130, whereas the evaluation device 142 might be adapted to generate information on a transversal position, such as at least one x-coordinate and/or at least one y-coordinate, by transforming the transversal sensor signals by using a predetermined or determinable transformation algorithm and/or a known relationship.

Figure 4A:
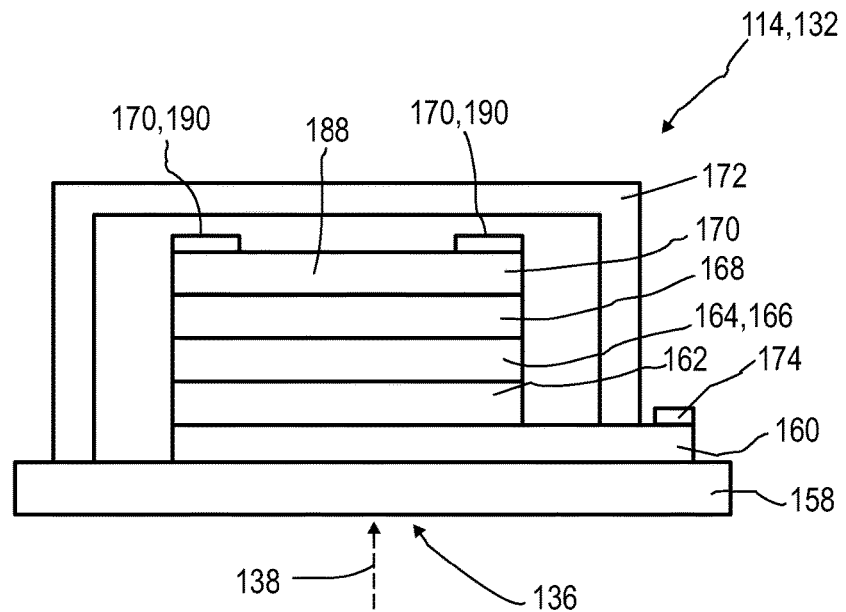
FIGS. 4A to 4C show different views of embodiments of a longitudinal optical sensor which may be used in the detector device according to the present invention.
Figures 4B, 4C:
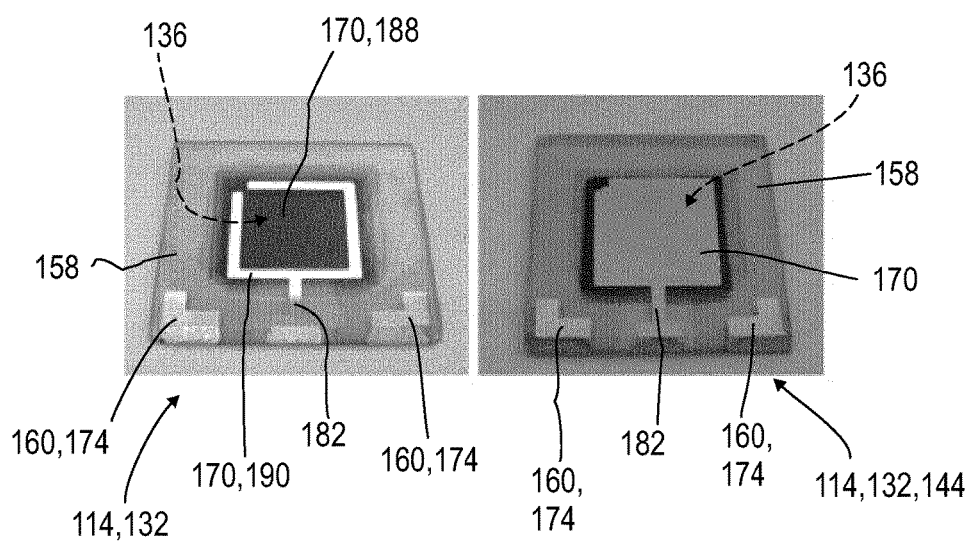

In FIGS. 4A to 4C, various views of longitudinal optical sensors 132 are shown. Therein, FIG. 4A shows a cross-sectional view of a potential layer setup, and FIGS. 4B and 4C show top-views of two embodiments of potential longitudinal optical sensors 132. Therein, FIG. 4C shows a potential embodiment of the last longitudinal optical sensor 144, wherein FIG. 4B shows potential embodiments of the remaining longitudinal optical sensors 132 of the longitudinal optical sensor stack 134. Thus, the embodiment in FIG. 4B may form a transparent longitudinal optical sensor 132, whereas the embodiment in FIG. 4C may be an intransparent longitudinal optical sensor 132. Other embodiments are feasible. Thus, the last longitudinal optical sensor 144, alternatively, might also be embodied as a transparent longitudinal optical sensor 132.

As can be seen in the schematic cross-sectional view in FIG. 4A, the longitudinal optical sensor 132 again, might be embodied as an organic photo-detector, preferably as an sDSC. Thus, similarly to the setup of FIG. 2B, a layer setup using a substrate 158, a first electrode 160, a blocking layer 162, an n-semiconducting metal oxide 164 being sensitized with a dye 166, a p-semiconducting organic material 168 and a second electrode 170 may be used. Additionally, an encapsulation 172 may be provided. For potential materials of the layers, reference may be made to FIG. 2B above. Additionally or alternatively, other types of materials may be used.

It shall be noted that, in FIG. 2B, an illumination from the top is symbolically depicted, i.e. an illumination by the light beam 138 from the side of the second electrode 170. Alternatively, an illumination from the bottom, i.e. from the side of the substrate 158 and through the substrate 158, may be used. The same holds true for the setup of FIG. 4A.

However, as depicted in FIG. 4A, in a preferred orientation of the longitudinal optical sensor 132, an illumination by the light beam 138 preferably takes place from the bottom, i.e. through the transparent substrate 158. This is due to the fact that the first electrode 160 may easily be embodied as a transparent electrode, such as by using a transparent conductive oxide, such as FTO. The second electrode 170, as will be outlined in further detail below, may either be transparent or, specifically, for the last longitudinal optical sensor 144, intransparent.

In FIG. 4B and FIG. 4C, different setups of the second electrode 170 are depicted. Therein, in FIG. 4B, corresponding to the cross-sectional view of FIG. 4A, the first electrode 160 may be contacted by one or more electrode contacts 174, which, as an example, may comprise one or more metal pads, similar to the setup in FIG. 2B. These electrode contacts 174 may be located in the corners of the substrate 158. Other embodiments are feasible.

The second electrode 170, however, in the setup of FIG. 4B may comprise one or more layers of a transparent electrically conductive polymer 188. As an example, similar to the setup of FIGS. 2A and 2B, PEDOT:PSS may be used. Further, one or more top contacts 190 may be provided, which may be made of a metallic material, such as aluminum and/or silver. By using one or more contact leads 182, leading through the encapsulation 172, this top contact 190 may be electrically contacted.

In the exemplary embodiment shown in FIG. 4B, the top contact 190 forms a closed opened frame surrounding the sensor region 136. Thus, as opposed to the partial electrodes 176 in FIGS. 2A and 2B, only one top contact 190 is required. However, the longitudinal optical sensor 132 and the transversal optical sensor 130 may be combined in one single device, such as by providing partial electrodes in the setup of FIGS. 4A to 4C. Thus, in addition to the FiP effect which will be outlined in further detail below, transversal sensor signals may be generated with the at least one longitudinal optical sensor 132. Thereby, a combined transversal and longitudinal optical sensor may be provided.

The use of the transparent electrically conductive polymer 188 allows for an embodiment of the longitudinal optical sensor 132 in which both the first electrode 160 and the second electrode 170 are at least partially transparent. The same, preferably, holds true for the transversal optical sensor 130. In FIG. 4C, however, a setup of the longitudinal optical sensor 132 is disclosed which uses an intransparent second electrode 170. Thus, as an example, the second electrode 170 may be embodied by using one or more metal layers, such as aluminum and/or silver, instead of or in addition to the at least one electrically conductive polymer 188. Thus, as an example, the electrically conductive polymer 188 may be replaced or may be reinforced by one or more metal Layers which, preferably, may cover the full sensor region 136.

Figure 5A:
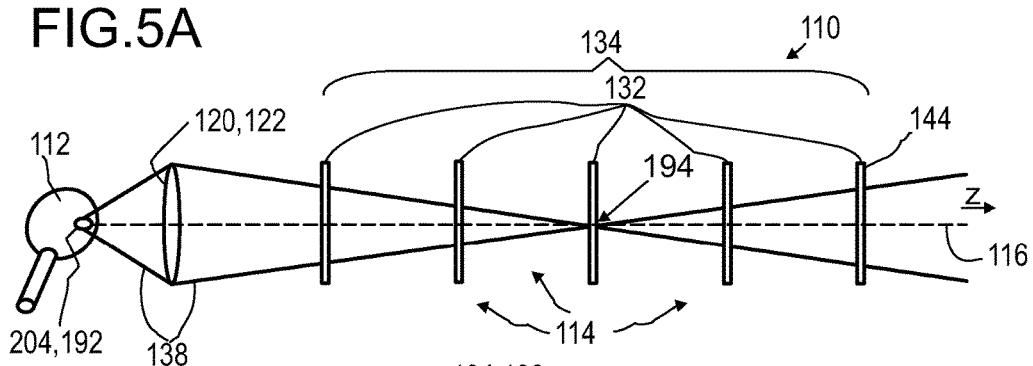
FIGS. 5A to 5E show the principle of generating longitudinal sensor signals and deriving information on a longitudinal position of an object.

In FIGS. 5A to 5E, the above-mentioned HP effect and its use for determining a longitudinal coordinate of a beacon device 204 shall be explained. Therein, FIG. 5A shows a side-view of a part of a detector 110 and the detector device 111, in a plane parallel to the optical axis 116, similar to the setup in FIGS. 1, 3A and 3C. Of the detector 110, only the longitudinal optical sensors 132 and the optional transfer device 120 are depicted. Not shown is the at least one optional transversal optical sensor 130. This transversal optical sensor 130 may be embodied as a separate optical sensor 114 and/or may be combined with one or more of the longitudinal optical sensors 132.

In the setup of FIG. 5A, only one of the beacon devices 204 is depicted for illustrative purposes. Again, the measurement starts with an emission and/or reflection of one or more light beams 138 by at least one beacon device 204. The beacon device 204 may comprise at least one illumination source 192, i.e. the beacon device 204 may fully or partially be embodied as an active beacon device 204. Additionally or alternatively, a separate illumination source 192 may be used, and the beacon device 204 may comprise one or more reflective elements and/or reflective surfaces adapted to reflect primary light beams, thereby generating the light beam 138.

Due to a characteristic of the light beam 138 itself and/or due to beam shaping characteristics of the optional transfer device 120, preferably of the at least one lens 122, the beam properties of the light beam 138 in the region of the longitudinal optical sensors 132 at least partially are known. Thus, as depicted in FIG. 5A, one or more focal points 194 might occur. In the focal point 194, a beam waist or a cross-section of the light beam 138 may assume a minimum value.

Figure 5B:
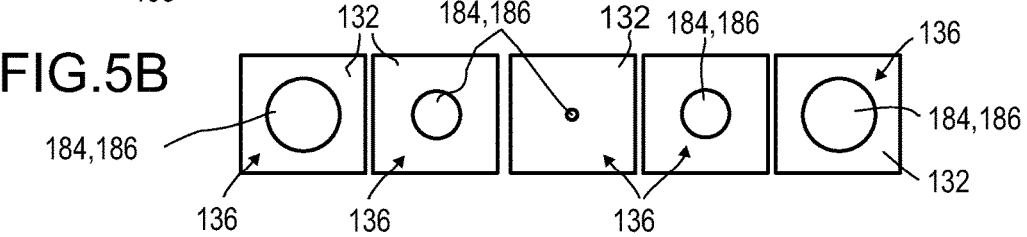

In FIG. 5B, in a top-view onto the sensor regions 136 of the longitudinal optical sensors 132 in FIG. 5A, a development of the light spots 184 generated by the light beam 138 impinging on the sensor regions 136 is depicted. As can be seen, close to the focal point 194, the cross-section of the light spot 184 assumes a minimum value.

Figure 5C:
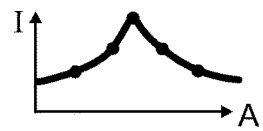
Figure 5D:

In FIG. 5C, a photo current I of the longitudinal optical sensors 132 is given for the five cross-sections of the light spot 184 in FIG. 5B, in case longitudinal optical sensors 132 exhibiting the above-mentioned FiP effect are used. Thus, as an exemplary embodiment, five different photo currents I for the spot cross-sections as shown in FIG. 5B are shown for typical DSC devices preferably sDSC devices. The photo current I is depicted as a function of the area A of the light spot 184, which is a measure of the cross-section of the light spots 184.

As can be seen in FIG. 5C, the photo current I, even if all longitudinal optical sensors 132 are illuminated with the same total power of the illumination, is dependent on the cross-section of the light beam 138, such as by providing a strong dependency on the cross-sectional area A and/or the beam waist of the light spot 184. Thus, the photo current is a function both of the power of the light beam 138 and of the cross-section of the light beam 138:

$$I=f(n,a).$$

Therein, I denotes the photo current provided by each longitudinal optical sensor 132, such as a photo current measured in arbitrary units, as a voltage over at least one measurement resistor and/or in amps. n denotes the overall number of photons impinging on the sensor region 136 and/or the overall power of the light beam in the sensor region 136. a denotes the beam cross-section of the light beam 138, provided in arbitrary units, as a beam waist, as a beam diameter of beam radius or as an area of the light spot 134. As an example, the beam cross-section may be calculated by the $1/e^2$ diameter of the light spot 184, i.e. a cross-sectional distance from a first point on a first side of a maximum intensity having an intensity of $1/e^2$ as compared to the maximum intensity of the light spot 184, to a point on the other side of the maximum having the same intensity. Other options of quantifying the beam cross-section are feasible.

The setup in FIG. 5C shows the photo current of a longitudinal optical sensor 132 according to the present invention which may be used in the detector 110 according to the present invention, showing the above-mentioned FiP effect. Contrarily, in FIG. 5D in a diagram corresponding to the diagram of FIG. 5C, photo currents of traditional optical sensors are shown, for the same setup as depicted in FIG. 5A. As an example, silicon photo detectors may be used for this measurement. As can be seen, in these traditional measurements, the photo current or photo signal of the detectors is independent from the beam cross-section A.

Thus, by evaluating the photo currents and/or other types of longitudinal sensor signals of the longitudinal optical sensors 132 of the detector 110, the light beam 138 may be characterized. Since the optical characteristics of the light beam 138 depend on the distance of the respective beacon device 204 from the detector 110, by evaluating these longitudinal sensor signals, a position of the object 112 along the optical axis 116, i.e. a longitudinal coordinate or z-position, may be determined. For this purpose, the photo currents of the longitudinal optical sensors 132 may be transformed, such as by using one or more known relationships between the photo current I and the position of the respective beacon device 204, into at least one item of information on a longitudinal position of the respective beacon device 204, i.e. a z-position. Thus, as an example, the position of the focal point 194 may be determined by evaluating the sensor signals, and a correlation between the focal point 194 and a position of the respective beacon device 204 in the z-direction may be used for generating the above-mentioned information. Additionally or alternatively, a widening and/or narrowing of the light beam 138 may be evaluated by comparing the sensor signals of the longitudinal sensors 132. As an example, known beam properties may be assumed, such as a beam propagation of the light beam 138 according to Gaussian laws, using one or more Gaussian beam parameters.

Further, the use of a plurality of longitudinal optical sensors 132 provides additional advantages as opposed to the use of a single longitudinal optical sensor 132. Thus, as outlined above, the overall power of the light beam 138 generally might be unknown. By normalizing the longitudinal sensor signals, such as to a maximum value, the longitudinal sensor signals might be rendered independent from the overall power of the light beam 138, and a relationship $$I_n=g(A)$$

may be used by using normalized photo currents and/or normalized longitudinal sensor signals, which is independent from the overall power of the light beam 138.

Additionally, by using the plurality of longitudinal optical sensors 132, an ambiguity of the longitudinal sensor signals may be resolved. Thus, as can be seen by comparing the first and the last image in FIG. 5B and/or by comparing the second and the fourth image in FIG. 5B, and/or by comparing the corresponding photo currents in FIG. 5C, longitudinal optical sensors 132 being positioned at a specific distance before or behind the focal point 194 may lead to the same longitudinal sensor signals. A similar ambiguity might arise in case the light beam 138 weakens during propagations along the optical axis 116, which might generally be corrected empirically and/or by calculation. In order to resolve this ambiguity in the z-position, the plurality of longitudinal sensor signals clearly shows the position of the focal point and of the maximum. Thus, by e.g. comparing with one or more neighboring longitudinal sensor signals, it may be determined whether a specific longitudinal optical sensor 132 is located before or beyond a focal point on the longitudinal axis.

Figure 5E:
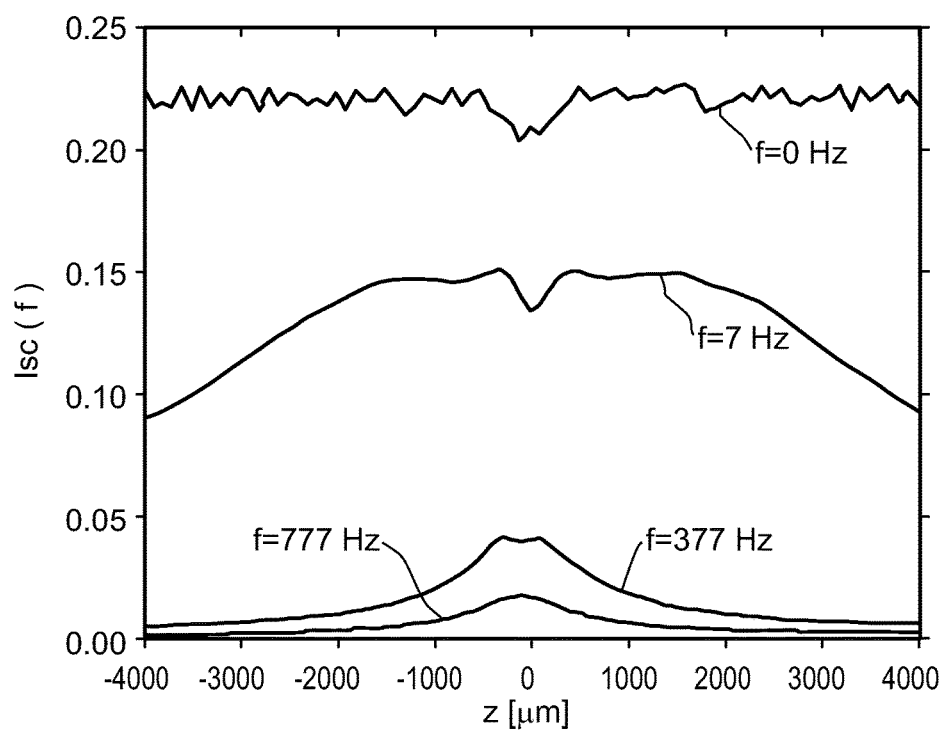

In FIG. 5E, a longitudinal sensor signal for a typical example of an sDSC is depicted, in order to demonstrate the possibility of the longitudinal sensor signal and the above-mentioned FiP effect being dependent on a modulation frequency. In this figure, a short-circuit current Isc is given as the longitudinal sensor signal on the vertical axis, in arbitrary units, for a variety of modulation frequencies f. On the horizontal axis, a longitudinal coordinate z is depicted. The longitudinal coordinate z, given in micrometers, is chosen such that a position of a focus of the light beam on the z-axis is denoted by position 0, such that all longitudinal coordinates z on the horizontal axis are given as a distance to the focal point of the light beam. Consequently, since the beam cross-section of the light beam depends on the distance from the focal point, the longitudinal coordinate in FIG. 5E denotes the beam cross-section in arbitrary units. As an example, a Gaussian light beam may be assumed, with known or determinable beam parameters, in order to transform the longitudinal coordinate into a specific beam waist or beam cross-section.

In this experiment, longitudinal sensor signals are provided for a variety of modulation frequencies of the light beam, for 0 Hz (no modulation), 7 Hz, 377 Hz and 777 Hz. As can be seen in the figure, for modulation frequency 0 Hz, no FiP effect or only a very small FiP effect, which may not easily be distinguished from the noise of the longitudinal sensor signal, may be detected. For higher modulation frequencies, a pronounced dependency of the longitudinal sensor signal on the cross section of the light beam may be observed. Typically, modulation frequencies in the range of 0.1 Hz to 10 kHz may be used for the detector according to the present invention, such as modulation frequencies of 0.3 Hz.

It shall be noted, however, that the modulation frequency shown in FIG. 5E, which is used for emphasizing and/or increasing the above-mentioned FiP effect, may be different from an optional and additional modulation of the light beam 138 for the purpose of identifying the respective beacon device 204 from which the light beam 138 travels towards the detector 110. Thus, as outlined above, an additional modulation may be provided for each of the beacon devices 204, which may be a characteristic modulation for each of the beacon devices 204 and which may be recognized in the sensor signals of the longitudinal optical sensors 132. Thus, by filtering the characteristic modulation frequency from the sensor signals, such as by using one or more bandpass filters and/or other filtering techniques, such as using a lock-in technique, sensor signals of the single beacon devices 204 may be separated by their characteristic modulations. As outlined above, other separation techniques may be used, such as intermittent emissions and/or spectral separations. The characteristic modulation of the beacon devices 204 preferably may be chosen such that the light beams 138 may electronically be assigned to their respective beacon device 204. Thus, in order to separate the frequencies and to allow for a proper assignment, the beacon devices 204 preferably a modulated by different modulation frequencies being spaced apart from each other by at least 1 Hz, preferably by 1 Hz to 100 Hz.

Figure 6:
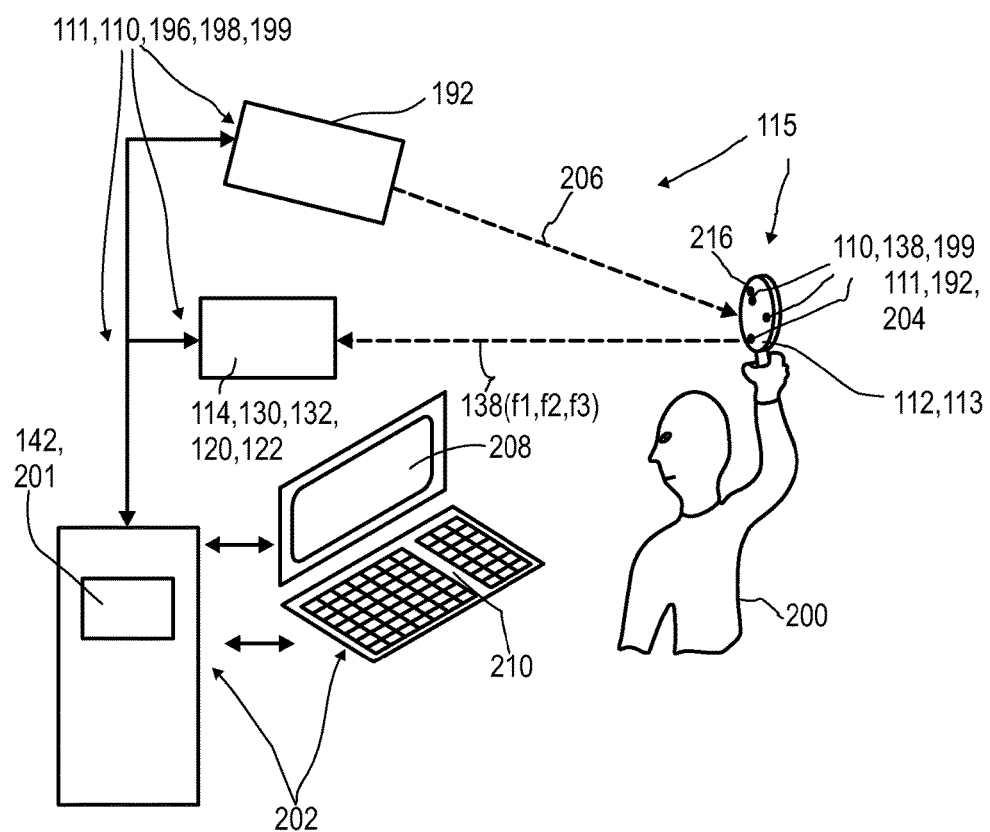
FIG. 6 shows a schematic embodiment of a detector device, a detector system, a tracking device, a human-machine interface and an entertainment device according to the present invention.

In FIG. 6, an exemplary embodiment of a human-machine interface 196 according to the invention, which can simultaneously also be embodied as an exemplary embodiment of an entertainment device 198 according to the invention or which can be a constituent part of such an entertainment device 198, is depicted. Further, the human-machine interface 196 and/or the entertainment device 198 may also form an exemplary embodiment of a tracking system 199 adapted for tracking an orientation of a user 200 and/or of one or more body parts of the user 200, and, optionally, for tracking a position of the user 200 and/or of the one or more body parts of the user 200. Thus, a motion of one or more of the body parts of the user 200 may be tracked. Generally, for the most components of the named systems and devices, reference may be made to the definitions given above with regard to FIG. 1.

By way of example, at least one detector device 111 with at least one detector 110 according to the present invention can once again be provided, for example in accordance with one or more of the embodiments described above, with one or a plurality of optical sensors 114, which may comprise one or more transversal optical sensors 130 and one or more longitudinal optical sensors 132. Further elements of the detector 110 can be provided, which are not illustrated in FIG. 6, such as, for example, elements of an optional transfer device 120. For a potential embodiment, reference may be made to FIG. 1. Furthermore, one or a plurality of illumination sources 192 may be provided. Generally, with regard to these possible embodiments of the detector 110, reference can be made for example to the description above.

The human-machine interface 196 can be designed to enable an exchange of at least one item of information between a user 200 and a machine 202, which is merely indicated in FIG. 6. For example, a unidirectional or bidirectional exchange of control commands, and/or information may be performed by using the human-machine interface 196. The machine 202 can comprise, in principle, any desired device having at least one function which can be controlled and/or influenced in some way. At least one evaluation device 142 of the at least one detector device 111 and/or a part thereof can, as indicated in FIG. 6, be wholly or partially integrated into said machine 201, but can, in principle, also be formed fully or partially separately from the machine 202.

The human-machine interface 196 can be designed for example to generate, by means of the detector device 111, at least one item of geometrical information of the user 200, and can assign the geometrical information at least to one item of information, in particular at least one control command. For this purpose, the human-machine interface 196 is adapted to determine at least one orientation of the user 200, by using the detector device 111. In this exemplary embodiment, as outlined above, a control element 113 is used, having a plurality of at least two, more preferably at least three, beacon devices 204 which are at least one of integrated into or attached to the control element 113, wherein the control element 113 acts as an object 112 which may be handled by the user 200. Thus, by determining the orientation of the control element 113, an orientation of at least one body part of the user 200 may be determined, such as the position of an arm and/or a hand holding the control element 113. Additionally or alternatively, other possibilities are feasible, such as the beacon devices 204 being held by and/or attached to the user 200 in a different way.

By way of example, by means of the detector device 111, a movement and/or a change in orientation of the user 200 and/or a body part of the user 200 can be identified. For example, as indicated in FIG. 6, a hand movement and/or a specific hand posture of the user 200 may be detected. Additionally or alternatively, other types of geometrical information of the user 200 may be detected by the detector device 111 having one or more detectors 110. For this purpose, one or more orientations, and, optionally, one or more positions and/or one or more items of position information regarding the user 200 and/or one or more body parts of the user 200 may be identified by the at least one detector device 111. It is then possible to recognize, for example by comparison with a corresponding command list, that the user 200 would like to effect a specific input, for example would like to give the machine 202 a control command and/or would like to input a specific information. The control element 113 having the beacon devices 204 attached thereto and/or integrated therein and which may be handled and/or worn by the user 200 preferably may be selected from the list consisting of a garment of the user 200, a glove and an article moved by the user 200, such as a stick, a bat, a club, a racket, a cane, a toy, such as a toy gun. As outlined above, the beacon device 204 each independently may be embodied as active beacon devices and/or as passive beacon devices. Thus, the beacon devices 204 each independently may comprise one or more illumination sources 192 and/or may comprise one or more reflective elements for reflecting one or more primary light beams 206, as indicated in FIG. 6, thereby each being adapted to direct light beams 138 towards the at least one detector 110. As indicated in FIG. 6 and as discussed in further detail above, the light beams 138 each may have at least one characteristic property, for example at least one unique characteristic property, which may be used for identifying the respective beacon device 204 from which the respective light beam 138 is transmitted towards the detector 110. As outlined above, these characteristic properties may imply, for example, different modulation frequencies f1, f2 and f3 for each of the beacon devices 204.

The setup and/or the machine 202 can furthermore comprise one or a plurality of further human-machine interfaces, which need not necessarily be embodied according to the invention, for example, as indicated in FIG. 6, at least one display 208 and/or at least one keyboard 210. Additionally or alternatively, other types of human-machine interfaces may be provided. The machine 202 can, in principle, be any desired type of machine or combination of machines, such as a personal computer.

The at least one evaluation device 142 and/or one or more parts thereof may further function as a track controller 201 of the tracking system 199. Additionally or alternatively, one or more additional track controllers 201 may be provided, such as one or more additional data evaluation devices. The track controller 201 may be or may comprise one or more data memories, such as one or more volatile and/or non-volatile memories. In this at least one data memory, a plurality of subsequent orientations and/or positions of one or more objects 112 or parts of an object 112 and/or of the user 200 and/or one or more body parts of the user 200 may be stored, in order to allow for storing a past trajectory. Additionally or alternatively, a future trajectory may be predicted, such as by calculation, extrapolation or any other suitable algorithm. As an example, a past trajectory of an object 112 or a part thereof may be extrapolated to future values, in order to predict at least one of a future orientation and/or future position and/or a future trajectory of the object 112 or a part thereof.

In the context of an entertainment device 198, said machine 202 can be designed for example to carry out at least one entertainment function, for example at least one game, in particular with at least one graphical display on the display 208 and, optionally, a corresponding audio output. The user 200 can input at least one item of information, for example via the human-machine interface 196 and/or one or more other interfaces, wherein the entertainment device 198 is designed to alter the entertainment function in accordance with the information. By way of example, specific movements of one or more virtual articles, for example of virtual persons in a game and/or movements of virtual vehicles in a game, may be controlled by means of corresponding movements of the user 200 and/or one or more body parts of the user 200 and/or the at least one control element 113, which, in turn, may be recognized by the detector device 111. Other types of control of at least one entertainment function by the user 200, by means of the at least one detector device 111, are also possible.

In FIGS. 7 to 10, various possibilities for determining an orientation of the at least one object 112, specifically of the control element 119, with the beacon devices 204 attached thereto or integrated therein, are depicted. Thus, as outlined above, the orientation of the object 112 by using the detector device 111 and/or the method according to the present invention is determined by determining at least the longitudinal coordinates of each of the beacon devices 204. Generally, a full set of coordinates of each of the beacon devices 204 of at least one of the beacon devices 204, preferably of more than one of the beacon devices 204 and, most preferably, of all of the beacon devices 204 is determined, and the orientation of the object 112 in a coordinate system of the detector 110 is determined by using at least the longitudinal coordinates of the beacon devices 204 and, preferably, additionally by using the other coordinates of the beacon devices 204, such as the transversal coordinates. Consequently, the detector device 111 may comprise one or more of the longitudinal optical sensors 132, as explained in the embodiments described above, and, optionally and preferably, additionally at least one transversal optical sensor 130, e.g. such as at least one transversal optical sensor 130 explained in one or more of the embodiments described above.

Figure 7:
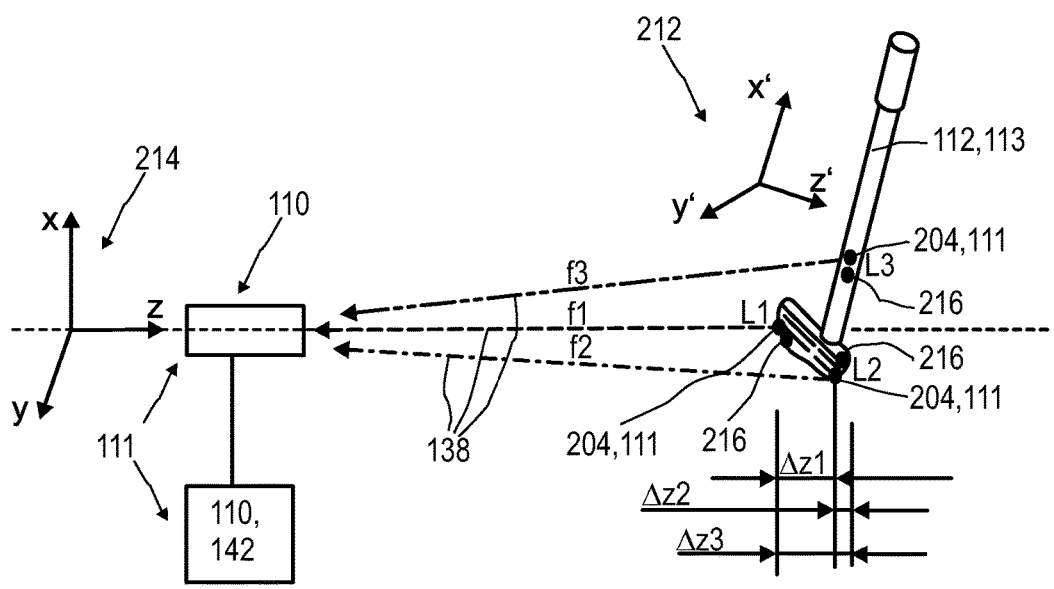
FIG. 7 shows an exemplary and schematic view of measuring differences in longitudinal coordinates of beacon devices by using a detector device, a detector system, a tracking device, a human-machine interface and an entertainment device according to the present invention.

In FIG. 7, a general example of determining the orientation of an object 112 is disclosed. Therein, the object 112, such as a control device 113, comprises at least two, more preferably at least three, beacon devices 204, which are located at positions L1, L2 and L3 in a coordinate system 212 of the object 112. As an example, the coordinate system 212 may be a cartesian coordinate system. However, additionally or alternatively, other types of coordinate systems may be used. As an example, the control element 113 may, as depicted in FIG. 7, have the shape of a gulf club, wherein one of the beacons (L2) is located in an origin of the coordinate system 212. Another one of the beacon 204 (L1) is located on a y'-axis of the coordinate system 212, wherein a third one of the beacon 204 (L3) is located on an x'-axis of the coordinate system 212.

As depicted in FIG. 7, by using the method disclosed above and by analyzing light beams 138 traveling from the beacon devices 204 to the detector device 110, at least longitudinal coordinates (z-coordinates) of the beacon devices 204 in a coordinate system 214 of the detector 110 may be determined. As depicted in FIG. 7, by forming difference values between these longitudinal coordinates (denoted by $\Delta z1$, $\Delta z2$ and $\Delta z3$), an orientation of the object 112 may be determined. Thus, as an example, beacon device L1 may have the coordinates $(x_1, y_1, z_1)$, beacon device L2 may have the coordinates $(x_2, y_2, z_2)$, and L3 may have the coordinates $(x_3, y_3$ and $z_3)$, in the coordinate system 214 of the detector 110. Thereof, in case only the z-coordinates are determined by the detector 110, these longitudinal coordinates are typically sufficient for determining an orientation of the object 112. Thus, coordinate differences $\Delta z1=z_2-z_1$, $\Delta z2=z_3-z_2$ and $\Delta z3=z_3-z_1$ allow for determining the orientation of the object 112. As an example, in case $\Delta z1=0$ and $\Delta z2>0$, it may be determined by a simple trigonometric relationship that the object 112 is tilted about the y-axis of the coordinate system 214, by an angle $\sin \alpha=\Delta z2/x_3$. Other geometric relationships may be determined rather easily. Consequently, the orientation of the object 112 in the coordinate system 214 may be determined, and appropriate coordinate transformations may be performed, for transforming coordinates of coordinate system 212 into coordinates of the coordinate system 214 or vice versa.

In FIGS. 8A to 8D, an example of a coordinate transformation is disclosed, which allows for determining an orientation of object 112 and, optionally, a spatial position of object 112, in the coordinate system 214 of the detector 110.

For this purpose, coordinates $\vec{L}_1$, $\vec{L}_2$ and $\vec{L}_3$ of the beacon devices 204 are determined by using the detector 110, in the coordinate system 214 of the detector 110. As outlined above, for this purpose, the beacon devices 204 may be adapted to provide light beams 138 having varying modulation frequencies f1, f2 and f3, respectively.

The relative orientation of the object 112 is, in this exemplary embodiment, determined by three angles, which are named ψ (yaw angle), Θ (pitch angle) and φ (roll angle). The absolute position of the object 112 may be determined by one or more absolute coordinates, such as one or more of the coordinates $\vec{L}_1$, $\vec{L}_2$ and/or $\vec{L}_3$. The angles ψ, Θ and φ are, in one exemplary embodiment, depicted in FIG. 8A.

Firstly, by using coordinates $\vec{L}_1$, $\vec{L}_2$ and $\vec{L}_3$, a set of eigenvectors may be determined, as follows:

$$\vec{Y}_e = (\vec{L}_2 - \vec{L}_1)/|\vec{L}_2 - \vec{L}_1|$$

$$\vec{Z}_e = (\vec{L}_3 - \vec{L}_1)/|\vec{L}_3 - \vec{L}_1|,$$

and a normalized normal vector:

$$\vec{n} = \vec{Y}_e \times \vec{Z}_e.$$

The normal vector $\vec{n}$ corresponds to a roll axis x' of the coordinate system 212 of the object 210.

Figure 8A:
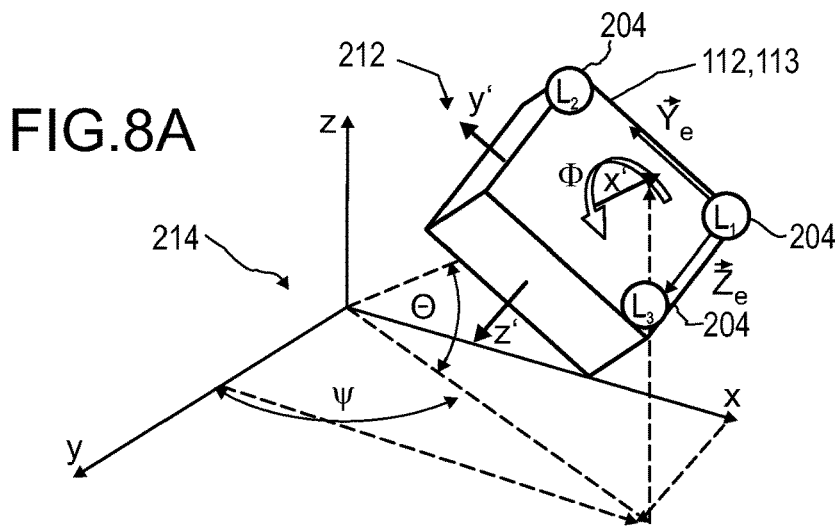
FIGS. 8A to 8D show method steps of an exemplary embodiment of a coordinate transformation for determining an orientation of a three-dimensional object.
Figure 8B:
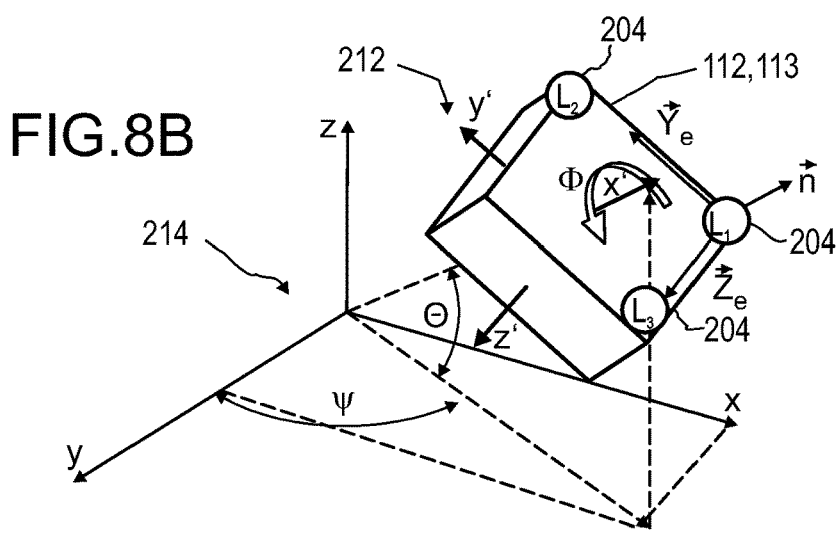
Figure 8C:
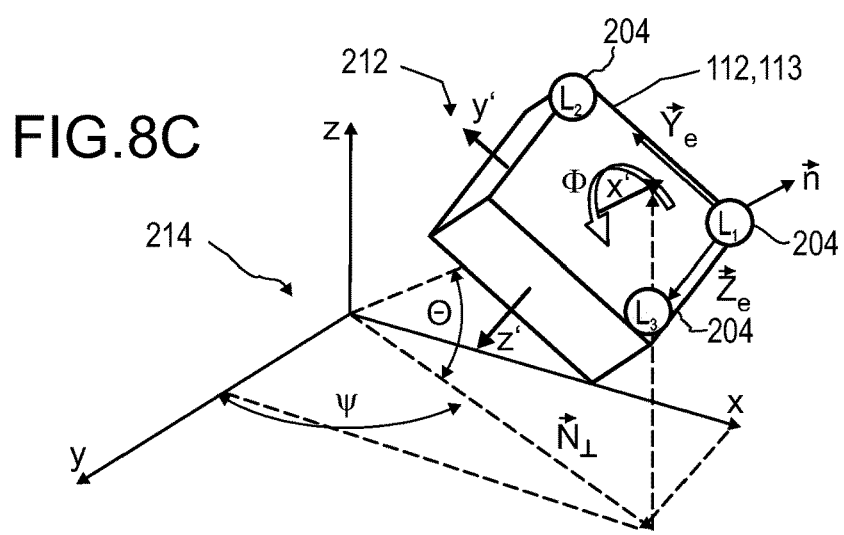

As can be seen in FIG. 8C, a projection of the roll axis onto the x, y-plane of coordinate system 214 results in the following vector:

$$\vec{N}^\perp = \begin{pmatrix} n_x \\ n_y \end{pmatrix}.$$

Therefrom, the yaw angle ψ may be determined by:

$$\Psi = \arctan\left(\frac{n_x}{n_y}\right).$$

Similarly, the pitch angle Θ may be determined from the z coordinate of the roll axis:

$$\Theta = \arcsin(n_z).$$

Figure 8D:
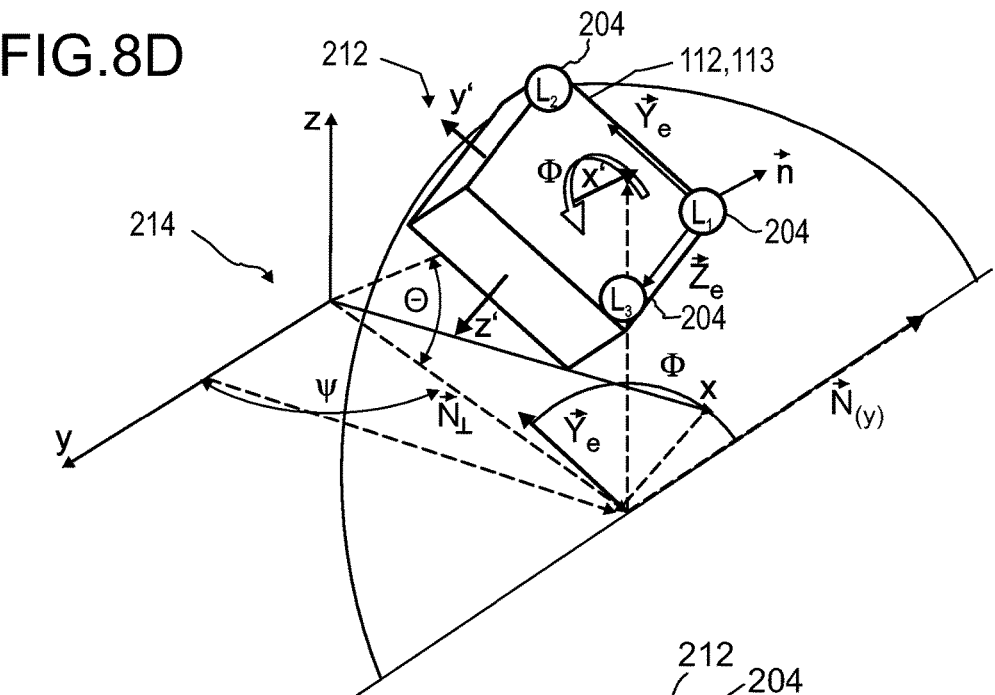

As depicted in FIG. 8D, the roll angle φ may be determined by using the following scalar product:

$$\Phi = \arccos(\vec{Y}_e \cdot \vec{N}_{(y)}),$$

with $$\vec{N}_{(y)} = \begin{pmatrix} n_y \\ -n_x \end{pmatrix}.$$

Therein, the unambiguousness of the roll angle φ has to be noted:

$$\Phi = [0, \pi] \Rightarrow (\vec{N}_{(y)} \times \vec{Y}_e) \cdot \vec{n} = 1$$

$$\Phi = [\pi, 2\pi] \Rightarrow (\vec{N}_{(y)} \times \vec{Y}_e) \cdot \vec{n} = -1$$

In the scalar products and the vector products, in each case, the normalized vectors (normalized to value 1) have to be inserted.

Thus, by using the detector 110 and the coordinates of the beacon devices 204, the orientation and, optionally, additionally the position of object 112 may be described in an unambiguous way.

Figure 9:
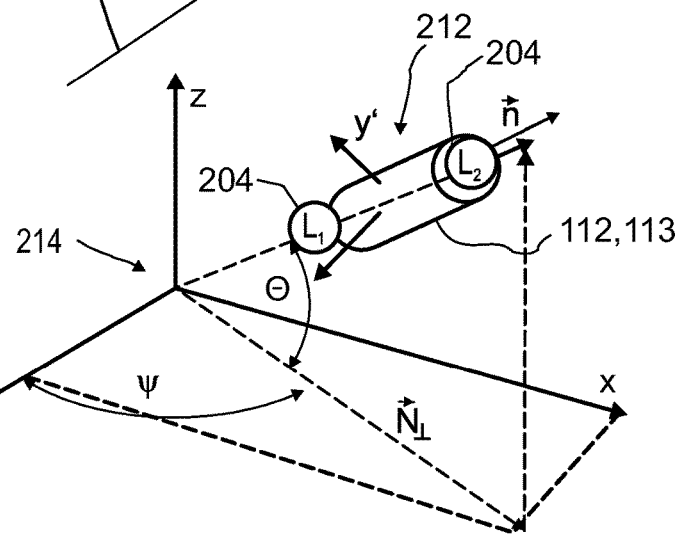
FIG. 9 shows an exemplary embodiment of a coordinate transformation for determining an orientation of a linear object.

In FIG. 9, a situation with only two beacon devices 204 is depicted. In this case, coordinates $\vec{L}_1$ and $\vec{L}_2$ for the beacon devices 204 may be determined, by using the detector 110. In this case, the orientation information regarding object 112 is reduced to the yaw angle ψ and the pitch angle Θ.

Again, by using the normalized directional vector $$\vec{n} = (\vec{L}_2 - \vec{L}_1)/|\vec{L}_2 - \vec{L}_1|,$$

the yaw angle ψ and the pitch angle Θ may be derived as follows:

$$\Psi = \arctan\left(\frac{n_x}{n_y}\right)$$

$$\Theta = \arcsin(n_z).$$

As outlined above, the object 212 is a part of the detector system 115. Thus, generally, the object itself and/or the placement of the beacon devices 204 may be influenced. Consequently, the location and arrangement of the beacon devices 204 may be chosen such that the algorithm for determining the orientation of the object 112 may be simplified. This general option will be outlined with respect to FIG. 10, is generally applicable to any embodiment of the present invention.

Figure 10:
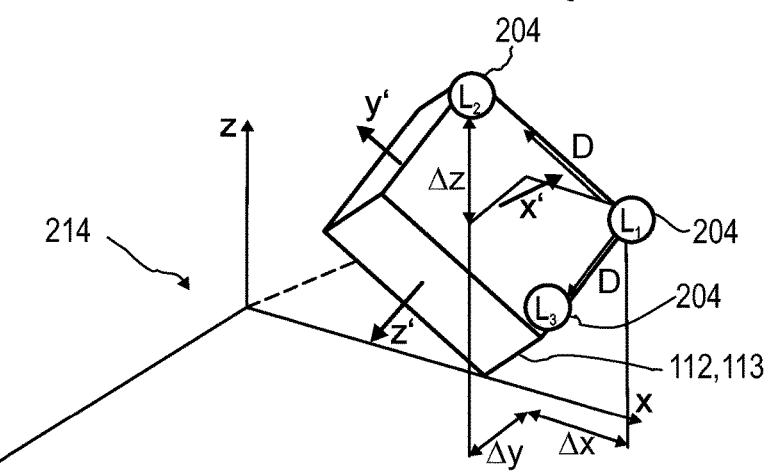
FIG. 10 shows an exemplary embodiment indicating the use of coordinate differences of beacon devices for determining an orientation of a three-dimensional object.

Thus, as depicted in FIG. 10, in this embodiment or in other embodiments, it may be helpful to position the beacon devices such that the beacon devices are one or more of:

arranged in a triangular arrangement, with the triangular arrangement forming a rectangle,
arranged in a triangular arrangement, with the triangular arrangement forming an isosceles triangle,
a rectangular arrangement, with the rectangular arrangement forming a rectangular isosceles triangle.

In case more than three beacon devices are present, at least three of the beacon devices may fulfill the above-mentioned conditions.

In the exemplary embodiment shown in FIG. 10, the beacon devices are arranged in a triangular arrangement, with the triangle forming a rectangular, isosceles triangle, with $L_1$ forming the tip of the triangle, and with $L_2$ and $L_3$ each being arranged at a distance D from $L_1$.

These known and equal distances of F2 and F3 from F1 increase redundancy and accuracy of determination of coordinates. Thus, L2 may be calculated by:

$$\vec{L}_2 = \vec{L}_1 + \vec{\Delta x} + \vec{\Delta y} + \vec{\Delta z},$$

with $$D = \sqrt{\vec{\Delta x}^2 + \vec{\Delta y}^2 + \vec{\Delta z}^2}$$

or $$\Delta y = \pm\sqrt{D^2 - \Delta x^2 - \Delta z^2}.$$

Consequently, $\vec{L}_2$ may be represented by $\vec{L}_1$ and a pair of distances, which may be selected from the group consisting of Δx and Δz (as outlined above), Δx and Δy, and Δy and Δz. This fact may be used for increasing the precision of the direct measurement of coordinates $x_2$, $y_2$ and $z_2$ of beacon F2. Beacon F3 may be represented in a similar way.

Thus, the present invention provides a large number of potential embodiments for determining the orientation of the object 112 in space, which may be used in various ways.

Figure 11:
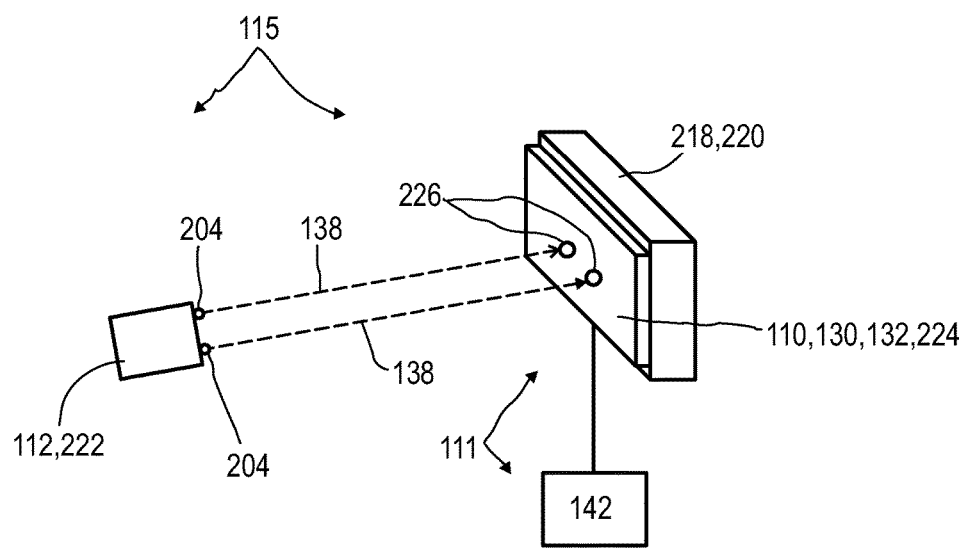
FIG. 11 shows an exemplary embodiment of a detector system with a detector attached to an article.

As outlined above, the detector system 115 may be embodied in various ways, with the detector 110 and/or the detector device 111 embodied as a free-standing device, as a handheld device or in another way. Specifically, as depicted in an exemplary embodiment of the detector system 115 shown in FIG. 11, the detector 110 may be attached to an article 218. Thus, as an example, the detector 110 may be attached to a stationary or moving article 218. As an exemplary embodiment, the article 218 may be embodied as a television set 220 or as a target for virtual archery.

The object 112 to which the at least two beacon devices 204 are attached and/or into which the at least two Beacon devices 204 are integrated specifically may be embodied as a pointer 222 which may be pointed at the detector 110.

The detector 110, comprising for example at least one transversal optical sensor 130 and/or at least one longitudinal optical sensor 132, may specifically be embodied as a fully or partially transparent detector 110. Thus, the article 218 specifically may fully or partially be visible through the detector 110. For example, the detector 110 may fully or partially be embodied as a transparent detector foil 224 which may adhesively be applied to a front side of the article 218, such as to a screen of the television set 220. Thus, by pointing the pointer 222 towards the screen of the television set 220, two or more light spots 226 may be generated on the detector 110. By using the above-mentioned technologies of x-y-detection of the transversal optical sensor 130, transversal coordinates of the pointer 222 may be determined. Additionally or alternatively, by evaluating the light spots 226 and/or their diameter or equivalent diameter by using the HP effect and the at least one longitudinal optical sensor 132, a longitudinal coordinate of the pointer 222 may be determined. The at least one longitudinal coordinate may comprise an absolute coordinate and/or may comprise information regarding changes of a longitudinal position. Thus, one or more of the light beams 138 traveling from the pointer 222 towards the detector 110 may be divergent light beams having a steadily increasing diameter. By evaluating sensor signals of the at least one longitudinal optical sensor 132, an increase in diameter and, thus, an increase in a distance between the pointer 222 and the detector 110 may be determined.

LIST OF REFERENCE NUMBERS 110 detector
111 detector device
112 object
113 control element
114 optical sensors
115 detector system
116 optical axis
118 housing
120 transfer device
122 lens
124 opening
126 direction of view
128 coordinate system
130 transversal optical sensor
132 longitudinal optical sensor
134 longitudinal optical sensor stack
136 sensor region
138 light beam
140 transversal signal lead
142 evaluation device
144 last longitudinal optical sensor
146 longitudinal signal leads
148 transversal evaluation unit
150 longitudinal evaluation unit
152 position information
154 data processing device
156 transformation unit
158 substrate
160 first electrode
162 blocking layer
164 n-semiconducting metal oxide
166 dye
168 p-semiconducting organic material
170 second electrode
172 encapsulation
174 electrode contact
176 partial electrode
178 partial electrode, x
180 partial electrode, y
182 contact leads
184 light spot
186 image
188 electrically conductive polymer
190 top contact
192 illumination source
194 focal point
196 human-machine interface
198 entertainment device
199 tracking system
200 user
201 track controller
202 machine
204 beacon device
206 primary light beam
208 display
210 keyboard
212 coordinate system of the object
214 coordinate system of the detector
216 motion sensor
218 article
220 television set
222 pointer
224 transparent detector foil
226 light spot

The invention claimed is:

1. A detector device for determining an orientation of at least one object, the detector device comprising
at least two beacon devices, at least one of the beacon devices being adapted to be attached to the object, held by the object and integrated into the object, the beacon devices each being adapted to direct light beams towards a detector, the beacon devices having predetermined coordinates in a coordinate system of the object;
at least one detector adapted to detect the light beams traveling from the beacon devices towards the detector, wherein the detector comprises at least one longitudinal optical sensor, wherein the longitudinal optical sensor has at least one sensor region, wherein the longitudinal optical sensor is designed to generate longitudinal sensor signals in a manner dependent on an illumination of the sensor region by the light beams, wherein the longitudinal sensor signals, given the same total power of the illumination, are dependent on a beam cross-section of the light beams in the sensor region, wherein the beacon devices are adapted such that the light beams traveling from the beacon devices towards the detector are mutually distinguishable, wherein the detector device is adapted to distinguish the light beams originating from the beacon devices and to assign each light beam to its respective beacon device; and at least one evaluation device, the evaluation device being adapted to determine longitudinal coordinates of each of the beacon devices in a coordinate system of the detector, the evaluation device being further adapted to determine an orientation of the object in the coordinate system of the detector by using the longitudinal coordinates of the beacon devices, wherein the evaluation device is designed to determine the longitudinal coordinates of the beacon devices by evaluating the longitudinal sensor signals.

2. The detector device according to claim 1, wherein the evaluation device is further adapted to determine an absolute position of at least one point of the object in the coordinate system of the detector.

3. The detector device according to claim 1, wherein the detector device comprises at least three beacon devices.

4. The detector device according to claim 1, wherein the detector is further adapted to determine at least one transversal coordinate for at least one of the beacon devices, wherein the evaluation device is further adapted to determine the orientation of the object in the coordinate system by further using the at least one transversal coordinate.

5. The detector device according to claim 1, wherein each of the beacon devices is independently selected from the group consisting of: a self-emissive beacon device having at least one illumination source adapted to emit light; and a passive beacon device having at least one reflector adapted to reflect light.

6. The detector device according to claim 1, wherein the light beams are mutually distinguishable with regard to at least one property selected from the group consisting of a spectral property, a color, a modulation frequency, a modulation amplitude, a pulse width, a duty cycle, and a phase.

7. The detector device according to claim 1, wherein the evaluation device is adapted to determine the orientation of the object by providing at least two orientation angles.

8. The detector device according to claim 7, wherein the evaluation device is adapted to determine the orientation of the object by providing at least one angle combination selected from the group consisting of: a combination of a yaw angle ($\psi$) and a pitch angle ($\Theta$); a combination of a yaw angle ($\Psi$), a pitch angle ($\Theta$) and a roll angle ($\phi$); and a combination of Euler angles.

9. The detector device according to claim 1, wherein the longitudinal optical sensor is a transparent optical sensor.

10. The detector device according to claim 1, wherein the longitudinal optical sensor comprises at least one dye-sensitized solar cell.

11. The detector device according to claim 1, wherein the evaluation device is designed to determine the longitudinal coordinates of the beacon devices from at least one pre-defined relationship between geometry of the illumination and a relative positioning of the respective beacon device with respect to the detector.

12. The detector device according to claim 1, wherein the detector has a plurality of the longitudinal optical sensors, wherein the longitudinal optical sensors are stacked.

13. The detector device according to claim 12, wherein the longitudinal optical sensors are arranged such that a light beam traveling from at least one of the beacon devices to the detector illuminates all longitudinal optical sensors, wherein at least one longitudinal sensor signal is generated by each longitudinal optical sensor, wherein the evaluation device is adapted to normalize the longitudinal sensor signals and to generate the longitudinal coordinate of the respective beacon device independent from an intensity of the light beam.

14. The detector device according to claim 1, wherein the evaluation device is adapted to determine the longitudinal coordinate of each beacon device by determining a diameter of the respective light beam from the at least one longitudinal sensor signal.

15. The detector device according to claim 1, wherein the detector further comprises:
at least one transversal optical sensor, the transversal optical sensor being adapted to determine a transversal position of the light beams, the transversal position being a position in at least one dimension perpendicular an optical axis of the detector, the transversal optical sensor being adapted to generate transversal sensor signals;
wherein the evaluation device is designed to determine at least one transversal coordinate for at least one of the beacon devices by evaluating the transversal sensor signals.

16. A detector system, comprising
at least one detector device according to claim 1, and
at least one object,
wherein the beacon devices are one of attached to the object, held by the object and integrated into the object.

17. The detector system according to claim 16, wherein the object is a rigid object.

18. The detector system according to claim 16, wherein the object is selected from the group consisting of: an article of sports equipment; an article of clothing; a hat; a shoe; and a pointer.

19. A human-machine interface for exchanging at least one item of information between a user and a machine, the human-machine interface comprising:
at least one detector device according to claim 1,
wherein at least one of the beacon devices is adapted to be directly or indirectly attached to the user and held by the user, wherein the human-machine interface is designed to determine an orientation of the user via the detector device, wherein the human-machine interface is designed to assign to the orientation at least one item of information.

20. An entertainment device for carrying out at least one entertainment function, the entertainment device comprising:
at least one human-machine interface according to claim 19,
wherein the entertainment device is designed to enable at least one item of information to be input by a player via the human-machine interface, wherein the entertainment device is designed to vary the entertainment function in accordance with the information.

21. A tracking system for tracking an orientation of at least one movable object, the tracking system comprising:
at least one detector device according to claim 1, and
at least one track controller,
wherein the track controller is adapted to track a series of orientations of the object at specific points in time.

22. A method for determining an orientation of at least one object, the method comprising:
emitting at least once by using at least two beacon devices, at least one of the beacon devices being attached to the object, held by the object and integrated into the object, wherein the beacon devices each direct light beams towards a detector, the beacon devices having predetermined coordinates in a coordinate system of the object, wherein the detector comprises at least one longitudinal optical sensor, wherein the longitudinal optical sensor has at least one sensor region, wherein the longitudinal optical sensor is designed to generate longitudinal sensor signals in a manner dependent on an illumination of the sensor region by the light beams, wherein the longitudinal sensor signals, given the same total power of the illumination, are dependent on a beam cross-section of the light beams in the sensor region, wherein the beacon devices are adapted such that the light beams traveling from the beacon devices towards the detector are mutually distinguishable, wherein the detector device is adapted to distinguish the light beams originating from the beacon devices and to assign each light beam to its respective beacon device;

detecting at least once the light beams traveling from the beacon devices towards the detector using the detector; and evaluating at least once longitudinal coordinates of each of the beacon devices in a coordinate system of the detector, wherein an orientation of the object is determined in the coordinate system of the detector by using the longitudinal coordinates of the beacon devices, wherein the longitudinal coordinates of the beacon devices are determined by evaluating the longitudinal sensor signals.

23. A method for orientation measurement in traffic technology, the method comprising:
using the detector device according to claim 1.

24. A method for entertainment, the method comprising:
using the detector device according to claim 1.

25. A method for security, the method comprising:
using the detector device according to claim 1.

26. A method for providing a human-machine interface, the method comprising:
using the detector device according to claim 1.

27. A method for tracking at least one object, the method comprising:
using the detector device according to claim 1.

28. A positioning system, comprising:
the detector device according to claim 1.

29. The detector system according to claim 18, wherein the object is the article of sports equipment which is selected from the group consisting of a racket, a club, and a bat.

30. The detector system according to claim 18, wherein the object is the pointer which is a laser pointer or a television control.

\* \* \* \* \*